(12) United States Patent
Frank et al.

(10) Patent No.: US 10,572,496 B1
(45) Date of Patent: Feb. 25, 2020

(54) DISTRIBUTED WORKFLOW SYSTEM AND DATABASE WITH ACCESS CONTROLS FOR CITY RESILIENCY

(71) Applicant: Palantir Technologies Inc., Palo Alto, CA (US)

(72) Inventors: Adam Frank, New York, NY (US); Greg Barbaccia, New York, NY (US); Mitch Beard, Falls Church, VA (US); Toan Ton, Palo Alto, CA (US); Katie Laidlaw, Boston, MA (US); Jonathan Stambolis, San Francisco, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 583 days.

(21) Appl. No.: 14/791,204

(22) Filed: Jul. 2, 2015

Related U.S. Application Data

(60) Provisional application No. 62/020,616, filed on Jul. 3, 2014.

(51) Int. Cl.
*G06F 16/248* (2019.01)
*G06Q 50/26* (2012.01)
(Continued)

(52) U.S. Cl.
CPC .......... *G06F 16/248* (2019.01); *G06F 3/0482* (2013.01); *G06F 3/0486* (2013.01);
(Continued)

(58) Field of Classification Search
CPC ............ G06Q 50/265; G06F 17/30554; G06F 3/04817; G06F 17/30553
See application file for complete search history.

(56) References Cited

U.S. PATENT DOCUMENTS

| 5,109,399 A | 4/1992 | Thompson |
| 5,329,108 A | 7/1994 | Lamoure |

(Continued)

FOREIGN PATENT DOCUMENTS

| CN | 101729531 | 6/2010 |
| CN | 103281301 | 9/2013 |

(Continued)

OTHER PUBLICATIONS

US 8,712,906 B1, 04/2014, Sprague et al. (withdrawn)
(Continued)

*Primary Examiner* — Usmaan Saeed
*Assistant Examiner* — David M Nafziger
(74) *Attorney, Agent, or Firm* — Knobbe, Martens, Olson & Bear, LLP

(57) ABSTRACT

Systems and techniques for sharing data related to city resiliency are described herein. The user interfaces described herein, such as electronic readers, clustering visualizations, and/or map visualizations, may provide human users with tools for effective workflow processes to share and analyze data related to city resiliency. Strategies to detect potential city resiliency issues and/or resilience data may be automatically shared, investigated, executed, applied, and/or used by entities. Strategies and/or resilience data may be modified to redact sensitive information and/or configured through granular access controls for sharing. Electronic communications may be automatically ingested and shared through the city resiliency sharing system.

12 Claims, 18 Drawing Sheets

(51) Int. Cl.
*G06F 3/0481* (2013.01)
*G06F 3/0482* (2013.01)
*G06F 3/0484* (2013.01)
*H04L 29/06* (2006.01)
*G06F 3/0486* (2013.01)
*G06F 16/29* (2019.01)
*G06F 16/93* (2019.01)
*G06F 16/9537* (2019.01)

(52) U.S. Cl.
CPC ...... *G06F 3/04817* (2013.01); *G06F 3/04842* (2013.01); *G06F 16/29* (2019.01); *G06F 16/93* (2019.01); *G06F 16/9537* (2019.01); *G06Q 50/26* (2013.01); *H04L 63/101* (2013.01)

(56) References Cited

U.S. PATENT DOCUMENTS

| | | |
|---|---|---|
| 5,548,749 A | 8/1996 | Kroenke et al. |
| 5,632,009 A | 5/1997 | Rao et al. |
| 5,670,987 A | 9/1997 | Doi et al. |
| 5,708,828 A | 1/1998 | Coleman |
| 5,765,171 A | 6/1998 | Gehani et al. |
| 5,781,704 A | 7/1998 | Rossmo |
| 5,845,300 A | 12/1998 | Comer |
| 5,870,761 A | 2/1999 | Demers et al. |
| 6,057,757 A | 5/2000 | Arrowsmith et al. |
| 6,091,956 A | 7/2000 | Hollenberg |
| 6,098,078 A | 8/2000 | Gehani et al. |
| 6,161,098 A | 12/2000 | Wallman |
| 6,190,053 B1 | 2/2001 | Stahlecker et al. |
| 6,202,085 B1 | 3/2001 | Benson et al. |
| 6,216,140 B1 | 4/2001 | Kramer |
| 6,219,053 B1 | 4/2001 | Tachibana et al. |
| 6,232,971 B1 | 5/2001 | Haynes |
| 6,240,414 B1 | 5/2001 | Beizer et al. |
| 6,247,019 B1 | 6/2001 | Davies |
| 6,279,018 B1 | 8/2001 | Kudrolli et al. |
| 6,289,338 B1 | 9/2001 | Stoffel et al. |
| 6,317,754 B1 | 11/2001 | Peng |
| 6,341,310 B1 | 1/2002 | Leshem et al. |
| 6,369,835 B1 | 4/2002 | Lin |
| 6,374,252 B1 | 4/2002 | Althoff et al. |
| 6,456,997 B1 | 9/2002 | Shukla |
| 6,463,404 B1 | 10/2002 | Appleby |
| 6,505,196 B2 | 1/2003 | Drucker et al. |
| 6,523,019 B1 | 2/2003 | Borthwick |
| 6,523,172 B1 | 2/2003 | Martinez-Guerra et al. |
| 6,539,381 B1 | 3/2003 | Prasad et al. |
| 6,549,944 B1 | 4/2003 | Weinberg et al. |
| 6,560,620 B1 | 5/2003 | Ching |
| 6,567,936 B1 | 5/2003 | Yang et al. |
| 6,581,068 B1 | 6/2003 | Bensoussan et al. |
| 6,594,672 B1 | 7/2003 | Lampson et al. |
| 6,631,496 B1 | 10/2003 | Li et al. |
| 6,640,231 B1 | 10/2003 | Andersen et al. |
| 6,642,945 B1 | 11/2003 | Sharpe |
| 6,714,936 B1 | 3/2004 | Nevin, III |
| 6,748,481 B1 | 6/2004 | Parry et al. |
| 6,775,675 B1 | 8/2004 | Nwabueze et al. |
| 6,807,569 B1 | 10/2004 | Bhimani et al. |
| 6,816,941 B1 | 11/2004 | Carlson et al. |
| 6,828,920 B2 | 12/2004 | Owen et al. |
| 6,839,745 B1 | 1/2005 | Dingari et al. |
| 6,877,137 B1 | 4/2005 | Rivette et al. |
| 6,938,034 B1 * | 8/2005 | Kraft ............... G06F 17/2211 |
| 6,976,210 B1 | 12/2005 | Silva et al. |
| 6,980,984 B1 | 12/2005 | Huffman et al. |
| 6,985,950 B1 | 1/2006 | Hanson et al. |
| 7,027,974 B1 | 4/2006 | Busch et al. |
| 7,036,085 B2 | 4/2006 | Barros |
| 7,043,702 B2 | 5/2006 | Chi et al. |
| 7,055,110 B2 | 5/2006 | Kupka et al. |
| 7,072,911 B1 | 7/2006 | Doman |
| 7,139,800 B2 | 11/2006 | Bellotti et al. |
| 7,158,878 B2 | 1/2007 | Rasmussen et al. |
| 7,162,475 B2 | 1/2007 | Ackerman |
| 7,167,877 B2 | 1/2007 | Balogh et al. |
| 7,168,039 B2 | 1/2007 | Bertram |
| 7,171,427 B2 | 1/2007 | Witowski et al. |
| 7,237,192 B1 | 6/2007 | Stephenson et al. |
| 7,240,330 B2 | 7/2007 | Fairweather |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,370,047 B2 | 5/2008 | Gorman |
| 7,373,669 B2 | 5/2008 | Eisen |
| 7,379,811 B2 | 5/2008 | Rasmussen et al. |
| 7,379,903 B2 | 5/2008 | Caballero et al. |
| 7,418,431 B1 | 8/2008 | Nies et al. |
| 7,426,654 B2 | 9/2008 | Adams et al. |
| 7,437,664 B2 | 10/2008 | Borson |
| 7,451,397 B2 | 11/2008 | Weber et al. |
| 7,454,466 B2 | 11/2008 | Bellotti et al. |
| 7,467,375 B2 | 12/2008 | Tondreau et al. |
| 7,487,139 B2 | 2/2009 | Fraleigh et al. |
| 7,502,786 B2 | 3/2009 | Liu et al. |
| 7,525,422 B2 | 4/2009 | Bishop et al. |
| 7,529,727 B2 | 5/2009 | Arning et al. |
| 7,529,734 B2 | 5/2009 | Dirisala |
| 7,533,069 B2 | 5/2009 | Fairweather |
| 7,546,245 B2 | 6/2009 | Surpin et al. |
| 7,558,677 B2 | 7/2009 | Jones |
| 7,574,409 B2 | 8/2009 | Patinkin |
| 7,574,428 B2 | 8/2009 | Leiserowitz et al. |
| 7,579,965 B2 | 8/2009 | Bucholz |
| 7,596,285 B2 | 9/2009 | Brown et al. |
| 7,596,608 B2 * | 9/2009 | Alexander ............ G06Q 10/00 709/217 |
| 7,614,006 B2 | 11/2009 | Molander |
| 7,617,232 B2 | 11/2009 | Gabbert et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,640,173 B2 | 12/2009 | Surpin et al. |
| 7,676,788 B1 | 3/2010 | Ousterhout et al. |
| 7,685,083 B2 | 3/2010 | Fairweather |
| 7,703,021 B1 | 4/2010 | Flam |
| 7,712,049 B2 | 5/2010 | Williams et al. |
| 7,716,067 B2 | 5/2010 | Surpin et al. |
| 7,716,077 B1 | 5/2010 | Mikurak |
| 7,725,547 B2 | 5/2010 | Albertson et al. |
| 7,730,396 B2 | 6/2010 | Chidlovskii et al. |
| 7,770,100 B2 | 8/2010 | Chamberlain et al. |
| 7,783,658 B1 | 8/2010 | Bayliss |
| 7,792,664 B1 * | 9/2010 | Crawford ............... G01W 1/10 702/3 |
| 7,805,457 B1 | 9/2010 | Viola et al. |
| 7,809,703 B2 | 10/2010 | Balabhadrapatruni et al. |
| 7,813,937 B1 | 10/2010 | Pathria et al. |
| 7,814,102 B2 | 10/2010 | Miller et al. |
| 7,818,297 B2 | 10/2010 | Peleg et al. |
| 7,818,658 B2 | 10/2010 | Chen |
| 7,827,045 B2 | 11/2010 | Madill et al. |
| 7,877,421 B2 | 1/2011 | Berger et al. |
| 7,894,984 B2 | 2/2011 | Rasmussen et al. |
| 7,899,611 B2 | 3/2011 | Downs et al. |
| 7,912,837 B2 * | 3/2011 | Buron ................ G06F 16/9537 707/723 |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,962,281 B2 | 6/2011 | Rasmussen et al. |
| 7,962,495 B2 | 6/2011 | Jain et al. |
| 7,962,848 B2 | 6/2011 | Bertram |
| 7,970,240 B1 | 6/2011 | Chao et al. |
| 7,971,150 B2 | 6/2011 | Raskutti et al. |
| 8,001,465 B2 | 8/2011 | Kudrolli et al. |
| 8,001,482 B2 | 8/2011 | Bhattiprolu et al. |
| 8,010,545 B2 | 8/2011 | Stefik et al. |
| 8,010,886 B2 | 8/2011 | Gusmorino et al. |
| 8,015,151 B2 | 9/2011 | Lier et al. |

(56) References Cited

U.S. PATENT DOCUMENTS

| | | |
|---|---|---|
| 8,015,487 B2 | 9/2011 | Roy et al. |
| 8,019,709 B2 | 9/2011 | Norton et al. |
| 8,024,778 B2 | 9/2011 | Cash et al. |
| 8,036,632 B1 | 10/2011 | Cona et al. |
| 8,046,362 B2 | 10/2011 | Bayliss |
| 8,082,172 B2 | 12/2011 | Chao et al. |
| 8,095,434 B1 * | 1/2012 | Puttick .............. G06Q 30/0639 705/26.9 |
| 8,103,543 B1 | 1/2012 | Zwicky |
| 8,117,022 B2 | 2/2012 | Linker |
| 8,132,149 B2 | 3/2012 | Shenfield et al. |
| 8,134,457 B2 | 3/2012 | Velipasalar et al. |
| 8,135,679 B2 | 3/2012 | Bayliss |
| 8,135,719 B2 | 3/2012 | Bayliss |
| 8,145,703 B2 | 3/2012 | Frishert et al. |
| 8,196,184 B2 | 6/2012 | Amirov et al. |
| 8,214,232 B2 | 7/2012 | Tyler et al. |
| 8,214,361 B1 | 7/2012 | Sandler et al. |
| 8,214,764 B2 | 7/2012 | Gemmell et al. |
| 8,225,201 B2 | 7/2012 | Michael |
| 8,229,947 B2 | 7/2012 | Fujinaga |
| 8,230,333 B2 | 7/2012 | Decherd et al. |
| 8,239,668 B1 | 8/2012 | Chen et al. |
| 8,266,168 B2 | 9/2012 | Bayliss |
| 8,271,948 B2 | 9/2012 | Talozi et al. |
| 8,280,880 B1 | 10/2012 | Aymeloglu et al. |
| 8,290,942 B2 | 10/2012 | Jones et al. |
| 8,290,990 B2 | 10/2012 | Drath et al. |
| 8,301,464 B1 | 10/2012 | Cave et al. |
| 8,301,904 B1 | 10/2012 | Gryaznov |
| 8,312,367 B2 | 11/2012 | Foster |
| 8,312,546 B2 | 11/2012 | Alme |
| 8,316,060 B1 | 11/2012 | Snyder et al. |
| 8,321,943 B1 | 11/2012 | Walters et al. |
| 8,347,398 B1 | 1/2013 | Weber |
| 8,352,881 B2 | 1/2013 | Champion et al. |
| 8,368,695 B2 | 2/2013 | Howell et al. |
| 8,380,659 B2 | 2/2013 | Zunger |
| 8,397,171 B2 | 3/2013 | Klassen et al. |
| 8,411,046 B2 | 4/2013 | Kruzeniski et al. |
| 8,412,707 B1 | 4/2013 | Mianji |
| 8,442,940 B1 | 5/2013 | Faletti et al. |
| 8,447,674 B2 | 5/2013 | Choudhuri et al. |
| 8,447,722 B1 | 5/2013 | Ahuja et al. |
| 8,452,790 B1 | 5/2013 | Mianji |
| 8,463,036 B1 | 6/2013 | Ramesh et al. |
| 8,484,168 B2 | 7/2013 | Bayliss |
| 8,489,331 B2 | 7/2013 | Kopf et al. |
| 8,489,623 B2 | 7/2013 | Jain et al. |
| 8,489,641 B1 | 7/2013 | Seefeld et al. |
| 8,495,077 B2 | 7/2013 | Bayliss |
| 8,498,969 B2 | 7/2013 | Bayliss |
| 8,498,984 B1 | 7/2013 | Hwang et al. |
| 8,514,082 B2 | 8/2013 | Cova et al. |
| 8,515,207 B2 | 8/2013 | Chau |
| 8,515,912 B2 | 8/2013 | Garrod et al. |
| 8,527,461 B2 | 9/2013 | Ducott, III et al. |
| 8,554,579 B2 | 10/2013 | Tribble et al. |
| 8,554,653 B2 | 10/2013 | Falkenborg et al. |
| 8,554,709 B2 | 10/2013 | Goodson et al. |
| 8,577,911 B1 | 11/2013 | Stepinski et al. |
| 8,578,500 B2 | 11/2013 | Long |
| 8,589,273 B2 | 11/2013 | Creeden et al. |
| 8,600,872 B1 | 12/2013 | Yan |
| 8,620,641 B2 | 12/2013 | Farnsworth et al. |
| 8,639,522 B2 | 1/2014 | Pathria et al. |
| 8,646,080 B2 | 2/2014 | Williamson et al. |
| 8,676,597 B2 | 3/2014 | Buehler et al. |
| 8,676,857 B2 | 3/2014 | Adams et al. |
| 8,688,749 B1 | 4/2014 | Ducott, III et al. |
| 8,689,108 B1 | 4/2014 | Duffield et al. |
| 8,689,182 B2 | 4/2014 | Leithead et al. |
| 8,707,185 B2 | 4/2014 | Robinson et al. |
| 8,713,467 B1 | 4/2014 | Goldenberg et al. |
| 8,726,379 B1 | 5/2014 | Stiansen et al. |
| 8,739,278 B2 | 5/2014 | Varghese |
| 8,742,934 B1 | 6/2014 | Sarpy et al. |
| 8,745,516 B2 | 6/2014 | Mason et al. |
| 8,781,169 B2 | 7/2014 | Jackson et al. |
| 8,788,405 B1 | 7/2014 | Sprague et al. |
| 8,788,407 B1 | 7/2014 | Singh et al. |
| 8,799,799 B1 | 8/2014 | Cervelli et al. |
| 8,799,812 B2 | 8/2014 | Parker |
| 8,812,960 B1 | 8/2014 | Sun et al. |
| 8,818,892 B1 | 8/2014 | Sprague et al. |
| 8,830,322 B2 | 9/2014 | Nerayoff et al. |
| 8,832,594 B1 | 9/2014 | Thompson et al. |
| 8,832,832 B1 | 9/2014 | Visbal |
| 8,868,486 B2 | 10/2014 | Tamayo |
| 8,917,274 B2 | 12/2014 | Ma et al. |
| 8,924,872 B1 | 12/2014 | Bogomolov et al. |
| 8,937,619 B2 | 1/2015 | Sharma et al. |
| 9,009,827 B1 | 4/2015 | Albertson et al. |
| 9,043,894 B1 | 5/2015 | Dennison et al. |
| 9,923,925 B2 | 3/2018 | Albertson et al. |
| 2001/0021936 A1 | 9/2001 | Bertram |
| 2002/0033848 A1 | 3/2002 | Sciammarella et al. |
| 2002/0065708 A1 | 5/2002 | Senay et al. |
| 2002/0087328 A1 * | 7/2002 | Denenberg .......... H04M 3/4936 704/275 |
| 2002/0091707 A1 | 7/2002 | Keller |
| 2002/0095658 A1 | 7/2002 | Shulman |
| 2002/0116120 A1 | 8/2002 | Ruiz et al. |
| 2002/0130907 A1 | 9/2002 | Chi et al. |
| 2002/0174201 A1 | 11/2002 | Ramer et al. |
| 2002/0194119 A1 | 12/2002 | Wright et al. |
| 2003/0028560 A1 | 2/2003 | Kudrolli et al. |
| 2003/0039948 A1 | 2/2003 | Donahue |
| 2003/0084017 A1 | 5/2003 | Ordille |
| 2003/0088654 A1 | 5/2003 | Good et al. |
| 2003/0097330 A1 | 5/2003 | Hillmer et al. |
| 2003/0144868 A1 | 7/2003 | MacIntyre et al. |
| 2003/0163352 A1 | 8/2003 | Surpin et al. |
| 2003/0172053 A1 | 9/2003 | Fairweather |
| 2003/0177112 A1 | 9/2003 | Gardner |
| 2003/0182313 A1 | 9/2003 | Federwisch et al. |
| 2003/0200217 A1 | 10/2003 | Ackerman |
| 2003/0225755 A1 | 12/2003 | Iwayama et al. |
| 2003/0229848 A1 | 12/2003 | Arend et al. |
| 2004/0032432 A1 | 2/2004 | Baynger |
| 2004/0064256 A1 | 4/2004 | Barinek et al. |
| 2004/0083466 A1 | 4/2004 | Dapp et al. |
| 2004/0085318 A1 | 5/2004 | Hassler et al. |
| 2004/0095349 A1 | 5/2004 | Bito et al. |
| 2004/0103124 A1 | 5/2004 | Kupkova |
| 2004/0111390 A1 | 6/2004 | Saito et al. |
| 2004/0111410 A1 | 6/2004 | Burgoon et al. |
| 2004/0143602 A1 | 7/2004 | Ruiz et al. |
| 2004/0153418 A1 | 8/2004 | Hanweck |
| 2004/0181554 A1 | 9/2004 | Heckerman et al. |
| 2004/0193600 A1 | 9/2004 | Kaasten et al. |
| 2004/0205524 A1 | 10/2004 | Richter et al. |
| 2004/0250124 A1 | 12/2004 | Chesla et al. |
| 2004/0250576 A1 | 12/2004 | Flanders |
| 2004/0260702 A1 | 12/2004 | Cragun et al. |
| 2005/0027705 A1 | 2/2005 | Sadri et al. |
| 2005/0028094 A1 | 2/2005 | Allyn |
| 2005/0034107 A1 | 2/2005 | Kendall et al. |
| 2005/0080769 A1 | 4/2005 | Gemmell |
| 2005/0086207 A1 | 4/2005 | Heuer et al. |
| 2005/0091420 A1 | 4/2005 | Snover et al. |
| 2005/0108063 A1 | 5/2005 | Madill et al. |
| 2005/0125715 A1 | 6/2005 | Di Franco et al. |
| 2005/0162523 A1 | 7/2005 | Darrell et al. |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0193024 A1 | 9/2005 | Beyer et al. |
| 2005/0222928 A1 | 10/2005 | Steier et al. |
| 2005/0229256 A2 | 10/2005 | Banzhof |
| 2005/0246327 A1 | 11/2005 | Yeung et al. |
| 2005/0251786 A1 | 11/2005 | Citron et al. |
| 2005/0262556 A1 | 11/2005 | Waisman et al. |
| 2006/0026120 A1 | 2/2006 | Carolan et al. |

(56) References Cited

U.S. PATENT DOCUMENTS

| | | |
|---|---|---|
| 2006/0026170 A1 | 2/2006 | Kreitler et al. |
| 2006/0036568 A1 | 2/2006 | Moore et al. |
| 2006/0045470 A1 | 3/2006 | Poslinski et al. |
| 2006/0059139 A1 | 3/2006 | Robinson |
| 2006/0069912 A1 | 3/2006 | Zheng et al. |
| 2006/0074866 A1 | 4/2006 | Chamberlain et al. |
| 2006/0074881 A1 | 4/2006 | Vembu et al. |
| 2006/0080619 A1 | 4/2006 | Carlson et al. |
| 2006/0106879 A1 | 5/2006 | Zondervan et al. |
| 2006/0129746 A1 | 6/2006 | Porter |
| 2006/0139375 A1 | 6/2006 | Rasmussen et al. |
| 2006/0149596 A1 | 7/2006 | Surpin et al. |
| 2006/0155945 A1 | 7/2006 | McGarvey |
| 2006/0190497 A1 | 8/2006 | Inturi et al. |
| 2006/0203337 A1 | 9/2006 | White |
| 2006/0206866 A1 | 9/2006 | Eldrige et al. |
| 2006/0218637 A1 | 9/2006 | Thomas et al. |
| 2006/0224579 A1 | 10/2006 | Zheng |
| 2006/0224629 A1* | 10/2006 | Alexander .......... G16H 40/20 |
| 2006/0242040 A1 | 10/2006 | Rader et al. |
| 2006/0242630 A1 | 10/2006 | Koike et al. |
| 2006/0265747 A1 | 11/2006 | Judge |
| 2006/0271277 A1 | 11/2006 | Hu et al. |
| 2006/0273893 A1* | 12/2006 | Warner .............. G08B 25/006 340/531 |
| 2006/0279630 A1 | 12/2006 | Aggarwal et al. |
| 2007/0005707 A1 | 1/2007 | Teodosiu et al. |
| 2007/0011150 A1 | 1/2007 | Frank |
| 2007/0015506 A1* | 1/2007 | Hewett, Jr. ............ G06Q 10/00 455/432.3 |
| 2007/0016363 A1 | 1/2007 | Huang et al. |
| 2007/0026373 A1 | 2/2007 | Suriyanarayanan et al. |
| 2007/0038962 A1 | 2/2007 | Fuchs et al. |
| 2007/0057966 A1 | 3/2007 | Ohno et al. |
| 2007/0074169 A1 | 3/2007 | Chess et al. |
| 2007/0078832 A1 | 4/2007 | Ott et al. |
| 2007/0078872 A1 | 4/2007 | Cohen |
| 2007/0083541 A1 | 4/2007 | Fraleigh et al. |
| 2007/0112714 A1 | 5/2007 | Fairweather |
| 2007/0112887 A1 | 5/2007 | Liu et al. |
| 2007/0168516 A1 | 7/2007 | Liu et al. |
| 2007/0174760 A1 | 7/2007 | Chamberlain et al. |
| 2007/0180075 A1 | 8/2007 | Chasman et al. |
| 2007/0192143 A1 | 8/2007 | Krishnan et al. |
| 2007/0192265 A1 | 8/2007 | Chopin et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0220067 A1 | 9/2007 | Suriyanarayanan et al. |
| 2007/0220328 A1 | 9/2007 | Liu et al. |
| 2007/0233756 A1 | 10/2007 | D'Souza et al. |
| 2007/0266336 A1 | 11/2007 | Nojima et al. |
| 2007/0294200 A1 | 12/2007 | Au |
| 2007/0294643 A1 | 12/2007 | Kyle |
| 2007/0294766 A1 | 12/2007 | Mir et al. |
| 2007/0299697 A1 | 12/2007 | Friedlander et al. |
| 2007/0299887 A1 | 12/2007 | Novik et al. |
| 2008/0027981 A1 | 1/2008 | Wahl |
| 2008/0033753 A1 | 2/2008 | Canda et al. |
| 2008/0040684 A1 | 2/2008 | Crump |
| 2008/0051989 A1 | 2/2008 | Welsh |
| 2008/0052142 A1 | 2/2008 | Bailey et al. |
| 2008/0077474 A1* | 3/2008 | Dumas .................. G06Q 10/00 705/7.12 |
| 2008/0077597 A1 | 3/2008 | Butler |
| 2008/0077642 A1 | 3/2008 | Carbone et al. |
| 2008/0086718 A1 | 4/2008 | Bostick et al. |
| 2008/0104019 A1 | 5/2008 | Nath |
| 2008/0109762 A1* | 5/2008 | Hundal ................ G06F 3/0482 715/855 |
| 2008/0126951 A1 | 5/2008 | Sood et al. |
| 2008/0133567 A1 | 6/2008 | Ames et al. |
| 2008/0140387 A1 | 6/2008 | Linker |
| 2008/0141117 A1 | 6/2008 | King et al. |
| 2008/0148398 A1 | 6/2008 | Mezack et al. |
| 2008/0162616 A1 | 7/2008 | Gross et al. |
| 2008/0189240 A1 | 8/2008 | Mullins et al. |
| 2008/0195417 A1 | 8/2008 | Surpin et al. |
| 2008/0195608 A1 | 8/2008 | Clover |
| 2008/0222295 A1 | 9/2008 | Robinson et al. |
| 2008/0228467 A1 | 9/2008 | Womack et al. |
| 2008/0229422 A1 | 9/2008 | Hudis et al. |
| 2008/0235575 A1 | 9/2008 | Weiss |
| 2008/0243951 A1 | 10/2008 | Webman et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0276167 A1 | 11/2008 | Michael |
| 2008/0278311 A1 | 11/2008 | Grange et al. |
| 2008/0281580 A1 | 11/2008 | Zabokritski |
| 2008/0288306 A1 | 11/2008 | MacIntyre et al. |
| 2008/0288425 A1 | 11/2008 | Posse et al. |
| 2008/0301643 A1 | 12/2008 | Appleton et al. |
| 2008/0320299 A1 | 12/2008 | Wobber et al. |
| 2009/0002492 A1 | 1/2009 | Velipasalar et al. |
| 2009/0018940 A1 | 1/2009 | Wang et al. |
| 2009/0027418 A1 | 1/2009 | Maru et al. |
| 2009/0030915 A1 | 1/2009 | Winter et al. |
| 2009/0044279 A1 | 2/2009 | Crawford et al. |
| 2009/0055251 A1 | 2/2009 | Shah et al. |
| 2009/0076845 A1 | 3/2009 | Bellin et al. |
| 2009/0082997 A1 | 3/2009 | Tokman et al. |
| 2009/0083184 A1 | 3/2009 | Eisen |
| 2009/0088964 A1 | 4/2009 | Schaaf et al. |
| 2009/0100165 A1* | 4/2009 | Wesley, Sr. .......... G06F 15/173 709/223 |
| 2009/0103442 A1 | 4/2009 | Douville |
| 2009/0119309 A1 | 5/2009 | Gibson et al. |
| 2009/0125369 A1 | 5/2009 | Kloosstra et al. |
| 2009/0132921 A1 | 5/2009 | Hwangbo et al. |
| 2009/0132953 A1 | 5/2009 | Reed et al. |
| 2009/0144262 A1 | 6/2009 | White et al. |
| 2009/0144274 A1 | 6/2009 | Fraleigh et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0172821 A1 | 7/2009 | Daira et al. |
| 2009/0179892 A1 | 7/2009 | Tsuda et al. |
| 2009/0187546 A1 | 7/2009 | Whyte et al. |
| 2009/0192957 A1 | 7/2009 | Subramanian et al. |
| 2009/0199090 A1 | 8/2009 | Poston et al. |
| 2009/0222400 A1 | 9/2009 | Kupershmidt et al. |
| 2009/0222760 A1 | 9/2009 | Halverson et al. |
| 2009/0228507 A1 | 9/2009 | Jain et al. |
| 2009/0234720 A1 | 9/2009 | George et al. |
| 2009/0248828 A1* | 10/2009 | Gould .................. G08B 27/005 709/207 |
| 2009/0254970 A1 | 10/2009 | Agarwal et al. |
| 2009/0271359 A1 | 10/2009 | Bayliss |
| 2009/0281839 A1 | 11/2009 | Lynn et al. |
| 2009/0287470 A1 | 11/2009 | Farnsworth et al. |
| 2009/0292626 A1 | 11/2009 | Oxford |
| 2009/0328222 A1 | 12/2009 | Helman et al. |
| 2010/0011282 A1 | 1/2010 | Dollard et al. |
| 2010/0042922 A1 | 2/2010 | Bradateanu et al. |
| 2010/0057716 A1 | 3/2010 | Stefik et al. |
| 2010/0070523 A1 | 3/2010 | Delgo et al. |
| 2010/0070842 A1 | 3/2010 | Aymeloglu et al. |
| 2010/0070897 A1 | 3/2010 | Aymeloglu et al. |
| 2010/0077481 A1 | 3/2010 | Polyakov et al. |
| 2010/0077483 A1 | 3/2010 | Stolfo et al. |
| 2010/0100963 A1 | 4/2010 | Mahaffey |
| 2010/0114887 A1 | 5/2010 | Conway et al. |
| 2010/0121803 A1* | 5/2010 | Gill ........................ G06Q 10/04 706/46 |
| 2010/0122152 A1 | 5/2010 | Chamberlain et al. |
| 2010/0125546 A1 | 5/2010 | Barrett et al. |
| 2010/0131457 A1 | 5/2010 | Heimendinger |
| 2010/0145909 A1 | 6/2010 | Ngo |
| 2010/0162176 A1 | 6/2010 | Dunton |
| 2010/0169237 A1 | 7/2010 | Howard et al. |
| 2010/0185691 A1 | 7/2010 | Irmak et al. |
| 2010/0191563 A1 | 7/2010 | Schlaifer et al. |
| 2010/0198684 A1 | 8/2010 | Eraker et al. |

(56) References Cited

U.S. PATENT DOCUMENTS

| | | |
|---|---|---|
| 2010/0199225 A1 | 8/2010 | Coleman et al. |
| 2010/0204983 A1 | 8/2010 | Chung et al. |
| 2010/0235915 A1 | 9/2010 | Memon et al. |
| 2010/0250412 A1 | 9/2010 | Wagner |
| 2010/0262688 A1 | 10/2010 | Hussain et al. |
| 2010/0280857 A1 | 11/2010 | Liu et al. |
| 2010/0293174 A1 | 11/2010 | Bennett et al. |
| 2010/0306029 A1 | 12/2010 | Jolley |
| 2010/0306285 A1 | 12/2010 | Shah et al. |
| 2010/0306713 A1 | 12/2010 | Geisner et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0010342 A1 | 1/2011 | Chen et al. |
| 2011/0035811 A1* | 2/2011 | Rees ............... G06F 17/2229 726/29 |
| 2011/0047159 A1 | 2/2011 | Baid et al. |
| 2011/0060753 A1 | 3/2011 | Shaked et al. |
| 2011/0061013 A1 | 3/2011 | Bilicki et al. |
| 2011/0074811 A1 | 3/2011 | Hanson et al. |
| 2011/0078173 A1 | 3/2011 | Seligmann et al. |
| 2011/0087519 A1 | 4/2011 | Fordyce, III et al. |
| 2011/0093327 A1 | 4/2011 | Fordyce, III et al. |
| 2011/0117878 A1 | 5/2011 | Barash et al. |
| 2011/0119100 A1 | 5/2011 | Ruhl et al. |
| 2011/0137766 A1 | 6/2011 | Rasmussen et al. |
| 2011/0153384 A1 | 6/2011 | Horne et al. |
| 2011/0167105 A1 | 7/2011 | Ramakrishnan et al. |
| 2011/0167493 A1 | 7/2011 | Song et al. |
| 2011/0170799 A1 | 7/2011 | Carrino et al. |
| 2011/0173032 A1 | 7/2011 | Payne et al. |
| 2011/0173093 A1 | 7/2011 | Psota et al. |
| 2011/0178842 A1 | 7/2011 | Rane et al. |
| 2011/0208724 A1 | 8/2011 | Jones et al. |
| 2011/0218934 A1 | 9/2011 | Elser |
| 2011/0219450 A1 | 9/2011 | McDougal et al. |
| 2011/0225198 A1 | 9/2011 | Edwards et al. |
| 2011/0231223 A1 | 9/2011 | Winters |
| 2011/0238510 A1 | 9/2011 | Rowen et al. |
| 2011/0238553 A1 | 9/2011 | Raj et al. |
| 2011/0238570 A1 | 9/2011 | Li et al. |
| 2011/0246229 A1 | 10/2011 | Pacha |
| 2011/0258216 A1 | 10/2011 | Supakkul et al. |
| 2011/0291851 A1 | 12/2011 | Whisenant |
| 2011/0307382 A1 | 12/2011 | Siegel et al. |
| 2011/0310005 A1 | 12/2011 | Chen et al. |
| 2012/0005159 A1 | 1/2012 | Wang et al. |
| 2012/0016849 A1 | 1/2012 | Garrod et al. |
| 2012/0019559 A1 | 1/2012 | Siler et al. |
| 2012/0022945 A1 | 1/2012 | Falkenborg et al. |
| 2012/0023075 A1 | 1/2012 | Pulfer et al. |
| 2012/0036013 A1 | 2/2012 | Neuhaus et al. |
| 2012/0036106 A1 | 2/2012 | Desai et al. |
| 2012/0036434 A1 | 2/2012 | Oberstein |
| 2012/0064921 A1* | 3/2012 | Hernoud ............. H04W 4/029 455/456.6 |
| 2012/0066296 A1 | 3/2012 | Appleton et al. |
| 2012/0079363 A1 | 3/2012 | Folting et al. |
| 2012/0084135 A1 | 4/2012 | Nissan et al. |
| 2012/0084866 A1 | 4/2012 | Stolfo |
| 2012/0106801 A1 | 5/2012 | Jackson |
| 2012/0110633 A1 | 5/2012 | An et al. |
| 2012/0110674 A1 | 5/2012 | Belani et al. |
| 2012/0117082 A1 | 5/2012 | Koperda et al. |
| 2012/0131512 A1 | 5/2012 | Takeuchi et al. |
| 2012/0144335 A1 | 6/2012 | Abeln et al. |
| 2012/0150446 A1* | 6/2012 | Chang ............... G06Q 10/10 702/3 |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0167164 A1* | 6/2012 | Burgess ............. G06F 21/00 726/1 |
| 2012/0173985 A1 | 7/2012 | Peppel |
| 2012/0191446 A1 | 7/2012 | Binsztok et al. |
| 2012/0196557 A1 | 8/2012 | Reich et al. |
| 2012/0196558 A1 | 8/2012 | Reich et al. |
| 2012/0208636 A1 | 8/2012 | Feige |
| 2012/0215898 A1 | 8/2012 | Shah et al. |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0266245 A1 | 10/2012 | McDougal et al. |
| 2012/0290879 A1 | 11/2012 | Shibuya et al. |
| 2012/0296907 A1 | 11/2012 | Long et al. |
| 2012/0304150 A1 | 11/2012 | Leithead et al. |
| 2012/0304244 A1 | 11/2012 | Xie et al. |
| 2012/0310831 A1 | 12/2012 | Harris et al. |
| 2012/0310838 A1 | 12/2012 | Harris et al. |
| 2012/0311684 A1 | 12/2012 | Paulsen et al. |
| 2012/0323829 A1 | 12/2012 | Stokes et al. |
| 2012/0323888 A1 | 12/2012 | Osann, Jr. |
| 2012/0330801 A1 | 12/2012 | McDougal et al. |
| 2012/0330973 A1 | 12/2012 | Ghuneim et al. |
| 2013/0006426 A1 | 1/2013 | Healey et al. |
| 2013/0006655 A1 | 1/2013 | Van Arkel et al. |
| 2013/0006668 A1 | 1/2013 | Van Arkel et al. |
| 2013/0006725 A1 | 1/2013 | Simanek et al. |
| 2013/0013612 A1* | 1/2013 | Fittges ............. G06F 17/30707 707/739 |
| 2013/0018796 A1 | 1/2013 | Kolhatkar et al. |
| 2013/0019306 A1 | 1/2013 | Lagar-Cavilla et al. |
| 2013/0024307 A1 | 1/2013 | Fuerstenberg et al. |
| 2013/0024339 A1 | 1/2013 | Choudhuri et al. |
| 2013/0046842 A1 | 2/2013 | Muntz et al. |
| 2013/0060786 A1 | 3/2013 | Serrano et al. |
| 2013/0061169 A1 | 3/2013 | Pearcy et al. |
| 2013/0067017 A1 | 3/2013 | Carriere et al. |
| 2013/0073377 A1 | 3/2013 | Heath |
| 2013/0078943 A1 | 3/2013 | Biage et al. |
| 2013/0086072 A1* | 4/2013 | Peng ............... G06F 16/9537 707/743 |
| 2013/0091084 A1 | 4/2013 | Lee |
| 2013/0097482 A1 | 4/2013 | Marantz et al. |
| 2013/0101159 A1 | 4/2013 | Chao et al. |
| 2013/0111320 A1 | 5/2013 | Campbell et al. |
| 2013/0117651 A1 | 5/2013 | Waldman et al. |
| 2013/0124193 A1 | 5/2013 | Holmberg |
| 2013/0139268 A1 | 5/2013 | An et al. |
| 2013/0150004 A1 | 6/2013 | Rosen |
| 2013/0151388 A1 | 6/2013 | Falkenborg et al. |
| 2013/0157234 A1 | 6/2013 | Gulli et al. |
| 2013/0160120 A1 | 6/2013 | Malaviya et al. |
| 2013/0166550 A1 | 6/2013 | Buchmann et al. |
| 2013/0173540 A1 | 7/2013 | Qian et al. |
| 2013/0176321 A1 | 7/2013 | Mitchell et al. |
| 2013/0179420 A1 | 7/2013 | Park et al. |
| 2013/0191336 A1 | 7/2013 | Ducott et al. |
| 2013/0191338 A1 | 7/2013 | Ducott, III et al. |
| 2013/0211985 A1 | 8/2013 | Clark et al. |
| 2013/0224696 A1 | 8/2013 | Wolfe et al. |
| 2013/0232045 A1 | 9/2013 | Tai et al. |
| 2013/0238616 A1 | 9/2013 | Rose et al. |
| 2013/0246170 A1 | 9/2013 | Gross et al. |
| 2013/0251233 A1 | 9/2013 | Yang et al. |
| 2013/0262527 A1 | 10/2013 | Hunter et al. |
| 2013/0263019 A1 | 10/2013 | Castellanos et al. |
| 2013/0268520 A1 | 10/2013 | Fisher et al. |
| 2013/0275446 A1 | 10/2013 | Jain et al. |
| 2013/0276799 A1 | 10/2013 | Davidson |
| 2013/0279757 A1 | 10/2013 | Kephart |
| 2013/0282696 A1 | 10/2013 | John et al. |
| 2013/0290011 A1 | 10/2013 | Lynn et al. |
| 2013/0290825 A1 | 10/2013 | Arndt et al. |
| 2013/0297619 A1 | 11/2013 | Chandarsekaran et al. |
| 2013/0318594 A1 | 11/2013 | Hoy et al. |
| 2013/0339218 A1 | 12/2013 | Subramanian et al. |
| 2013/0345982 A1* | 12/2013 | Liu ................. G01W 1/16 702/4 |
| 2013/0346444 A1 | 12/2013 | Makkar et al. |

(56) References Cited

U.S. PATENT DOCUMENTS

| | | | |
|---|---|---|---|
| 2013/0346563 A1* | 12/2013 | Huang | H04L 67/10 709/219 |
| 2014/0006109 A1 | 1/2014 | Callioni et al. | |
| 2014/0019936 A1 | 1/2014 | Cohanoff | |
| 2014/0032506 A1 | 1/2014 | Hoey et al. | |
| 2014/0033010 A1 | 1/2014 | Richardt et al. | |
| 2014/0040182 A1 | 2/2014 | Gilder et al. | |
| 2014/0040371 A1 | 2/2014 | Gurevich et al. | |
| 2014/0040714 A1 | 2/2014 | Siegel et al. | |
| 2014/0047357 A1 | 2/2014 | Alfaro et al. | |
| 2014/0052466 A1 | 2/2014 | DeVille et al. | |
| 2014/0058754 A1 | 2/2014 | Wild | |
| 2014/0059038 A1 | 2/2014 | McPherson et al. | |
| 2014/0059683 A1 | 2/2014 | Ashley | |
| 2014/0068487 A1 | 3/2014 | Steiger et al. | |
| 2014/0081652 A1 | 3/2014 | Klindworth | |
| 2014/0095509 A1 | 4/2014 | Patton | |
| 2014/0108068 A1 | 4/2014 | Williams | |
| 2014/0108380 A1 | 4/2014 | Gotz et al. | |
| 2014/0108985 A1 | 4/2014 | Scott et al. | |
| 2014/0114972 A1 | 4/2014 | Ducott et al. | |
| 2014/0123279 A1 | 5/2014 | Bishop et al. | |
| 2014/0129518 A1 | 5/2014 | Ducott et al. | |
| 2014/0136237 A1 | 5/2014 | Anderson et al. | |
| 2014/0143009 A1 | 5/2014 | Brice et al. | |
| 2014/0149130 A1 | 5/2014 | Getchius | |
| 2014/0149272 A1 | 5/2014 | Hirani et al. | |
| 2014/0149436 A1 | 5/2014 | Bahrami et al. | |
| 2014/0156527 A1 | 6/2014 | Grigg et al. | |
| 2014/0157172 A1 | 6/2014 | Peery et al. | |
| 2014/0164502 A1 | 6/2014 | Khodorenko et al. | |
| 2014/0189536 A1 | 7/2014 | Lange et al. | |
| 2014/0195515 A1 | 7/2014 | Baker et al. | |
| 2014/0195887 A1 | 7/2014 | Ellis et al. | |
| 2014/0245210 A1* | 8/2014 | Battcher | G06F 3/04842 715/771 |
| 2014/0273910 A1* | 9/2014 | Ballantyne | H04W 4/90 455/404.1 |
| 2014/0279824 A1 | 9/2014 | Tamayo | |
| 2014/0310282 A1 | 10/2014 | Sprague et al. | |
| 2014/0316911 A1 | 10/2014 | Gross | |
| 2014/0333651 A1 | 11/2014 | Cervelli et al. | |
| 2014/0337772 A1 | 11/2014 | Cervelli et al. | |
| 2014/0366132 A1 | 12/2014 | Stiansen et al. | |
| 2015/0046791 A1 | 2/2015 | Isaacson | |
| 2015/0046844 A1 | 2/2015 | Lee et al. | |
| 2015/0046845 A1 | 2/2015 | Lee et al. | |
| 2015/0046870 A1 | 2/2015 | Goldenberg et al. | |
| 2015/0046876 A1 | 2/2015 | Goldenberg | |
| 2015/0074050 A1 | 3/2015 | Landau et al. | |
| 2015/0135329 A1 | 5/2015 | Aghasaryan et al. | |
| 2015/0186821 A1 | 7/2015 | Wang et al. | |
| 2015/0187036 A1 | 7/2015 | Wang et al. | |
| 2015/0212236 A1* | 7/2015 | Haas | G01W 1/10 382/100 |
| 2015/0213284 A1* | 7/2015 | Birkel | G06Q 50/10 726/30 |
| 2015/0230061 A1* | 8/2015 | Srivastava | G06Q 50/265 705/324 |
| 2015/0235334 A1 | 8/2015 | Wang et al. | |
| 2015/0248489 A1* | 9/2015 | Solheim | G06F 17/30554 707/706 |
| 2015/0311991 A1* | 10/2015 | Iwai | H04M 11/08 455/414.2 |
| 2015/0317285 A1* | 11/2015 | Duggal | G06F 17/211 715/242 |
| 2015/0363518 A1* | 12/2015 | Edgington | G06Q 10/06 703/6 |
| 2015/0379341 A1* | 12/2015 | Agrawal | G06T 7/11 382/176 |
| 2016/0065511 A1* | 3/2016 | Ganin | H04L 51/063 709/206 |
| 2016/0098493 A1* | 4/2016 | Primke | G06F 17/30867 707/754 |
| 2016/0112428 A1* | 4/2016 | Terleski | G06Q 50/01 726/4 |
| 2016/0119424 A1* | 4/2016 | Kane | G08B 27/001 709/203 |
| 2017/0098289 A1* | 4/2017 | Florance | G06Q 10/10 |
| 2017/0134425 A1 | 5/2017 | Albertson et al. | |
| 2018/0005331 A1 | 1/2018 | Wang et al. | |
| 2018/0337952 A1 | 11/2018 | Albertson et al. | |

FOREIGN PATENT DOCUMENTS

| | | |
|---|---|---|
| DE | 102014103476 | 9/2014 |
| DE | 102014103482 | 9/2014 |
| EP | 0816968 | 1/1996 |
| EP | 1191463 | 3/2002 |
| EP | 1672527 | 6/2006 |
| EP | 2551799 | 1/2013 |
| EP | 2778914 | 9/2014 |
| EP | 2778977 | 9/2014 |
| EP | 2835745 | 2/2015 |
| EP | 2835770 | 2/2015 |
| EP | 2911078 | 8/2015 |
| EP | 2911079 | 8/2015 |
| GB | 2366498 | 3/2002 |
| GB | 2514239 | 11/2014 |
| GB | 2516155 | 1/2015 |
| WO | WO 2000/009529 | 2/2000 |
| WO | WO 2005/104736 | 11/2005 |
| WO | WO 2008/011728 | 1/2008 |
| WO | WO 2008/064207 | 5/2008 |
| WO | WO 2008/113059 | 9/2008 |
| WO | WO 2009/061501 | 5/2009 |
| WO | WO 2010/000014 | 1/2010 |
| WO | WO 2010/030913 | 3/2010 |
| WO | WO 2011/071833 | 6/2011 |
| WO | WO 2011/161565 | 12/2011 |
| WO | WO 2012/009397 | 1/2012 |
| WO | WO 2013/126281 | 8/2013 |

OTHER PUBLICATIONS

"A First Look: Predicting Market Demand for Food Retail using a Huff Analysis," TRF Policy Solutions, Jul. 2012, pp. 30.

"A Tour of Pinboard," <http://pinboard.in/tour> as printed May 15, 2014 in 6 pages.

"A Word About Banks and the Laundering of Drug Money," Aug. 18, 2012, http://www.golemxiv.co.uk/2012/08/a-word-about-banks-and-the-laundering-of-drug-money/.

Acklen, Laura, "Absolute Beginner's Guide to Microsoft Word 2003," Dec. 24, 2003, pp. 15-18, 34-41, 308-316.

Alfred, Rayner "Summarizing Relational Data Using Semi-Supervised Genetic Algorithm-Based Clustering Techniques", Journal of Computer Science, 2010, vol. 6, No. 7, pp. 775-784.

Ananiev et al., "The New Modality API," http://web.archive.org/web/20061211011958/http://java.sun.com/developer/technicalArticles/J2SE/Desktop/javase6/modality/ Jan. 21, 2006, pp. 8.

Anonymous, "BackTult—JD Edwards One World Version Control System," printed Jul. 23, 2007 in 1 page.

Baker et al., "The Development of a Common Enumeration of Vulnerabilities and Exposures," Presented at the Second International Workshop on Recent Advances in Intrusion Detection, Sep. 7-9, 1999, pp. 35.

Bluttman et al., "Excel Formulas and Functions for Dummies," 2005, Wiley Publishing, Inc., pp. 280, 284-286.

Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.

Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.

Conner, Nancy, "Google Apps: The Missing Manual," May 1, 2008, pp. 15.

Definition "Identify", downloaded Jan. 22, 2015, 1 page.

Definition "Overlay", downloaded Jan. 22, 2015, 1 page.

(56) References Cited

OTHER PUBLICATIONS

Delicious, <http://delicious.com/> as printed May 15, 2014 in 1 page.
Dell Latitude D600 2003, Dell Inc., http://www.dell.com/downloads/global/products/latit/en/spec_latit_d600_en.pdf.
Dou et al., "Ontology Translation on the Semantic Web 2005," Springer-Verlag, Journal on Data Semantics II Lecture Notes in Computer Science, vol. 3350, pp. 35-37.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
"The FASTA Program Package," fasta-36.3.4, Mar. 25, 2011, pp. 29.
Fidge, Colin J., "Timestamps in Message-Passing Systems," K. Raymond (Ed.) Proc. of the 11th Australian Computer Science Conference (ACSC 1988), pp. 56-66.
Geiger, Jonathan G., "Data Quality Management, The Most Critical Initiative You Can Implement", Data Warehousing, Management and Quality, Paper 098-29, SUGI 29, Intelligent Solutions, Inc., Bounder, CO, pp. 14, accessed Oct. 3, 2013.
GIS-NET 3 Public_Department of Regional Planning. Planning & Zoning Information for Unincorporated LA County. Retrieved Oct. 2, 2013 from http://gis.planning.lacounty.gov/GIS-NET3_Public/Viewer.html.
Goswami, Gautam, "Quite Writly Said!," One Brick at a Time, Aug. 21, 2005, pp. 7.
Griffith, Daniel A., "A Generalized Huff Model," Geographical Analysis, Apr. 1982, vol. 14, No. 2, pp. 135-144.
Hansen et al., "Analyzing Social Media Networks with NodeXL: Insights from a Connected World", Chapter 4, pp. 53-67 and Chapter 10, pp. 143-164, published Sep. 2010.
Hibbert et al., "Prediction of Shopping Behavior Using a Huff Model Within a GIS Framework," Healthy Eating in Context, Mar. 18, 2011, pp. 16.
Holliday, JoAnne, "Replicated Database Recovery using Multicast Communication," IEEE 2002, pp. 11.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheetpdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Klemmer et al., "Where Do Web Sites Come From? Capturing and Interacting with Design History," Association for Computing Machinery, CHI 2002, Apr. 20-25, 2002, Minneapolis, MN, pp. 8.
Kokossi et al., "D7-Dynamic Ontoloty Management System (Design)," Information Societies Technology Programme, Jan. 10, 2002, pp. 1-27.
Lamport, "Time, Clocks and the Ordering of Events in a Distributed System," Communications of the ACM, Jul. 1978, vol. 21, No. 7, pp. 558-565.
Lee et al., "A Data Mining and CIDF Based Approach for Detecting Novel and Distributed Intrusions," Lecture Notes in Computer Science, vol. 1907 Nov. 11, 2000, pp. 49-65.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Loeliger, Jon, "Version Control with Git," O'Reilly, May 2009, pp. 330.
Manno et al., "Introducing Collaboration in Single-user Applications through the Centralized Control Architecture," 2010, pp. 10.
Manske, "File Saving Dialogs," <http://www.mozilla.org/editor/ui_specs/FileSaveDialogs.html>, Jan. 20, 1999, pp. 7.
Map of San Jose, CA. Retrieved Oct. 2, 2013 from http://maps.yahoo.com.
Map of San Jose, CA. Retrieved Oct. 2, 2013 from http://maps.bing.com.
Map of San Jose, CA. Retrieved Oct. 2, 2013 from http://maps.google.com.
Mattern, F., "Virtual Time and Global States of Distributed Systems," Cosnard, M., Proc. Workshop on Parallel and Distributed Algorithms, Chateau de Bonas, France:Elsevier, 1989, pp. 215-226.
Microsoft—Developer Network, "Getting Started with VBA in Word 2010," Apr. 2010, <http://msdn.microsoft.com/en-us/library/ff604039%28v-office.14%29.aspx> as printed Apr. 4, 2014 in 17 pages.
Microsoft Office—Visio, "About connecting shapes," <http://office.microsoft.com/en-us/visio-help/about-connecting-shapes-HP085050369.aspx> printed Aug. 4, 2011 in 6 pages.
Microsoft Office—Visio, "Add and glue connectors with the Connector tool," <http://office.microsoft.com/en-us/visio-help/add-and-glue-connectors-with-the-connector-tool-HA010048532.aspx?CTT=1> printed Aug. 4, 2011 in 1 page.
Miklau et al., "Securing History: Privacy and Accountability in Database Systems," 3rd Biennial Conference on Innovative Data Systems Research (CIDR), Jan. 7-10, 2007, Asilomar, California, pp. 387-396.
Morrison et al., "Converting Users to Testers: An Alternative Approach to Load Test Script Creation, Parameterization and Data Corellation," CCSC: Southeastern Conference, JCSC 28, Dec. 2, 2012, pp. 188-196.
Niepert et al., "A Dynamic Ontology for a Dynamic Reference Work", Joint Conference on Digital Libraries, Jun. 17-22, 2007, Vancouver, British Columbia, Canada, pp. 1-10.
Nivas, Tuli, "Test Harness and Script Design Principles for Automated Testing of non-GUI or Web Based Applications," Performance Lab, Jun. 2011, pp. 30-37.
Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.
O'Sullivan, Bryan, "Making Sense of Revision Control Systems," Communications of the ACM, Sep. 2009, vol. 52, No. 9, pp. 57-62.
OWL Web Ontology Language Reference Feb. 2004, W3C, http://www.w3.org/TR/owl-ref/.
Palantir, "Extracting and Transforming Data with Kite," Palantir Technologies, Inc., Copyright 2010, pp. 38.
Palantir, "Kite Data-Integration Process Overview," Palantir Technologies, Inc., Copyright 2010, pp. 48.
Palantir, "Kite Operations," Palantir Technologies, Inc., Copyright 2010, p. 1.
Palantir, "Kite," https://docs.palantir.com/gotham/3.11.1.0/adminreference/datasources.11 printed Aug. 30, 2013 in 2 pages.
Palantir, "The Repository Element," https://docs.palantir.com/gotham/3.11.1.0/dataguide/kite_config_file.04 printed Aug. 30, 2013 in 2 pages.
Palantir, "Write a Kite Configuration File in Eclipse," Palantir Technologies, Inc., Copyright 2010, pp. 2.
Palantir, "Kite Schema," https://docs.palantir.com/gotham/3.11.1.0/dataguide/baggage/KiteSchema.xsd printed Apr. 4, 2014 in 4 pages.
Palermo, Christopher J., "Memorandum," [Disclosure relating to U.S. Appl. No. 13/916,447, filed Jun. 12, 2013, and related applications], Jan. 31, 2014 in 3 pages.

(56) References Cited

OTHER PUBLICATIONS

Palmas et al. "An Edge-Bunding Layout for Interactive Parallel Coordinates" 2014 IEEE Pacific Visualization Symposium, pp. 57-64.
Parker, Jr. et al., "Detection of Mutual Inconsistency in Distributed Systems," IEEE Transactions in Software Engineering, May 1983, vol. SE-9, No. 3, pp. 241-247.
"Potential Money Laundering Warning Signs," snapshot taken 2003, https://web.archive.org/web/20030816090055/http:/finsolinc.com/ANTI-MONEY%20LAUNDERING%20TRAINING%20GUIDES.pdf.
Rouse, Margaret, "OLAP Cube," <http://searchdatamanagement.techtarget.com/definition/OLAP-cube>, Apr. 28, 2012, pp. 16.
Shah, Chintan, "Periodic Connections to Control Server Offer New Way to Detect Botnets," Oct. 24, 2013 in 6 pages, <http://www.blogs.mcafee.com/mcafee-labs/periodic-links-to-control-server-offer-new-way-to-detect-botnets>.
Symantec Corporation, "E-Security Begins with Sound Security Policies," Announcement Symantec, Jun. 14, 2001.
Wiggerts, T.A., "Using Clustering Algorithms in Legacy Systems Remodularization," Reverse Engineering, Proceedings of the Fourth Working Conference, Netherlands, Oct. 6-8, 1997, IEEE Computer Soc., pp. 33-43.
Wollrath et al., "A Distributed Object Model for the Java System," Conference on Object-Oriented Technologies and Systems, Jun. 17-21, 1996, pp. 219-231.
Notice of Allowance for U.S. Appl. No. 13/657,684 dated Mar. 2, 2015.
Notice of Allowance for U.S. Appl. No. 14/139,628 dated Jun. 24, 2015.
Notice of Allowance for U.S. Appl. No. 14/139,640 dated Jun. 17, 2015.
Notice of Allowance for U.S. Appl. No. 14/139,713 dated Jun. 12, 2015.
Notice of Allowance for U.S. Appl. No. 14/264,445 dated May 14, 2015.
Notice of Allowance for U.S. Appl. No. 14/286,485 dated Jul. 29, 2015.
Notice of Allowance for U.S. Appl. No. 14/473,552 dated Jul. 24, 2015.
Notice of Allowance for U.S. Appl. No. 14/473,860 dated Jan. 5, 2015.
Notice of Allowance for U.S. Appl. No. 14/486,991 dated May 1, 2015.
Notice of Allowance for U.S. Appl. No. 14/616,080 dated Apr. 2, 2015.
Notice of Allowance for U.S. Appl. No. 14/684,231 dated Jul. 17, 2017.
Official Communication for European Patent Application No. 14158861.6 dated Jun. 16, 2014.
Official Communication for European Patent Application No. 14158977.0 dated Jun. 10, 2014.
Official Communication for European Patent Application No. 14159464.8 dated Jul. 31, 2014.
Official Communication for European Patent Application No. 14159535.5 dated May 22, 2014.
Official Communication for European Patent Application No. 14180281.9 dated Jan. 26, 2015.
Official Communication for European Patent Application No. 14187996.5 dated Feb. 12, 2015.
Official Communication for European Patent Application No. 15155845.9 dated Oct. 6, 2015.
Official Communication for European Patent Application No. 15156004.2 dated Aug. 24, 2015.
Official Communication for Great Britain Patent Application No. 1404457.2 dated Aug. 14, 2014.
Official Communication for Great Britain Patent Application No. 1404573.6 dated Sep. 10, 2014.
Official Communication for Great Britain Patent Application No. 1408025.3 dated Nov. 6, 2014.
Official Communication for Great Britain Patent Application No. 1411984.6 dated Dec. 22, 2014.
Official Communication for Great Britain Patent Application No. 1413935.6 dated Jan. 27, 2015.
Official Communication for New Zealand Patent Application No. 622389 dated Mar. 20, 2014.
Official Communication for New Zealand Patent Application No. 622404 dated Mar. 20, 2014.
Official Communication for New Zealand Patent Application No. 622484 dated Apr. 2, 2014.
Official Communication for New Zealand Patent Application No. 622513 dated Apr. 3, 2014.
Official Communication for New Zealand Patent Application No. 622517 dated Apr. 3, 2014.
Official Communication for New Zealand Patent Application No. 624557 dated May 14, 2014.
Official Communication for New Zealand Patent Application No. 627962 dated Aug. 5, 2014.
Official Communication for New Zealand Patent Application No. 628161 dated Aug. 25, 2014.
Official Communication for New Zealand Patent Application No. 628263 dated Aug. 12, 2014.
Official Communication for New Zealand Patent Application No. 628495 dated Aug. 19, 2014.
Official Communication for New Zealand Patent Application No. 628585 dated Aug. 26, 2014.
Official Communication for New Zealand Patent Application No. 628840 dated Aug. 28, 2014.
Official Communication for U.S. Appl. No. 13/657,684 dated Aug. 28, 2014.
Official Communication for U.S. Appl. No. 13/949,043 dated May 7, 2015.
Official Communication for U.S. Appl. No. 14/076,385 dated Jun. 2, 2015.
Official Communication for U.S. Appl. No. 14/076,385 dated Jan. 22, 2015.
Official Communication for U.S. Appl. No. 14/156,208 dated Aug. 11, 2015.
Official Communication for U.S. Appl. No. 14/156,208 dated Mar. 9, 2015.
Official Communication for U.S. Appl. No. 14/170,562 dated Jul. 17, 2015.
Official Communication for U.S. Appl. No. 14/170,562 dated Sep. 25, 2014.
Official Communication for U.S. Appl. No. 14/264,445 dated Apr. 17, 2015.
Official Communication for U.S. Appl. No. 14/278,963 dated Jan. 30, 2015.
Official Communication for U.S. Appl. No. 14/280,490 dated Jul. 24, 2014.
Official Communication for U.S. Appl. No. 14/286,485 dated Mar. 12, 2015.
Official Communication for U.S. Appl. No. 14/286,485 dated Apr. 30, 2015.
Official Communication for U.S. Appl. No. 14/289,596 dated Jul. 18, 2014.
Official Communication for U.S. Appl. No. 14/289,596 dated Jan. 26, 2015.
Official Communication for U.S. Appl. No. 14/289,596 dated Apr. 30, 2015.
Official Communication for U.S. Appl. No. 14/289,599 dated Jul. 22, 2014.
Official Communication for U.S. Appl. No. 14/289,599 dated May 29, 2015.
Official Communication for U.S. Appl. No. 14/334,232 dated Jul. 10, 2015.
Official Communication for U.S. Appl. No. 14/449,083 dated Mar. 12, 2015.
Official Communication for U.S. Appl. No. 14/449,083 dated Oct. 2, 2014.
Official Communication for U.S. Appl. No. 14/473,552 dated Feb. 24, 2015.

(56) References Cited

OTHER PUBLICATIONS

Official Communication for U.S. Appl. No. 14/486,991 dated Mar. 10, 2015.
Official Communication for U.S. Appl. No. 14/518,757 dated Dec. 1, 2015.
Official Communication for U.S. Appl. No. 14/518,757 dated Dec. 10, 2014.
Official Communication for U.S. Appl. No. 14/518,757 dated Sep. 19, 2016.
Official Communication for U.S. Appl. No. 14/518,757 dated Apr. 2, 2015.
Official Communication for U.S. Appl. No. 14/518,757 dated Jul. 20, 2015.
Official Communication for U.S. Appl. No. 14/579,752 dated Aug. 19, 2015.
Official Communication for U.S. Appl. No. 14/579,752 dated May 26, 2015.
Official Communication for U.S. Appl. No. 14/639,606 dated May 18, 2015.
Official Communication for U.S. Appl. No. 14/639,606 dated Jul. 24, 2015.
Official Communication for U.S. Appl. No. 14/684,231 dated Jan. 23, 2017.
Official Communication for U.S. Appl. No. 14/684,231 dated Oct. 31, 2016.
Crosby et al., "Efficient Data Structures for Tamper-Evident Logging," Department of Computer Science, Rice University, 2009, pp. 17.
Notice of Allowance for U.S. Appl. No. 14/684,231 dated Nov. 17, 2017.
Official Communication for New Zealand Patent Application No. 622181 dated Mar. 24, 2014.
Official Communication for New Zealand Patent Application No. 628150 dated Aug. 15, 2014.
Official Communication for European Patent Application No. 15155845.9 dated Nov. 9, 2018.
Official Communication for European Patent Application No. 15156004.2 dated Nov. 16, 2018.

* cited by examiner

| Entities | Redact geolocation data? | Redact building identifiers? | Recipients | Anonymous? |
|---|---|---|---|---|
| Entity 1 | No | Yes | Entity 2, Entity 3 | Yes |
| Entity 2 | No | Yes | Entity 3 | No |
| Entity 3 | No | No | Entity 4 | No |
| Entity 4 | Yes | Yes | All | Yes |

DISTRIBUTED WORKFLOW SYSTEM AND DATABASE WITH ACCESS CONTROLS FOR CITY RESILIENCY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims benefit of U.S. Provisional Patent Application Ser. No. 62/020,616 entitled "City Resiliency Data Sharing System" filed Jul. 3, 2014, which is hereby incorporated by reference in its entirety.

CROSS-REFERENCE TO RELATED APPLICATIONS

This application is related to but does not claim priority from U.S. patent application Ser. No. 13/968,265 entitled "Generating Data Clusters With Customizable Analysis Strategies" filed Aug. 15, 2013, and U.S. patent application Ser. No. 13/968,213 entitled "Prioritizing Data Clusters With Customizable Scoring Strategies" filed Aug. 15, 2013, each of which are hereby incorporated by reference in their entireties and collectively referred to herein as the "Cluster references."

This application is related to but does not claim priority from U.S. Pat. No. 8,515,912 entitled "Sharing And Deconflicting Data Changes In A Multimaster Database System" filed Jul. 15, 2010, U.S. Pat. No. 8,527,461 entitled "Cross-ACL Multi-Master Replication" filed Nov. 27, 2012, U.S. patent application Ser. No. 13/076,804 entitled "Cross-Ontology Multi-Master Replication" filed Mar. 31, 2011, U.S. patent application Ser. No. 13/657,684 entitled "Sharing Information Between Nexuses That Use Different Classification Schemes For Information Access Control" filed Oct. 22, 2012, and U.S. patent application Ser. No. 13/922, 437 entitled "System And Method For Incrementally Replicating Investigative Analysis Data" filed Jun. 20, 2013, each of which are hereby incorporated by reference in their entireties and collectively referred to herein as the "Sharing references."

This application is related to but does not claim priority from U.S. Pat. No. 8,489,623 entitled "Creating Data In A Data Store Using A Dynamic Ontology" filed May 12, 2011, which is hereby incorporated by reference in its entirety and referred to herein as the "Ontology reference."

This application is related to but does not claim priority from U.S. patent application Ser. No. 14/223,918 entitled "Verifiable Redactable Audit Log" filed Mar. 24, 2014, which is hereby incorporated by reference in its entirety and referred to herein as the "Audit reference."

This application is related to but does not claim priority from U.S. Provisional Patent Application Ser. No. 61/863, 792 entitled "Cable Reader Labeling" filed Aug. 8, 2013, U.S. patent application Ser. No. 14/332,312 entitled "Cable Reader Labeling" filed Jul. 15, 2014, U.S. Provisional Patent Application Ser. No. 61/863,814 entitled "Cable Reader Snippets and Postboard" filed Aug. 8, 2013, and U.S. patent application Ser. No. 14/332,306 entitled "Cable Reader Snippets and Postboard" filed Jul. 15, 2014, each of which are hereby incorporated by reference in their entireties and collectively referred to herein as the "Reader references."

This application is related to but does not claim priority from U.S. patent application Ser. No. 13/917,571 entitled "Interactive Geospatial Map" filed Jun. 13, 2013, which is hereby incorporated by reference in its entirety and referred to herein as the "Map reference."

This application is related to but does not claim priority from U.S. Pat. No. 9,009,827 entitled "Security Sharing System" filed May 16, 2014, and U.S. patent application Ser. No. 14/518,757 entitled "Healthcare Fraud Sharing System" filed Oct. 20, 2014, which are hereby incorporated by reference in their entireties.

BACKGROUND

In the area of computer-based platforms, information about cities may be collected, analyzed, and used to make cities more resilient.

SUMMARY

The systems, methods, and devices described herein each have several aspects, no single one of which is solely responsible for its desirable attributes. Without limiting the scope of this disclosure, several non-limiting features will now be discussed briefly.

In some embodiments, a system comprises one or more computing devices programmed, via executable code instructions. When executed, the executable code instructions may cause the system to receive resilience data from each of a plurality of entities associated with respective municipalities, each entity comprising at least one computing system. The resilience data from the plurality of entities may include electronic documents regarding actual or potential natural disasters associated with respective municipalities. The resilience data may include first resilience data comprising a first electronic document including information regarding an actual or potential natural disaster associated with a first municipality. The resilience data may further include second resilience data comprising a second electronic document including information regarding an actual or potential natural disaster associated with a second municipality. When further executed, the executable code instructions may cause the system to receive a search keyword from a third entity associated with a third municipality. The search keyword may be received via an interactive user interface displayed on a computer display of the third entity. The interactive user interface may include a reader user interface having: a search area configured to receive search criteria including the search keyword; a results area configured to display summary information regarding any electronic documents of the resilience data matching the search criteria; and a data preview area configured to display at least a portion of an electronic document selected in the results area. When further executed, the executable code instructions may cause the system to search the resilience data, including the first resilience data and the second resilience data, for resilience data including the search keyword. When further executed, the executable code instructions may cause the system to, in response to determining that the first electronic document includes the search keyword, initiate update of the reader user interface to display first summary information regarding the first electronic document in the results area. When further executed, the executable code instructions may cause the system to determine a plurality of attribute values of the first electronic document. The attribute values may include one or more of: author attributes; recipient attributes; named attributes; and/or geolocation attributes. When further executed, the executable code instructions may cause the system to identify respective person objects associated with any identified author attribute values, recipient attribute values, and named attribute values of the first electronic document. When further executed, the executable code instructions may cause the system to initiate update of the interactive user interface to display a clustering user interface. The clustering user interface may display: a document icon representing the first electronic document; one or more person icons each representing corresponding person objects identified as associated with the first electronic document; one or more association lines between pairs of respective person icons and the document icon; and/or textual or graphical indicia associated with each association line indicating respective associations between respect person objects and the first electronic document. The textual or graphical indicia may indicate the person object is at least one of: an author, recipient, or named in the first electronic document. When further executed, the executable code instructions may cause the system to initiate update of the interactive user interface to display an interactive map user interface displaying: a geographic map; and/or graphical indicia of one or more geolocation attribute values associated with the first electronic document.

In some embodiments, a system comprises one or more computing devices programmed, via executable code instructions. When executed, the executable code instructions may cause the system to communicate with a plurality of entities, wherein each entity of the plurality of entities is associated with a municipality, and wherein each entity comprises a network of computing devices. When executed, the executable code instructions may cause the system to receive first resilience data from a first entity of the plurality of entities, the first resilience data comprising information associated with a first municipality and a potential acute shock or chronic stress associated with the first municipality, the first resilience data further comprising a first electronic document. When executed, the executable code instructions may cause the system to receive a search keyword. When executed, the executable code instructions may cause the system to search a plurality of municipality data, the plurality of resilience data comprising the first resilience data, using the search keyword to identify the first electronic document. When executed, the executable code instructions may cause the system to cause presentation on an electronic display, of the first resilience data and the first electronic document in a reader view, the reader view presenting at least some of the first electronic document in the electronic display. When executed, the executable code instructions may cause the system to determine an association between the first electronic document and a person object where a property value of the first electronic document matches a data value of the person object, wherein the property value comprises at least one of: an author, text data, editor, or recipient. When executed, the executable code instructions may cause the system to cause presentation of representations of the first electronic document, the person object, and the association between the electronic document and the person object in a second view, wherein the second view represents at least one of: an author, presence in, contributor, editing, or recipient relationship between the person object and the electronic document.

BRIEF DESCRIPTION OF THE DRAWINGS

Certain aspects of the disclosure will become more readily appreciated as those aspects become better understood by reference to the following detailed description, when taken in conjunction with the accompanying drawings.

FIG. 5B illustrates an example city resiliency sharing and/or redaction rules, according to some embodiments of the present disclosure.

DETAILED DESCRIPTION

Figure 1:
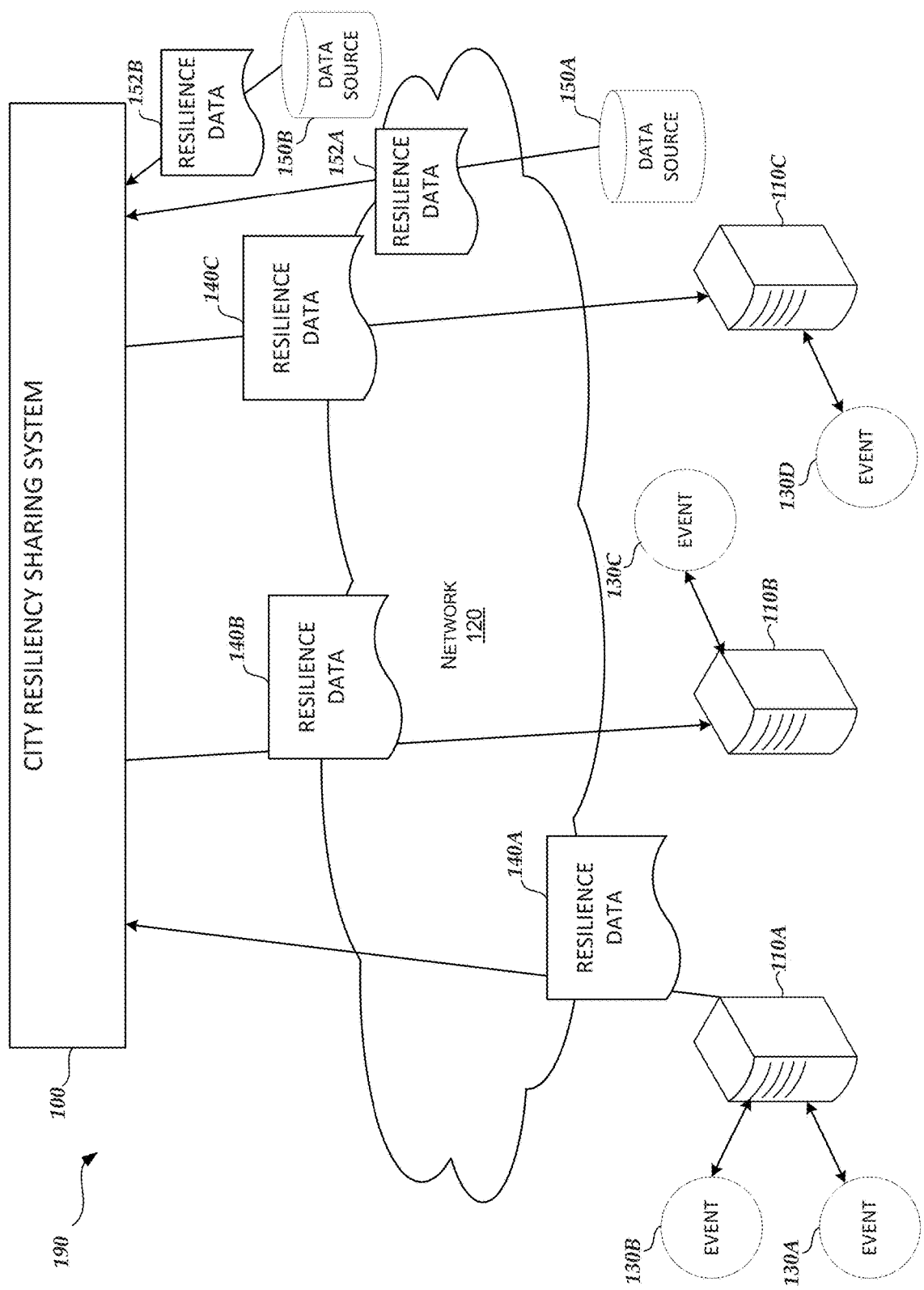
FIG. 1 is a block diagram illustrating an example city resiliency sharing system, according to some embodiments of the present disclosure.

Disclosed herein are systems for automating processes of identifying related resiliency information between multiple municipalities (referred to as "cities" herein, which also applies to any other municipality or group of individuals) by executing algorithms for analysis of databases of information from various resources and providing information to analysts that enables quick access to strategies and/or documentation regarding relevant resilience data, as well as information on individuals involved in planning resilience efforts in other municipalities that can be contacted to obtain even more assistance in planning efforts.

In one embodiment, a resilience sharing system implements a workflow process for analyst to review, visualize, and investigate the city resiliency information, and/or detection strategies among multiple entities. Using the techniques and systems described herein, city resiliency threats, shocks, and/or stressors may be addressed more preemptively and/or efficiently by utilizing more information and/or analysis from other entities. Those techniques and systems may comprise automatic and/or in an ad hoc manner sharing city resiliency information and/or generic strategies to combat city resiliency threats. Sharing of city resiliency data may prevent, reduce, and/or mitigate the threat of natural disasters, city violence and/or crime, climate change, transportation issues, etc. Furthermore, the city resiliency sharing system may enable users of the system to quickly analyze and/or process city resiliency information from multiple distributed participants to develop city resiliency strategies. For example, an analyst may be able to review or send resilience data in a reader view, analyze relationships among resilience data objects in a clustering view, and/or interact with resilience data in an interactive map.

Many cities have large amounts of data (hundreds of gigabytes, for example) relevant to indicators and/or aspects of city resiliency. However, many entities are unable to synthesize such data into actionable information due to lack of communication. For example, intra-city cooperation may be difficult when data sources are siloed within individual departments. Yet another example is the difficulty of inter-city collaboration due to technological barriers to sharing, data sensitivities, and/or regulations.

The city resiliency sharing system disclosed herein enables participating organizations to exchange critical information and/or context about emerging city resiliency threats in real or near time, subject to highly granular access controls and/or automatic redaction of sensitive data. In some embodiments, secure sharing may be achieved through secure communication protocols (e.g., one or more encryption standards and/or protocols), access controls, access control lists, and/or the redaction of data. In some embodiments, entities can participate in the city resiliency sharing system in multiple ways by sharing only what they are willing to share. For example, in addition to full data sharing, entities can share partial subsets of their data, or receive but not share data. In the example, participating entities specified exactly how they will participate in the city resiliency sharing system: what data they share, what conditions govern data transmission, and what access controls govern entity and/or individual users' data access. The secure sharing of data may enable compliancy with laws governing the handling of personal data. Participating organizations may instantly gain access to real or near time feeds and/or intelligence, which are shared and enriched by participants across multiple industries and/or geographic boundaries. With the city resiliency sharing system, participating organizations may collaboratively improve situational awareness, obtain a comprehensive understanding of threats facing their cities. In some embodiments, the city resiliency sharing system may provide a full suite of data integration and analytical capabilities that allow organizations to quickly pivot from city resiliency identification to incident response and mitigation, all within the same platform.

Aspects of city resiliency, which may be shared as city resiliency data and/or generic strategies by the city resiliency sharing system as described herein, are described in further detail in Jo da Silva & Braulio Morera, Arup, City Resilience Framework (2014), which is hereby incorporated by reference in its entirety and is made a part of this specification. The city resiliency sharing system described herein may allow entities to evaluate and optimize one or more of the following indicators and/or aspects of a resilient city (as described in City Resilience Framework): minimal human vulnerability such as meeting the basic needs of the residents of a city; diverse livelihoods and employment; adequate safeguards to human life and health; strong community networks; social stability and security such as law enforcement, crime prevention, and/or emergency services; availability of financial resources and/or contingency funds; reduced physical exposure and vulnerability such as environmental stewardship, appropriate infrastructure and buildings, effective land use planning, and/or the enforcement of planning regulations; reliable communication networks, and integrated development planning.

Sharing city resiliency information may allow for distributive and/or efficient responses to city resiliency threats, shocks, and/or stressors. As used herein, an "entity" may refer to an institution, organization, local government, city, municipality, territory, federal government, and/or departments thereof. Thus, entities may share city resiliency information automatically and/or in an ad hoc manner to improve resiliency. The city resiliency sharing system may modify city resiliency data to redact confidential, personal, and/or sensitive information for sharing with other entities.

As used herein, "resilience data" may refer to any data that can be shared among entities to improve resiliency. For example, resilience data may be used to improve the resiliency of a city, municipality, territory, jurisdiction, and/or country. Non-limiting examples of resilience data include building data, electronic communications, electronic documents, maps, and/or any other data associated with resiliency of a city, municipality, territory, jurisdiction, and/or country. The resilience data may be in various formats, such as a database format, files, XML, JSON, a file format that is proprietary to the city resiliency sharing system 100, data object format, or any other format, and may be encrypted or have resilience data of any available type.

In some embodiments, the suite of data integration and analytical capabilities of the city resiliency sharing system may allow an analyst to analyze the resilience data and/or to develop long-term city resiliency strategies. For example, the city resiliency sharing system may include a user interface displaying a city map with heat map data, received from one or more entities, regarding building information and/or crime statistics to allow a user to perform city resiliency analyses. In some embodiments, map data may be displayed and/or interactive maps may be presented. In some embodiments, displaying map data and/or presenting interactive maps by the systems, methods, and/or techniques disclosed in the Map reference. The city resiliency sharing system may include a user interface for displaying clusters of resilience data and/or generic strategies. In some embodiments, city resiliency data and/or strategies may be clustered and/or displayed by the systems, methods, and/or techniques disclosed in the Cluster references. In some embodiments, resilience data may be displayed and/or consumed via a reader user interface. In some embodiments, a reader may be implemented and/or resilience data may be displayed by the systems, methods, and/or techniques disclosed in the Reader references. In some embodiments, the city resiliency sharing system may use, receive, and/or share city or socioeconomic related data from data sources separate and/or distinct from the entities of the city resiliency sharing system. For example, the city resiliency sharing system may allow a user to predict the socioeconomic impact of a flood. Thus, the city resiliency sharing system may allow organizations to proactively detect, investigate, and prevent city resiliency.

Sharing of generic strategies through the city resiliency sharing system may efficiently combat city resiliency threats. In some embodiments, a generic strategy may be determined and updated by machine learning software that analysis related resiliency data and/or generated by human analysts or any participating entity and provided to the city resiliency sharing system for use by other participating entities. In some embodiments, a generic strategy may be generated by the city resiliency sharing system following a disaster and/or event against any entity and/or city using the system. A generic strategy may differ from a specific city resiliency event by comprising more abstract characteristics of a city resiliency event that may be used to proactively detect other city resiliency events and/or threats. The generic strategies may be configured to be executed, enabled, and/or implemented on other entities and/or computing systems to defend against and/or combat city resiliency threats from being perpetuated.

Example System Overview

FIG. 1 illustrates an example city resiliency sharing environment 190, according to some embodiments of the present disclosure. In the example embodiment of FIG. 1, the city resiliency sharing environment 190 comprises a network 120, a city resiliency sharing system 100, one or more city resiliency events 130 (including city resiliency events 130A, 130B, 130C, and 130D in the example of FIG. 1), one or more entities 110 (including entities 110A, 110B, and 110C in the example of FIG. 1), and resilience data 140 (including resilience data 140A, 140B, and 140C). The network 120 may comprise, but is not limited to, one or more local area networks, secure networks, wide area network, wireless local area network, wireless wide area network, the Internet, or any combination thereof. The city resiliency sharing system 100 may share resilience data and/or strategies (not illustrated) with one or more entities 110. In some embodiments, user may share resilience data with city resiliency sharing system 100 via mobile computing devices, such as tablets or smartphones, for example.

A city event 130 may include a weather event, disease event, crime event, disaster, and/or any event that may affect a city. As used herein, a "city event" may refer to an acute shock and/or major event such as an earthquake, flood, emergency, terrorist attack, a sharp and/or sudden event that threatens a municipality, for example. Example acute shocks include natural disasters such as, but not limited to, hurricanes, earthquakes, tornadoes, volcanic eruptions, tsunamis, floods, wildfires, droughts, avalanches, or landslides. Additionally or alternatively, as used herein, a "city event' may refer to chronic stresses such as long-term unemployment or poverty, an inefficient public transportation system, endemic violence, water shortage, or any event(s) that weaken a municipality on a day-to-day and/or cyclical basis, for example. Resilience data 140 may include, but is not limited to electronic communications, electronic documents, city reports, building data, etc. for city resiliency.

In some embodiments, such as the example embodiment of FIG. 1, the city resiliency sharing environment 190 further comprises one or more data sources 150 (including data sources 150A and 150B) and one or more resilience data 152 (including resilience data 152A and 152B). As used herein, a "data source" may refer to an entity 110, a source of information that is proprietary and/or local to an entity, and/or a non-entity source of information, such as, but not limited to, a public website, public vendor, and/or private vendor of information. Data sources 150 may include open source information and/or data. Example data sources and/or open source information include police department data sources (such as Calls for Service, Electronic Police Reports, Field Information Cards, and Case Management Systems, etc.); Emergency Medical Services data sources; hospital, shelter, and school locations; geological information such as liquefaction; critical infrastructure mapping data; mobility and transit data; public works in construction projects information; map layer data; data regarding streetlight and/or liquor store locations; insurance claim data; and/or energy data such as gas, oil, and/or electricity supplies. In some embodiments, weighting data may be associated with the data sources, such that the weightings are indicative of a reliability of city related data from the respective data sources.

The entities 110 may comprise one or more computing devices. Example entities 110 includes cities, institutions, organizations, local governments, the federal government, and/or departments or agencies thereof. For example, city resiliency sharing system 100 may enable intra-resilience data sharing and/or collaboration. In the intra-city example, departments, agencies, and/or other institutions may use system 100 within a city to eliminate data silos, facilitate data sharing, and/or enhance collaboration. Employees and/or analysts across the city can contribute to and/or leverage system 100 as a knowledge repository and/or workflow system for the city. Additionally or alternatively, city resiliency sharing system 100 may enable inter-resilience data sharing and/or collaboration. For example, entities 130 (that are cities) within system 100 may collaborate to create a shared and/or centralized hub for powerful data analysis across the entities and are cities. The cities may exchange critical information, best practices, and/or strategies in near time to address emerging trends and/or threats to cities to improve city resiliency.

The city resiliency sharing system 100 may operate as a single instance, client server system, or as a distributed system. For example, there may be multiple instances of the city resiliency sharing system 100 running simultaneously that communicate through the network 120, such as on computing systems of each of the entities 110. In some embodiments, each city resiliency sharing system instance operates independently and/or autonomously. In some embodiments, there is a central server of the city resiliency sharing system 100 and individual clients of the city resiliency sharing system communicate with the central server via the network 120. In the central server example, the central server may contain and/or store open source data. Each participant of the city resiliency sharing system 100 may communicate with other participants and/or the central server.

Example Resilience Data Sharing Processes

Figure 2:
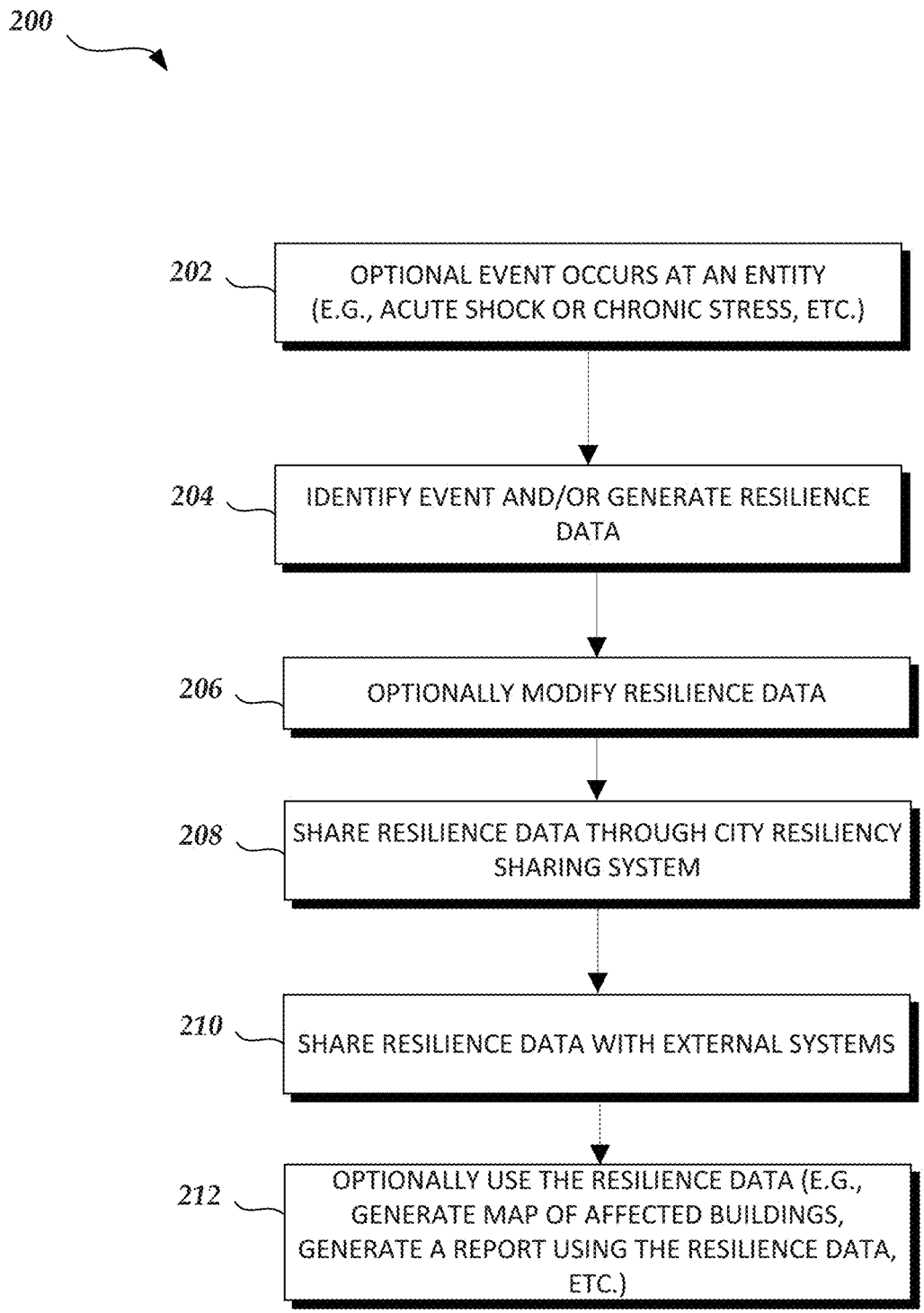
FIG. 2 is a flowchart illustrating an example resilience data sharing process, according to some embodiments of the present disclosure.

FIG. 2 is a flowchart illustrating a resilience data sharing process, according to some embodiments of the present disclosure. Example method 200 of FIG. 2 may be performed by the city resiliency sharing system and/or one or more entities discussed about with reference to FIG. 1. Depending on the embodiment, the method of FIG. 2 may include fewer or additional blocks and/or the blocks may be performed in order different than is illustrated.

Beginning in block 202, an event occurs at one of the entities 110. As noted above, various activities may be considered events on an entity 110. Non-limiting examples of events include a major disaster such as an earthquake a flood, new legislation regarding building safety, and/or building inspections.

At block 204, the event is identified and/or resilience data is generated and/or accessed. For example, a draft of a legislative document or form data from a building inspection may be generated, which can be shared via city resiliency sharing system 100 as resilience data. In some embodiments, the event may be identified automatically or the event may be identified by a human analyst, such as a city resiliency analyst. In some embodiments, events are initially detected and/or flagged by one or more systems and/or processes and then a human analyst confirms the detected event before the resilience data is shared, such as according to the process described below. Additionally or alternatively, a city resiliency analyst may indicate resilience data, such as one or more resilience data objects, to be shared via city resiliency sharing system 100 (e.g. FIGS. 7 and 10).

In some embodiments, identification of events occurs by the systems, methods, and/or techniques disclosed in the Cluster references. For example, resilience data objects, events, documents, and/or communications may be clustered as illustrated by U.S. patent application Ser. No. 13/968,265. A human analyst may then view and analyze the cluster of related resilience data objects, events, documents, and/or communications. Clusters of resilience data objects may also receive rankings and/or scorings as illustrated by U.S. patent application Ser. No. 13/968,213.

In some embodiments, resilience data, documents, communications, strategies, and/or other city resiliency information may be data objects that are stored and associated with other data objects in data structures similar to those disclosed in the Ontology reference. For example, resilience data, documents, communications, strategies, and/or other city resiliency information may be included in data objects that are included in an ontology, which may be shared with other entities across the city resiliency sharing system and/or the data objects remain uniform across the entities they are shared with. In other words, the city resiliency sharing system may support a unified data object ontology. Additionally, each entity may support its own data object model and/or ontology that is different from its peer entities. In some embodiments, an ontology may provide a consistent view of resilience data across multiple entities. Another benefit of a unified data object ontology is to prevent duplicate and/or conflicting copies of data objects, and/or to allow for easy de-duplication of data objects.

At block 306, the resilience data may be optionally modified for sharing. For example, information regarding building data, employee information, account numbers, or personal information, such as social security numbers, may be removed from the resilience data before it is shared with the city resiliency sharing system 100. The entity 110 may remove and/or modify data regarding the event and/or the city resiliency sharing system 100 may remove and/or modify data regarding the event once received from the entity 110 (e.g., as discussed below in block 208).

In some embodiments, the city resiliency sharing system 100 uses access control lists and/or sharing rules to share, redact, and/or modify the resilience data. Additional information regarding the sharing, redaction, and/or modify of resilience data is discussed in further detail with reference to FIGS. 3, 4, and 5A-5B.

Next, at block 208, the resilience data may be provided by the entity 110 to the city resiliency sharing system 100, such as via the network 120 of FIG. 1. Depending on the embodiment, the resilience data may be shared in various manners, such as via a shared network location that stores the resilience data, a direct communication via an email or HTTP communication, or in any other manner. The resilience data may be in various formats, such as a database format, files, XML, JSON, a file format that is proprietary to the city resiliency sharing system 100, data object format, or any other format, and may be encrypted or have resilience data of any available type.

In some embodiments, sharing of resilience data occurs by the systems, methods, and/or techniques disclosed in the Sharing references. For example, resilience data may be shared and/or deconflicted through a replicated database system as illustrated by U.S. Pat. No. 8,515,912, thereby preventing duplicate and/or conflicting copies of data. Resilience data and/or strategies may also be shared through a database system with multiple ontologies as illustrated by U.S. patent application Ser. No. 13/076,804. The sharing of resilience data and/or strategies may also occur via incremental database replication as illustrated by U.S. patent application Ser. No. 13/922,437.

In some embodiments, secure sharing through audited activity logs occurs by the systems, methods, and/or techniques disclosed in the Audit reference. For example, sharing activity may be stored in cryptographically immutable audit logs that can be quickly analyzed for suspicious user behavior.

At block 210, the resilience data that is received at the city resiliency sharing system 100 is wholly or partially shared with one or more entities 110. For example, if the resilience data is received from entity 110A, the city resiliency sharing system 100 may share the resilience data to entities 110B, 110C, and/or external systems, such as in accordance with sharing preferences of the entities. For example, the sharing preferences and/or access control lists of entity 110A may determine the entities and/or users that are permitted to receive the respective resilience data. In some embodiments, the sharing preferences and/or access control lists of entities 110B, and/or 110C determine which resilience data the respective entities receive, for example.

At block 212, the resilience data may be optionally used by the entities with which the resilience data is shared. For example, the resilience data may be used to proactively detect and/or hopefully prevent similar shocks and/or stresses on a city. Other examples include allowing a human analyst to contact the author of a report shared through system 100, generate a map of buildings that have a high risk of being structurally unsafe, and/or create a report using the shared resilience data.

Access Control/Modifying Resilience Data and/or Strategies

Figure 3:
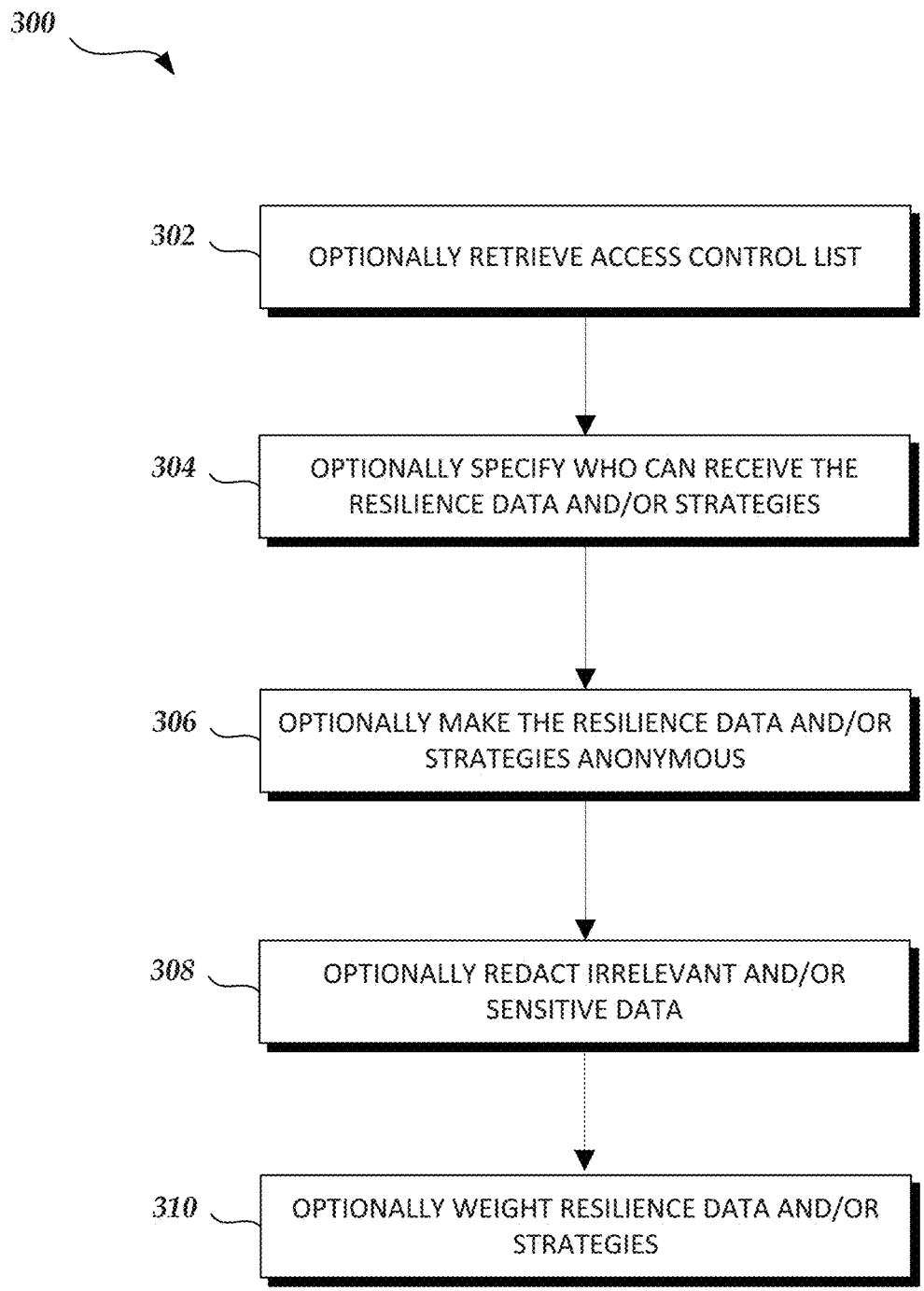
FIG. 3 is a flowchart illustrating an example modification and/or access control process for resilience data and/or strategies, according to some embodiments of the present disclosure.

FIG. 3 is a flowchart illustrating a modification and/or access control process for resilience data and/or strategies, according to some embodiments of the present disclosure. Example method 300 of FIG. 3 may be performed in whole, or in part, as part of block 206 of FIG. 2 and/or block 1208 of FIG. 12. Depending on the embodiment, the method of FIG. 3 may include fewer or additional blocks and/or the blocks may be performed in order that is different than illustrated.

At block 302, city resiliency sharing system 100 optionally retrieves an access control list. In some embodiments, an access control list may be associated with a resilience data item and/or strategy. For example, the access control list may indicate entities and/or users that are permitted to receive and/or to view the respective resilience data item and/or strategy, which is described in further detail with reference to block 304.

At block 304, recipients may be specified for resilience data and/or strategies. For example, an entity may only want to send resilience data to other entities it has close relationships with or entities in a particular vertical market or having other attributes. Therefore, the entity may specify one or more criteria for entities with which resilience data and/or strategies may be shared with through the city resiliency sharing system 100. The sharing data may be provided in any available format, and may apply to sharing of resilience data and/or strategy data from the entity that provides the sharing data. In some embodiments, a human analyst approves and/or select the recipients of resilience data and/or strategies. As described herein, the access control lists may specify recipients such as entities and/or users permitted to receive and/or view resilience data and/or strategies.

In some embodiments, access controls for replicating resilience data and/or strategies at block 304 occurs by the systems, methods, and/or techniques disclosed in the Sharing references. For example, asynchronous replication of resilience data and/or strategies occur via access control lists that are described in further detail in U.S. Pat. No. 8,527,461 and in with reference to FIG. 5A. Replication of resilience data and/or strategies may occur where databases use different classification schemes for information access control as illustrated by U.S. patent application Ser. No. 13/657,684.

At block 306, resilience data and/or strategies may be made anonymous. For example, resilience data and/or strategies may comprise the source entity of the resilience data and/or strategies. Thus, an entity may specify whether the sharing resilience data and/or strategies should be anonymous. In some embodiments, there is a global setting and/or configuration for specifying anonymity. There may be a configurable setting enabling anonymity for some recipients but not others. In some embodiments, a human may approve or specify (or an access control list may specify) anonymity for each resilience data item and/or city that is shared.

At block 308, irrelevant and/or sensitive data may be redacted from resilience data and/or strategies. For example, resilience data may initially comprise sensitive building data such as building identifiers and/or geolocation data. Other example resilience data includes personal information, such as, but not limited to, social security numbers, health records, names, birthdates, addresses, etc. An entity may not want to and/or be legally prohibited from sharing such information. An entity may redact and/or remove particular information. Thus, redaction, removal, and/or de-identification may allow an entity to be in compliance with applicable laws and/or regulations. Removal of sensitive information and/or entity specific information, such as internal identifiers, from resilience data, may abstract the resilience data to increase usability by other entities. In some embodiments, redaction of resilience data and/or strategies is automatic, manual, or some combination thereof. For example, there may be a configurable list of fields, such as, name, account number, etc., to be removed from resilience data and/or strategies. For example, access control lists may indicate resilience data and/or strategies that are to be redacted. Redaction may require approval by a human analyst. In some embodiments, redaction of resilience data and/or strategies may be performed by a human analyst.

At block 408, resilience data and/or strategies may be weighted differently such as based on the entity that provides the resilience data or strategy (e.g., some entities may be more reliable providing resilience data than others) or based on the type of event identified in the resilience data or strategy set, and/or other factors. For example, if resilience data indicates a high risk associated with the event, city resiliency sharing system 100 may assign a high weighting to the resilience data. However, if the reported event is minor and/or from an entity that commonly misreports events, a lower weighting may be assigned to the resilience data, such that sharing of the resilience data doesn't introduce false event alerts in other entities. Thus, in some embodiments, city resiliency sharing system 100 tracks the accuracy, reliability, and/or trustworthiness of reported events and/or data from respective entities and automatically applies weightings and/or prioritizations to future reports from those entities based on the determined accuracy.

The weightings may be assigned manually and/or automatically. For example, in some embodiments a human analyst specifies whether resilience data and/or strategies are important. These weightings may change over time, as the events themselves evolve.

From the perspective of a receiving entity, resilience data and/or strategies may be optionally weighed differently. Thus, if an entity values resilience data and/or strategies from a different entity highly, the entity may set a high level of priority for anything received from that different entity.

Sharing Resilience Data and/or Strategies

Figure 4A:
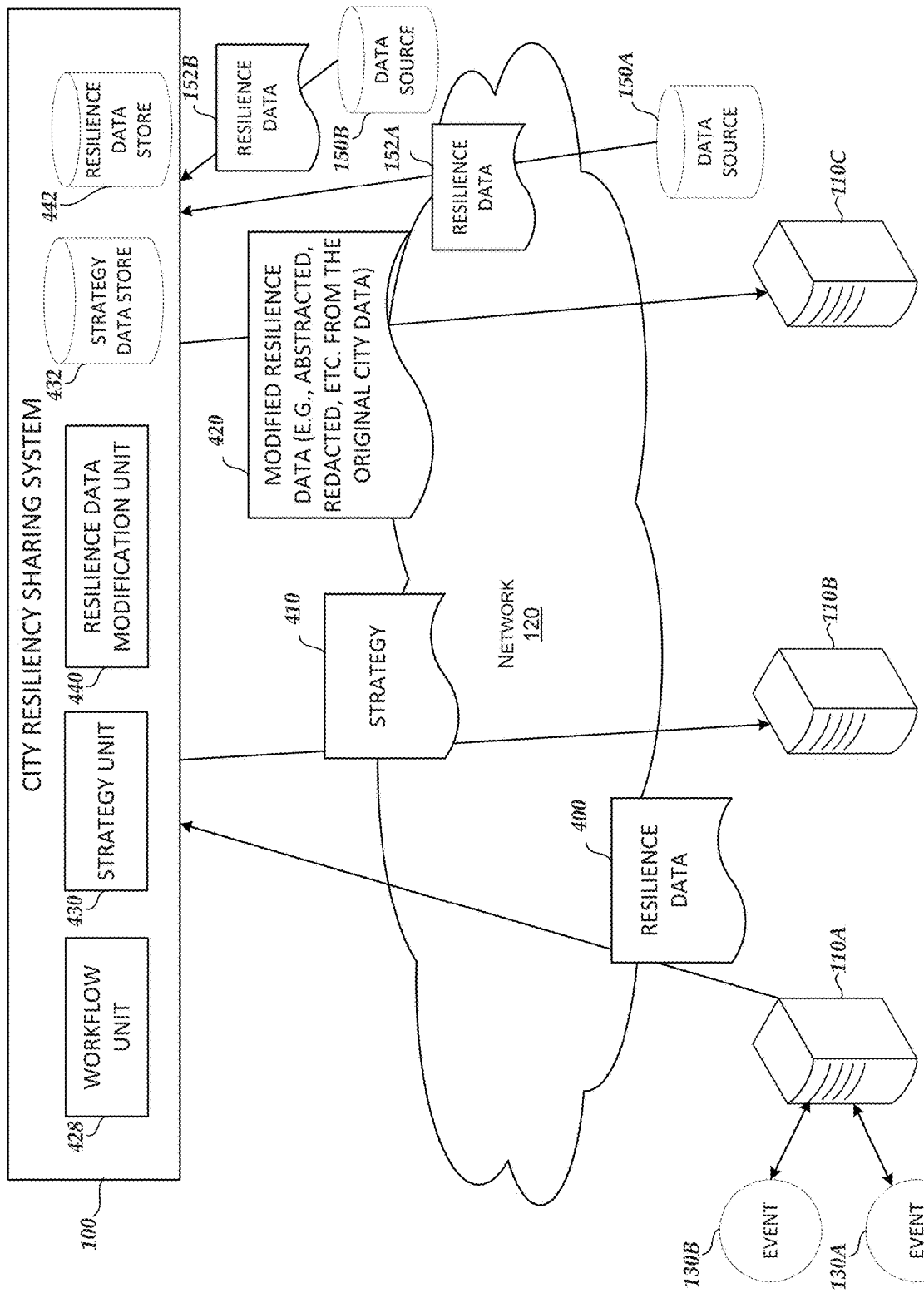
FIG. 4A is a block diagram illustrating an example city resiliency sharing system sharing resilience data, strategies, and/or modified resilience data, according to some embodiments of the present disclosure.

FIG. 4A illustrates a city resiliency sharing system sharing resilience data, strategies, and/or modified resilience data, or subsets thereof, according to some embodiments of the present disclosure. In accordance with some embodiments of the present disclosure, the city resiliency system 100 may comprise a workflow unit 428, strategy unit 430, a resilience data modification unit 440, a strategy data store 432, and/or a resilience data store 442.

As shown in the example of FIG. 4A, events 130A and 130B occurred at entity 110A. In this example, entity 110A or a user at entity 110A upon identifying the one or more events (see, e.g., FIG. 2), may send resilience data 400 (such as building data, a communication, or a report) to the city resiliency sharing system 100 through the network 120. In some embodiments, the city resiliency sharing system 100 automatically collects resilience data from an event.

In this example, city resiliency sharing system 100 generates a strategy 410 and/or modified resilience data 420 based on the resilience data 400 corresponding to the one or more events 130, such as by any one or more processes discussed with reference to FIGS. 2, 11, and/or 12. For example, the multiple events 130A and 130B illustrated in FIG. 4A may be associated with building structural integrity issues at the entity 110A. Strategy 510 may be generated and/or output to other entities by the strategy unit 430. The strategy unit 430 may be stored in the strategy data store 432. The modified resilience data 420 may be generated and/or output to other entities by the resilience data modification unit 440. The modified resilience data 420 may be stored in the resilience data store 442. For example, the modified resilience data may include building data and/or reports regarding best practices on building inspection procedures. The modified resilience data 420 may differ from the resilience data 400 by not having data regarding particular building identifiers and/or geolocation identifiers in the original resilience data 400. As illustrated in FIG. 4A, city resiliency sharing system 100 shares strategy 410 with another entity 110B through the network 120 and the modified resilience data 420 with another entity 110C. The entities 110B and 110C may change, update, modify, etc., their city resiliency measures based on the strategy 410 or modified resilience data 420, respectively.

In some embodiments, city resiliency sharing system 100 may be able to automatically generate strategies based on one or more events. Strategies may be automatically output by strategy unit 430. For example, the strategy unit 430 may take as input data regarding events and automatically generate a strategy from patterns recognized in the data.

In some embodiments, a human analyst and/or a team of analysts may review patterns from the one or more events to generate a strategy. City resiliency sharing system 100 may provide user interface tools to humans for analyzing events and/or creating strategies (e.g., FIGS. 7, 8A-8B, 9, 10, and 14). For example, a strategy may be viewed and executed within a clustering view interface, which is described further in detail with respect to FIG. 14. In some embodiments, a team of analysts may review documents, communications, and/or resilience data from multiple entities of city resiliency sharing system 100. The analysts may conceive and/or generate strategies to share them with entities through city resiliency sharing system 100.

In some embodiments, strategies may be generated by entities and shared through city resiliency sharing system 100. For example, strategy unit 430 may receive strategies from entities for distribution to other entities through city resiliency sharing system 100.

The shared resilience data and/or strategy may be modified by the entity 110A and/or the city resiliency sharing system 100, such as by any one or more processes discussed with reference to FIGS. 2, 3, and 12. Modification by the resilience data modification unit 340 and/or storage in resilience data store 442 may achieve some of the goals and/or advantages illustrated in FIG. 4A.

Figure 4B:
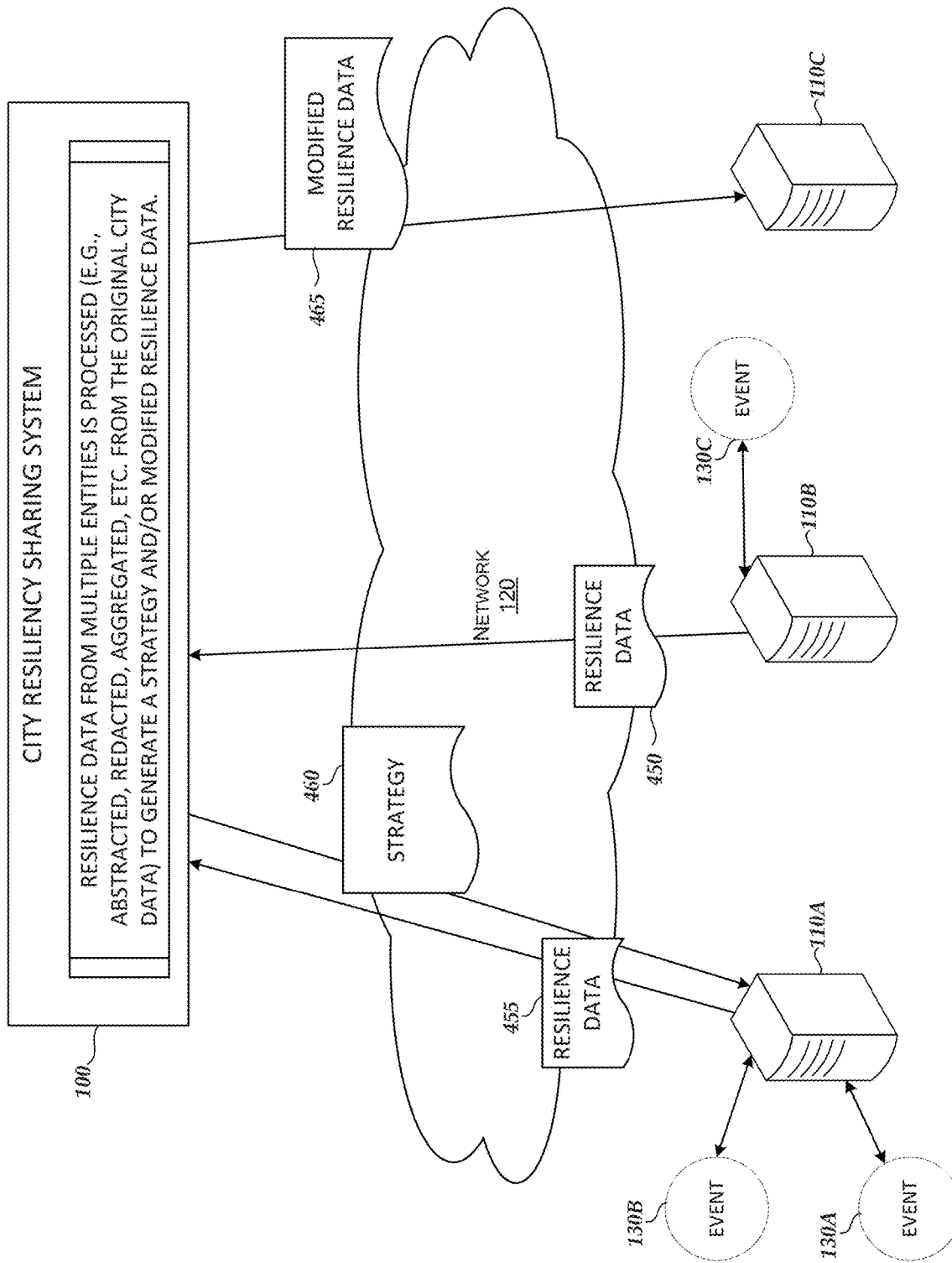
FIG. 4B is a block diagram illustrating another example city resiliency sharing system sharing resilience data, strategies, and/or modified resilience data, according to some embodiments of the present disclosure.

Sharing Resilience Data and/or Strategies from Multiple and/or Different Entities FIG. 4B is a block diagram illustrating another example city resiliency sharing system sharing resilience data, strategies, and/or modified resilience data that has been received from and/or determined based on information from multiple and/or different entities, according to some embodiments of the present disclosure. As shown in the example of FIG. 4B, the entity 110A has received one or more events 130A and 130B and the entity 110B has received one city event 130C (although an event, as used herein, may include one or any number of city activities, shocks, and/or stressors).

In this embodiment, the entity 110B, upon identifying the one or more events (see, e.g., FIG. 2), may send resilience data 450 to city resiliency sharing system 100 through the network 120. Similar to entity 110B, entity 110A may send resilience data 455, including information regarding events 130A and 130B to city resiliency sharing system 100. In this example, city resiliency sharing system 100 generates a strategy 460 based on the resilience data 455 from entity 110A and the resilience data 450 from entity 110B. For example, the multiple events illustrated in FIG. 4B may be associated with building data, such as building inspection data, reports, and/or communications.

Strategy generation and/or sharing in FIG. 4B may be similar to FIG. 4A.

City resiliency sharing system 100 may process the resilience data from different entities to share strategies, resilience data, and/or modified resilience data. In FIG. 4B, city resiliency sharing system 100 shares modified resilience data 465 with entity 110C, which may not have had an events similar to events 130A-130C that were shared by entities 110A, 110B. For example, the modified resilience data 465 may include building inspection data. The modified resilience data 465 may differ from the resilience data 450 and/or resilience data 455 by not having data regarding particular building identifiers and/or geolocation identifiers in the original resilience data 450 and/or resilience data 455.

Access Control and/or Sharing Rules

Figure 5A:
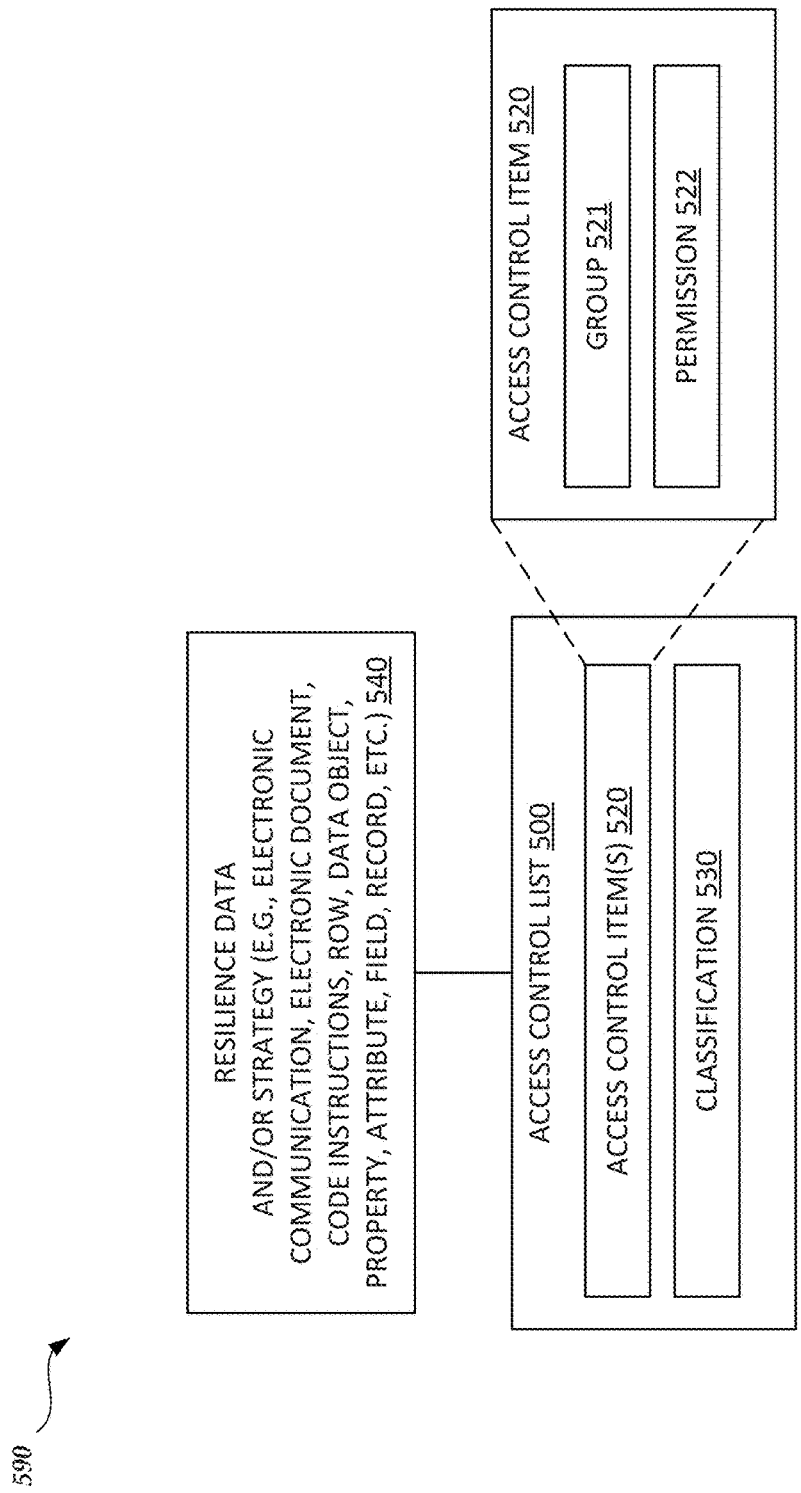
FIG. 5A is a block diagram illustrating an example access control list for resilience data and/or strategy, according to some embodiments of the present disclosure.

FIG. 5A is a block diagram illustrating an example access control list for resilience data and/or strategy, according to some embodiments of the present disclosure. In some embodiments, city resiliency sharing system 100 uses access control lists to allow respective entities to specify which other entities permitted to receive resilience data and/or strategies. Additionally or alternatively, access control lists may further specify the permissions of particular users to view and/or modify resilience data and/or strategies. Access control environment 590 includes resilience data and/or strategy 540 and access control list 500. As described herein, example resilience data and/or strategy 540 includes electronic communications, documents, code instructions, rows, data objects, code instructions, properties, attributes, fields, records, etc. In some embodiments, access control list 500 is stored in a data store of city resilience sharing system 100. Example access control list 500 includes one or more access control items 520 and zero or more classification 530. Example access control list 500 is associated with one or more resilience data items and/or strategies, such as a data and/or strategy 540. Thus, example access control list 500 of city resiliency sharing system 100 provides a level of granularity to specify sharing rules and/or permissions on a per-resilience data item and/or strategy basis.

Example access control item 520 includes group 521 and permission 522. Example group 521 identifies a set of entities and/or users. Example permission 122 identifies an operation an entity and/or user in the set can perform on resilience data and/or strategy 540. Additionally or alternatively, example permission 122 further identifies an operation the entity and/or user in the set can perform on access control list 500. Non-limiting examples of permission 122 include read, write, owner, create, delete, read only, and/or some combination thereof.

In some embodiments, if access control list 500 has a classification 530, then an entity and/or user must be authorized for the classification 530. Thus, classification 530 may override permission 522 granted to the entity and/or user. For example, one possible set of classification markings as part of classification 530 include "Top Secret," "Secret," "Confidential," "Restricted," "For Official Use Only," among others, while another example classification scheme may use the markings: "Public" and "Restricted," among others. For example, the permissions of an access control list may indicate that a particular data object should not be shared with particular one or more entities and/or users. Additional detail regarding the sharing of resilience data and/or strategies occur via access control lists is described in further detail in U.S. Pat. No. 8,527,461.

FIG. 5B illustrates an example sharing rules, according to some embodiments of the present disclosure. Example sharing rules 550 may be used additionally or alternatively to the access control lists described with reference to FIG. 5A. For example, sharing rules 550 may be one or more tables in a data store of the city resiliency sharing system 100. In other examples, sharing rules 550 may be in various formats, such as a data object format, XML, JSON, a file format that is proprietary to the city resiliency sharing system 100, or any other format. The columns and/or fields shown in sharing rules 550 are illustrative. In some embodiments, there may be additional or less columns and/or fields. Sharing rules 550 may be used to redact and/or modify any property of resilience data, strategies, and/or other city resiliency information of city resiliency sharing system 100. The redaction and/or modification of any property may be possible because resilience data, strategies, and/or other city resiliency information may be in a data object format.

As shown in FIG. 5B, example sharing rules 550 may be used by the city resiliency sharing system 100 (and/or by individual entities in some embodiments) to redact and/or modify resilience data and/or strategies. For example, there are four example entities shown (see the Entities column). Resilience data from a building inspection may include geolocation data in a Global Position System (GPS) format and/or some other geolocation data. Thus, the redact geolocation data column may be used to remove the actual GPS coordinates from the building inspection data. In the example, the geolocation data will be removed from entity 4's resilience data and/or strategies. For the entities 1, 2, and 3, the geolocation data may be shared.

As shown in the example table of FIG. 5B, there may be other columns for redacting or removing other data from resilience data and/or strategies. For example, building identifiers, and/or personal information may be removed and/or redacted. Thus, access control lists, or sharing rules 500 or an equivalent method or device may be useful to redact personal information as required by law.

Sharing rules 550 may also be used to specify recipients for resilience data and/or strategies. For example, as shown in FIG. 5B, entity 1 has recipients: entity 2 and entity 3. Thus, the default recipients of entity 1 are entities 2 and 3 for sharing resilience data and/or strategies. As shown in the example table, entity 4 may share all of its resilience data and/or strategies with every entity in city resiliency sharing system 100.

Example Workflow Systems and/or Methods

Figure 6:
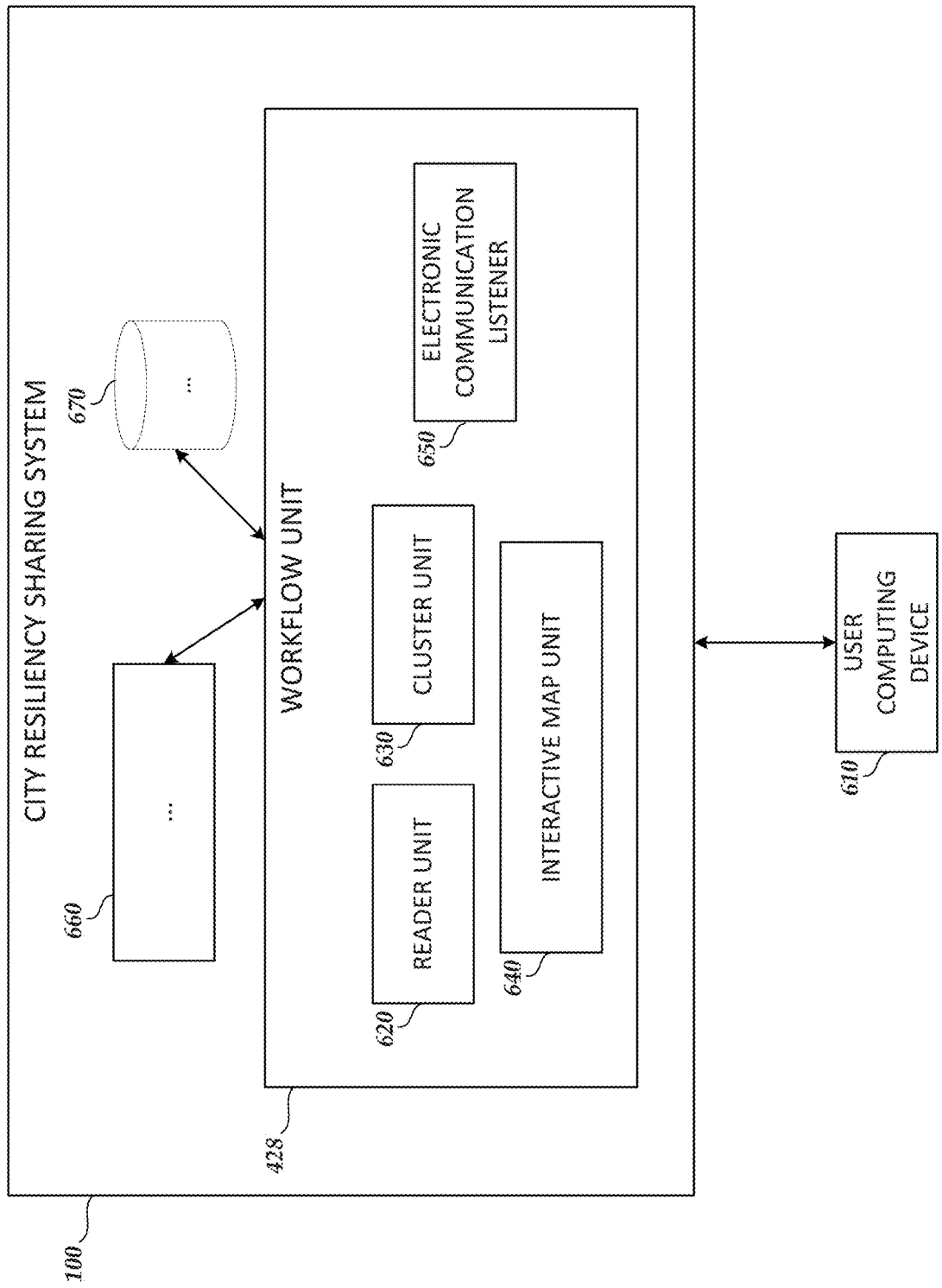
FIG. 6 is a block diagram illustrating another example city resiliency sharing system, according to some embodiments of the present disclosure.

FIG. 6 is a block diagram illustrating another example city resiliency sharing system, according to some embodiments of the present disclosure. For example, city resiliency sharing system 100 includes workflow unit 428. Further, city resiliency sharing system 100 is in communication with user computing device 610. In some embodiments, city resiliency sharing system 100 is in communication with user computing device 610 via network 120 and an entity may include user computing device 610 (not illustrated). Workflow unit 428 includes reader unit 620, cluster unit 630, interactive map unit 640, and electronic communication listener 650. Example reader unit 620, cluster unit 630, and/or interactive map unit 640 may cause presentation of user interfaces (e.g., FIGS. 7, 8A, 8B, 9, 10, and/or 14). In some embodiments, reader unit 620, cluster unit 630, and/or interactive map unit 640 may execute locally on user computing device 610.

Example reader unit 620, cluster unit 630, and/or interactive map unit 640 may cause presentation of user interfaces as part of a workflow process for a human analyst. For example, reader unit 620 may cause presentation of an electronic document and/or communication repository (also referred to herein as a "reader view") for viewing, editing, and/or sending data within city resiliency sharing system 100. Additional information regarding a reader view is discussed in further detail with reference to FIGS. 7, 10, and 11. Example cluster unit 630 causes presentation of a clustering user interface, which is described in further detail with reference to FIGS. 8A, 8B, 11, and 14. Example interactive map unit 640 causes presentation of an interactive map, which is described in further detail with reference to FIGS. 9 and 11. In some embodiments, reader unit 620, cluster unit 630, and/or interactive map unit 640 (and their corresponding user interfaces) are optional within city resiliency sharing system 100 and/or instances of city resiliency sharing system 100. For example, a city resiliency sharing system 100 may include none of and/or some combination of a reader unit 620, cluster unit 630, and/or interactive map unit 640.

Example workflow unit 428 communicates with other processes and/or services 660 and data stores 670 of city resiliency sharing system 100. For example, reader unit 620, cluster unit 630, and/or interactive map unit 640 can access resilience data from resilience data store 442 and/or strategy data store 432 of city resiliency sharing system 100. Further, reader unit 620, cluster unit 630, and/or interactive map unit 640 can communicate with strategy unit 430 and/or resilience data modification unit 440 of city resiliency sharing system 100.

In some embodiments, electronic communication listener 650 receives electronic communications that can be shared via city resiliency sharing system 100. As described herein, example electronic indication listener 650 is configured to receive electronic communications for particular electronic communication addresses and/or domains (e.g., email addresses and/or email domain)s. Examples of electronic communication addresses and/or domains include: "resilience@sharingsystem.com," "earthquake.resilience@sharingsystem.com," "building_inspection.sharingsystem@citysharing.com," "sharingsystem.com," "citysharing.com," a chat message account, or a text message account such as a phone number, etc. The electronic communications sent to specific email addresses and/or domains may be sent from email applications and/or using email protocols known in the art. Electronic indication listener 650 may process the electronic communications and share the electronic communications as resilience data using the processes described herein. For example, recipients of the resilience data including the electronic communications may be determined by electronic communication listener 650 based on the particular email addresses and/or domains that were emailed, access control lists, and/or sharing rules described herein. In effect, city resiliency sharing system 100 may function as a message board for participants to share information and/or communicate. Additional details regarding sharing electronic communications via city resiliency sharing system 100 is described in further detail with reference to FIGS. 10 and 11.

Example Interactive User Interfaces

FIGS. 7, 8A, 8B, 9, 10, and 14 illustrate example user interfaces of the city resiliency sharing system, according to some embodiments of the present disclosure. In some embodiments, the user interfaces described below may be displayed in any suitable computer system and/or application, for example, in a web browser window and/or a standalone software application, among others. Additionally, the functionality and/or user interfaces of the system as shown in FIGS. 7, 8A, 8B, 9, 10, and 14 may be implemented in one or more computer processors and/or computing devices, as is described with reference to FIG. 15.

In the example provided below, a city analyst wants to learn how other cities are handling earthquake legislation, the analyst can use city resiliency sharing system 100 and a workflow process to identify key contacts in a chosen city to discuss data sets and analytical conclusions. The analyst can then cross-reference that information with data specific to a particular city, such as historical earthquake relief statistics and current infrastructure and population vulnerabilities.

Figure 7:
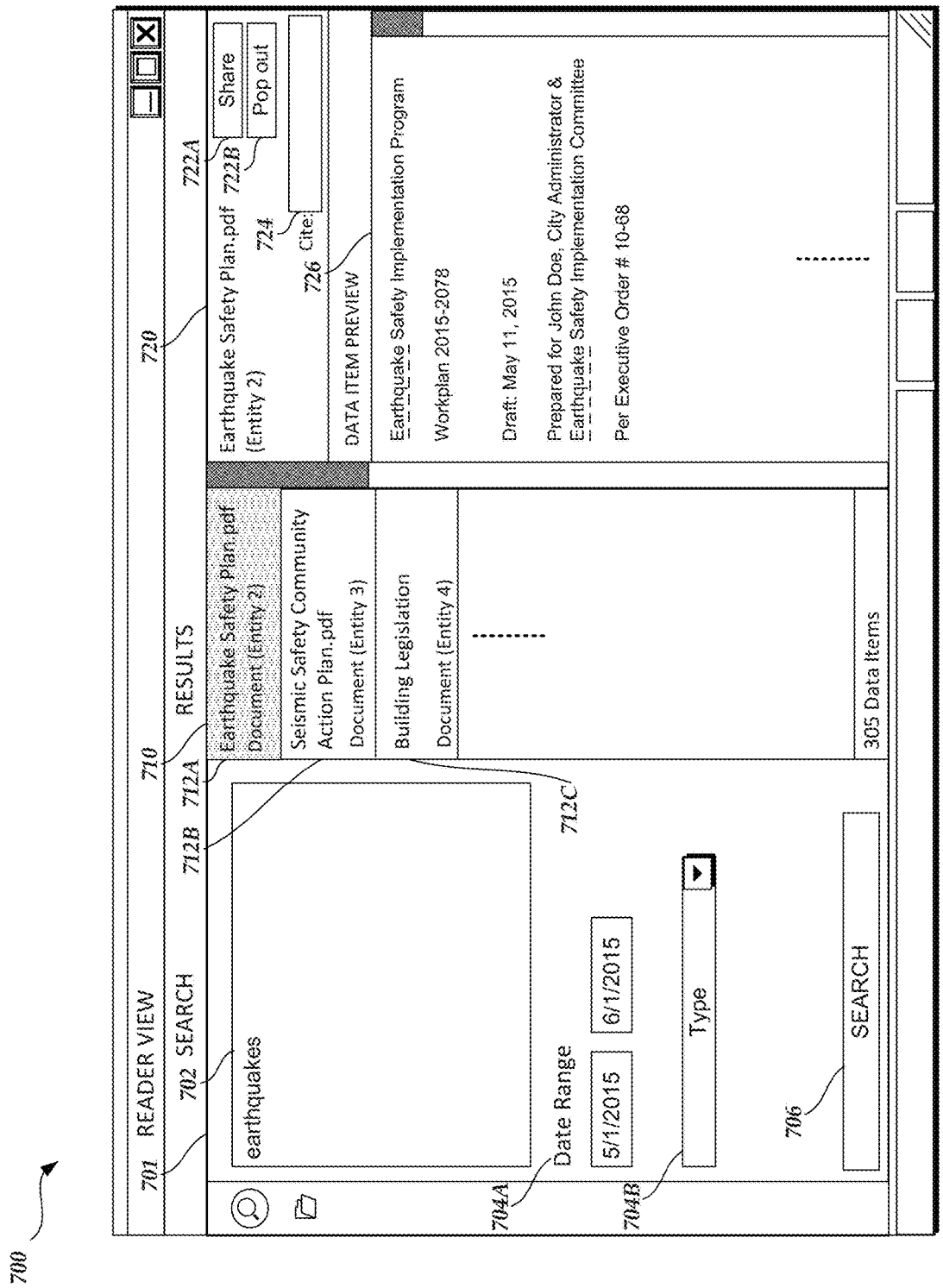
FIG. 7 illustrates an example user interface of a reader view of the city resiliency sharing system, according to some embodiments of the present disclosure.

Referring to FIG. 7, the example user interface 700 (also referred to herein as a "reader view") includes search area 701, results area 710, data preview area 720. As illustrated in this example, a human analyst accesses reader view 700 to search for "earthquakes" via search input area 702.

Example search input area 702 receives search keywords. As used herein, a "keyword" includes one or more words or phrases. Search area 701 includes optional search filters 704A-704B. For example, date range selector 704A filters the search results by date and/or data type selector 704B filters results by data type such as, but not limited to, electronic word processing document, PDF, spreadsheet, electronic communications, delimited data (comma separate values, tab delimited values, etc.), XML, JSON, etc. Other search filters (not illustrated) may be used in example user interface 700 such as, but not limited to, searching by author, by entity, creation date, number of shares, relevance, etc. Upon selection of search selector 706, by a user, reader unit 620 causes reader view 700 to update and to present search results 712A-712C in 710 results area. Reader unit 620 may search resilience data items via one or more known searching techniques in the area of search engines and/or information retrieval such as, but not limited to, a keyword searching, partial text searching, natural language searching, etc.

As illustrated in example results area 710, resilience data is presented in summary form. For example, result data items 712A-712C can include the title, data type, and source of the respective resilience data. In the example, reader view 700 presents results from other entities that have shared earthquake plans, news, communications, and or media regarding earthquake preparation. In some embodiments, reader view 700 presents additional fields associated with results 712A-712C, which may be customizable by a user. Further, results 712A-712C may be selected to present at least some of the data in data preview area 720. For example, data item 712A is shown as selected in reader view 700.

In some embodiments, an analyst may set up a feed through reader view 700 to receive updates and/or notifications regarding particular topics shared through city resiliency sharing system 100. For example, reader view 700 may receive input including keywords and/or predetermined feeds to notify an analyst when new data is received from city resiliency sharing system 100 with the corresponding keyword and/or shared under a predetermined feed. Non-limiting examples of keywords and/or feeds include "Earthquake Legislation," "Law Enforcement, "Homelessness," etc.

As illustrated in example data preview area 720, a selected resilience data item may be partially previewed in reader view 700. For example, data content area 726 presents the data item, here a document, in a human readable form. Example data preview area 720 includes a sharing selector 722A, which allows an analyst to share the data item through city resiliency sharing system 100 and/or one or more electronic communication protocols such as, for example, email and/or an instant messenger. Example data preview area 720 further includes pop out selector 722B to present the data item in a separate window. Further, example data preview area 720 includes a citation input area 724 to receive a footnote and/or citation input classification. Additionally or alternatively, data preview area 720 may include functionality regarding snippets as described in further detail in the Reader References, such as U.S. patent application Ser. No. 14/332,306. In some embodiments, data preview area 720 includes additional selectors, any of interface elements 722A, 722B, 724, and/or some combination thereof. Other variations in the reader user interface 700A are included in the Reader references and may implemented by the city resiliency systems discussed herein.

Continuing with the example, the human analyst may have numerous city documents and/or data items to look through. As illustrated, a human analyst may have 305 resilience data items to review related to earthquakes and would like to efficiently locate documents specifically related to earthquake legislation. In some embodiments, resilience data items may be exported to a clustering view to allow a human analyst efficiently analyze the resilience data items.

Figure 8A:
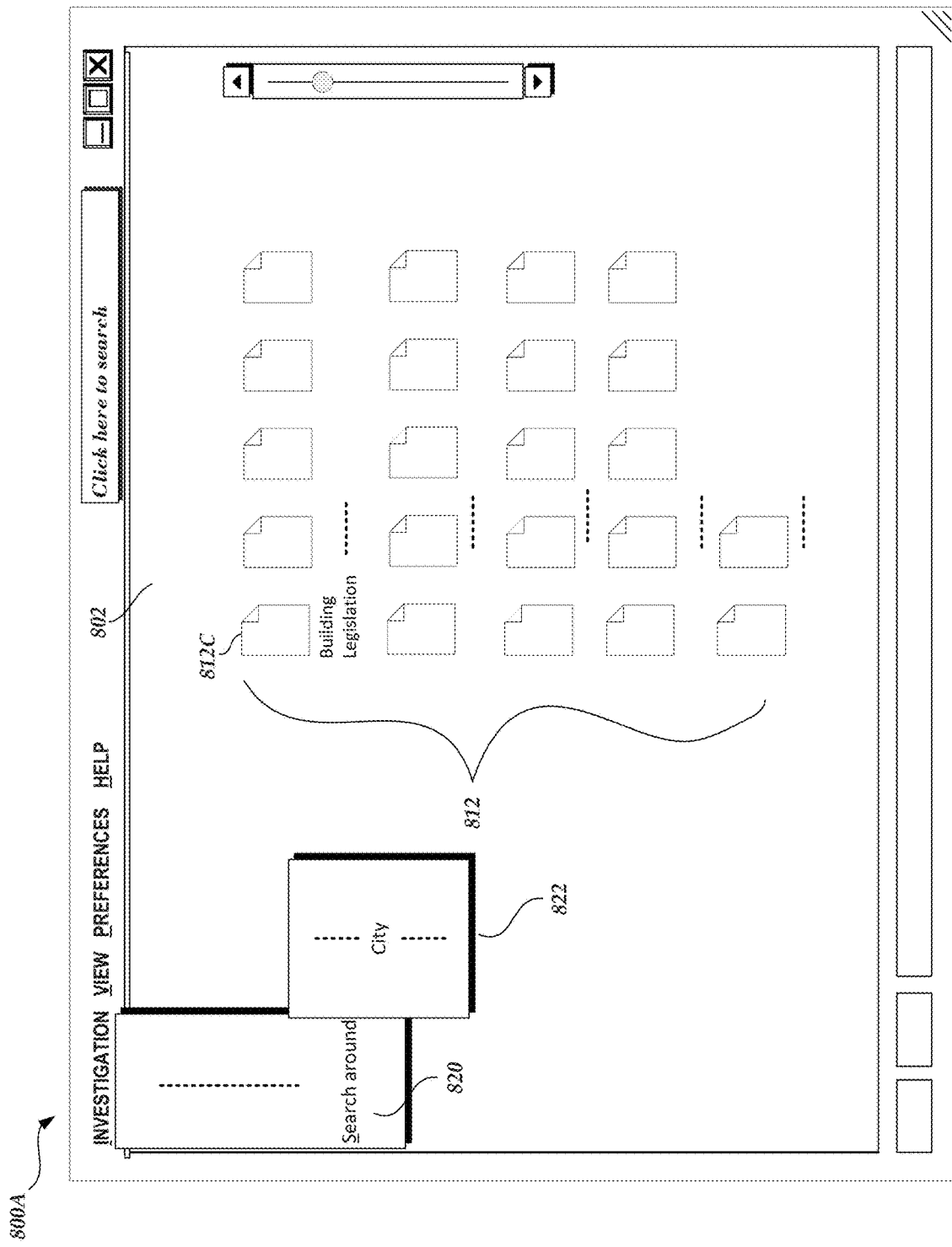
FIGS. 8A-8B illustrate an example user interfaces for viewing data objects within the city resiliency sharing system and/or a clustering view of the city resiliency sharing system, according to some embodiments of the present disclosure.

Referring to FIG. 8A, example user interface 800A (also referred to herein as a "clustering view") includes a data object area 802. For example, one or more of the user interfaces illustrated in FIGS. 7, 8A, 8B, 9, 10, and/or 14 may communicate and/or be interactive with one another. For example, resilience data items 712A-712C may be imported into clustering view 800A such as by being dragged into cluster view 800A by a user. For example, cluster unit 630 receives user selection input that includes a drag and drop input (e.g., an indicator corresponding to the resilience data, such as documents, being dragged into clustering view 800A) including resilience data objects to be imported into the clustering view 800A. As described herein, city resiliency sharing system 100 may use an ontology and resilience data items and/or strategies may be represented as and/or correspond to data objects, which may be viewed in a clustering view described herein (e.g., clustering view 800A). For example, resilience data items 712A-712C may correspond to respective data objects and/or documents 812 (including document 812C).

In the example, an analyst may be interested in which cities are associated with one or more data items and/or documents. An example method for searching includes searching around a "city" data object. As illustrated, a user may select a "search around" menu option 820 for a "city" menu item 822.

Figure 8B:
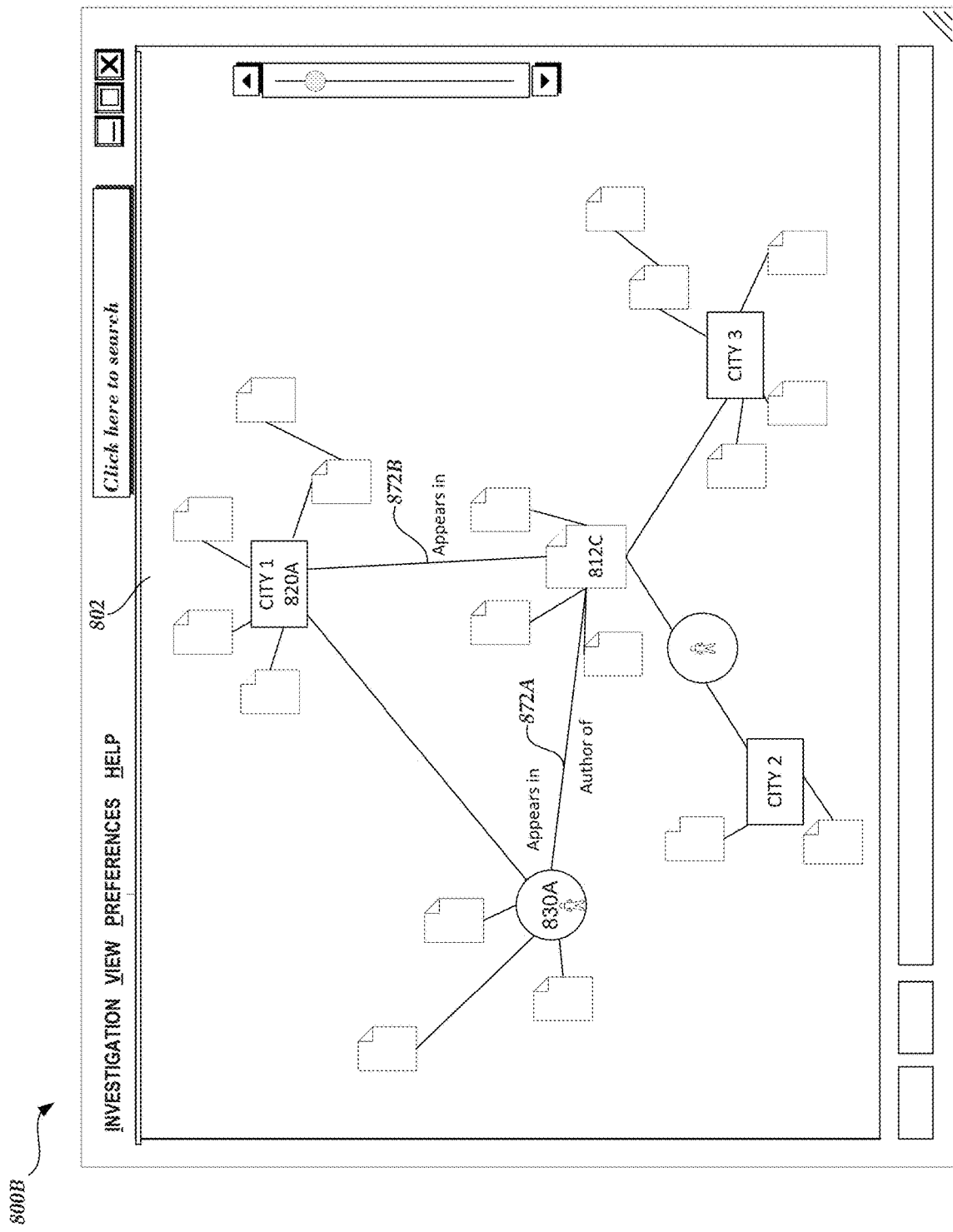

Referring to FIG. 8B, example user interface 800B (also referred to herein as a "clustering view") includes a data object area 802 (similar to data object area 802 of FIG. 8A). As illustrated, data object area 802 includes resilience data documents 812 from example user 800A of FIG. 8A. For example, document 812C ("Building Legislation") is the same document in FIGS. 8A and 8B. Further, the "search around" clustering technique determines which resilience data items and/or objects are associated with cities including documents 812. As described herein and in the Clustering references, additional related data objects can be determined by cluster unit 630 by matching and/or identifying similar properties and/or property values between data objects. Additionally or alternatively, associations may be predefined as part of the ontology, e.g., when an object is created it has a predefined association with another object. Other clustering techniques include selecting a particular object, such as document 812C, and searching around the particular object.

As illustrated, example document 812C is associated with "City 1" 820A. Further, user interface 800B visualizes the association between objects 812C and 820A by the "appears in" association 872B. In the example, City 1 "appears in" the "Building Legislation" document 812C. As described in the Clustering references, associations between data objects may be determined based on common property values between data objects. For example, the string value for the name of data object 820A, "City 1," may appear in and/or match the text data (a property value) of document 812C. Another example, described below, is the name of a person data object, "Person 1," matching in whole or in part a property value of a data object, such as "Author." Any data object supported by the ontology and/or city resiliency sharing system 100 may be presented in cluster view 800A-800B. For example, a person object 830A (e.g., "Person 1,"

the Chief Resilience Officer of City 1) is shown as associated with the document 812C (via association 872A illustrating an "appears in" and an "author of" relationship). Thus, an analyst may quickly identify Person 1 as a key person involved with the "Building Legislation" document 812C. In some embodiments, cluster view 800A-800B is capable of presenting property values associated with a presented object. Non-limiting property values associated with objects include object name, date created, last update time, etc. For example, user interface 800B can present property values associated with person object 830A upon selection and/or hovering a cursor over person object 830A. Non-limiting property values associated with an example person object include the person's name, date of birth, known contacts, title, contact information, employer, affiliations with organizations, etc. Non-limiting example property values to identify associations between resilience data include author (including co-authors), editor, recipient, or persons mentioned in data objects. Non-limiting example associations include: resilience data object to document object, person data object to communication object, resilience data object to building data object, etc.

In some embodiments, additional details regarding processes for clustering of data objects, identifying related data objects, and/or user interfaces 800A-800B can be found in the Cluster references.

Figure 9:
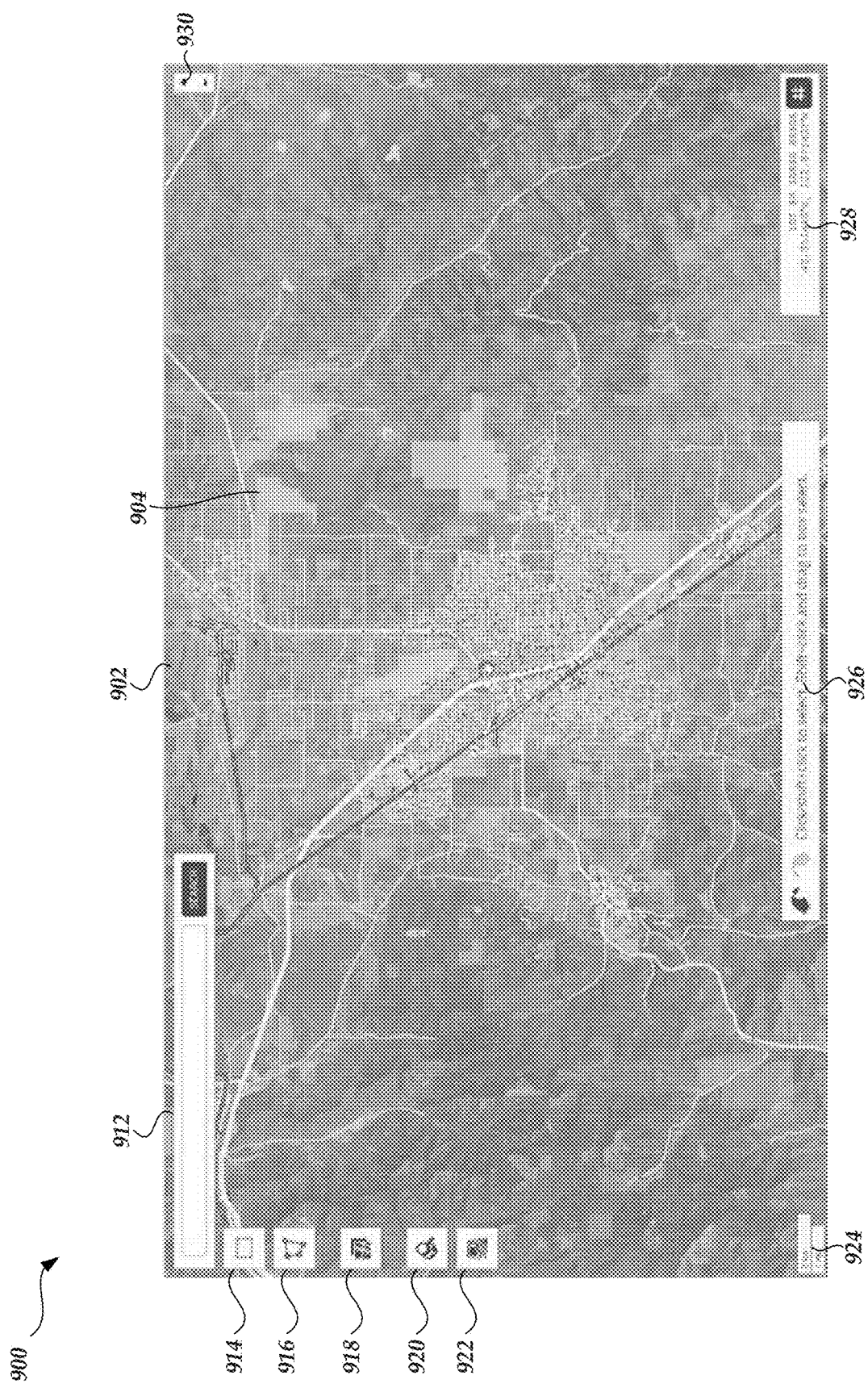
FIG. 9 illustrates an example interactive map of the city resiliency sharing system, according to some embodiments of the present disclosure.

Referring to FIG. 9, example user interface 900 (also referred to herein as an "interactive map") includes a map visualization 902, layers 904, and user interface elements 912, 914, 916, 918, 920, 922, 924, 926, 928, and 930. Further detail regarding user interface elements user interface elements 912, 914, 916, 918, 920, 922, 924, 926, 928, and 930 can be found in U.S. patent application Ser. No. 13/917,571. Similar to the interaction between user interfaces 700 and 800A of FIGS. 7 and 8A, respectively, user interface 900 may be based on data from user interfaces 800A-800B of FIGS. 8A-8B. For example, the structures identified in building legislation document 812C may be presented in layers 904 to identify all the buildings that would be affected by building legislation document 812C. In some embodiments, a user may execute a search to identify geolocations referenced in resilience data. Additionally or alternatively, resilience data and/or portions of resilience data may be imported into interactive map 900.

While not illustrated, coordinates and/or geolocation data may be imported into a clustering view (similar to clustering views 800A-800B) to determine the residence of the buildings. For example, analyst may conduct a search in a clustering view to determine the owners of the building, and may further filter the data objects for people that are fifty-five and older to identify a potentially vulnerable set of the population. Thus, an analyst may be to determine who may be vulnerable to an earthquake and/or a major event. Continuing with the example, the filter buildings may then be imported into interactive map 902 to present a subset of the original layers 904. The layers and/or heat map (such as layer 904) may be used in a document and/or report (which may then be shared via city resiliency sharing system 100).

Figure 10:
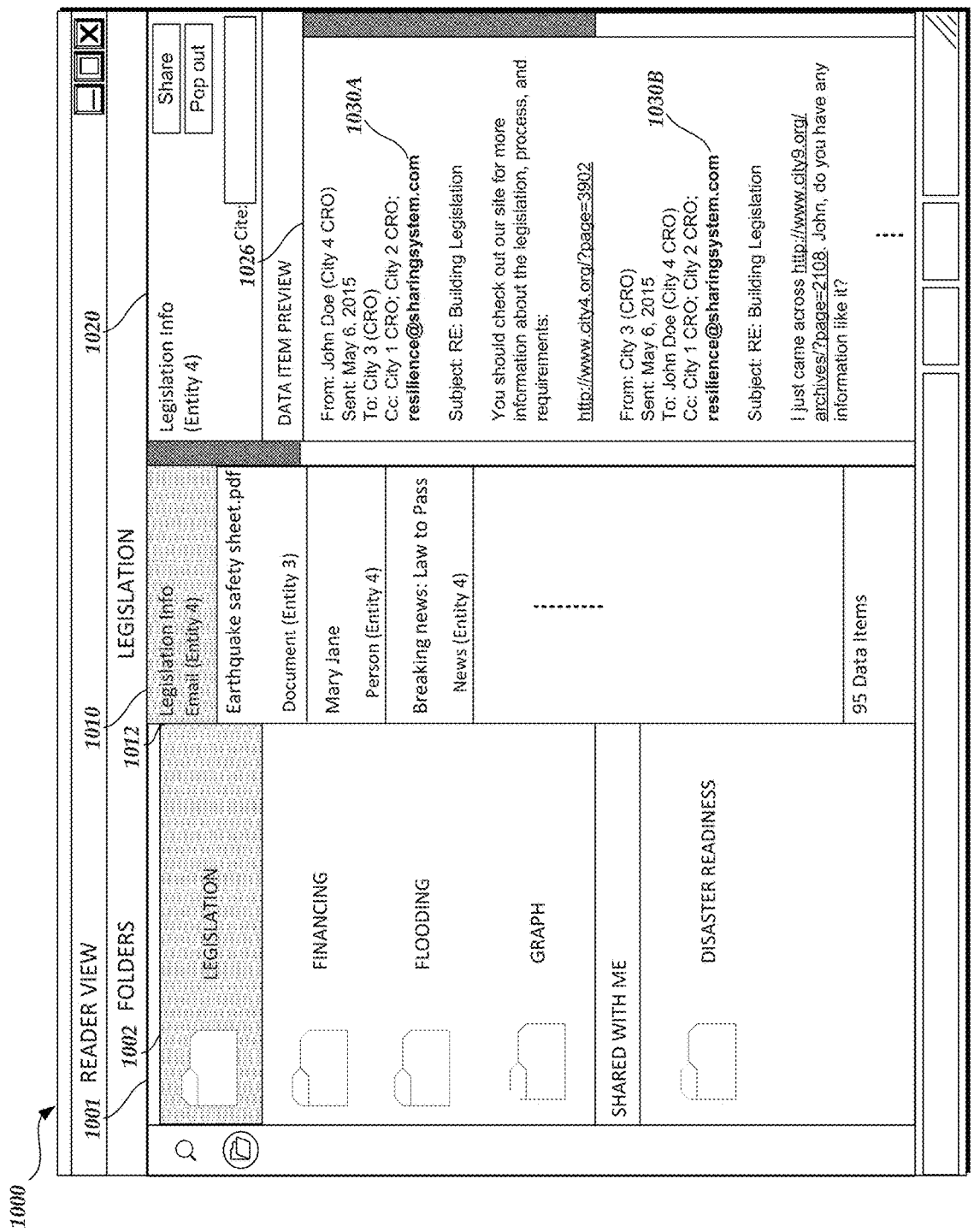
FIG. 10 illustrates another example user interface for a message board of the city resiliency sharing system, according to some embodiments of the present disclosure.

Referring to FIG. 10, example user interface 1000 is another example reader view, which includes a message board. Some user interface elements of user interface 1000 may be similar to user interface elements of user interface 700 of FIG. 7. For example, data preview area 1020 may be similar to data preview area 720. Example reader view 1000 includes folder area 1001, folder contents 1010, and data preview area 1020. As illustrated, an analyst selected "Legislation" folder 1002 and electronic communication "Legislation Info" 1010.

Data preview area 1020 includes data content area 1026. As illustrated, by including the email address "resilience@sharingsystem.com" 1030A-1030B (or other predefined electronic communication address), city resiliency sharing system 100 includes the electronic communication into its repository and/or may be viewed by participants of city resiliency sharing system 100 (e.g., participants such as John Doe may view the electronic communication from their electronic account within city resiliency sharing system 100), as described herein. As a result, example reader view 1000 is a message board discussion history. Thus, an analyst may review the discussion history and/or contact specific persons that were participants in the electronic communication. In some embodiments, documents attached to and/or new form resource locators in electronic communications may be automatically ingested by city resiliency sharing system 100 as resilience data. Further, in some embodiments, electronic communication and/or message board discussion 1026 may be permissioned and/or shared using the sharing rules and/or access control lists described herein.

Example Sharing Processes

In some embodiments, city resiliency sharing system 100 may be applicable for various workflow processes. For example, city resiliency sharing system 100 may be compatible and/or communicate with mobile computing devices. For example, mobile computing devices may allow two-way flow of information between users in the field and analysts at a city's headquarters, allowing the city's analysts to enhance situational awareness on the ground; transmit data, messages, and other media such as images and video between headquarters and the field; and monitor the location of all mobile users. In a building inspection example, a building inspector collects building inspection data from a mobile computing device and shares it via the city resiliency sharing system 100. The shared resilience data can build department efficiency for various tasks and/or improve disaster management in times of emergency.

Continuing with the building inspection example, a building inspector may have access to an input application, such as an example electronic form (e.g., a web form), to share data with city resiliency sharing system 100. For example, the example electronic form provides the ability to enter and/or create new data in city resiliency sharing system 100 from the field. Using the example electronic form, a city can develop standardized forms for building inspectors to use for data collection during inspections. Electronic form fields can be configured to include age of structure, materials used, number of units, building owner, building inspection information, business licenses, registration and permit information, fire retardant materials, and hazardous materials stored on site, among others. Electronic forms can also include pictures taken of the structure, geo-tagged to capture a visual of the exact location and the complaint or violation under inspection.

In some embodiments, the building inspection forms completed on a mobile computing device are automatically uploaded into city resiliency sharing system under, where they can be integrated with other information to support resilience metrics for both routine and emergency use. The following descriptions provide examples of these scenarios.

City building inspectors, via city resiliency sharing system 100, can visualize the geographic dispersion of complaints and construction projects, examine event summaries, assess trends across districts, reveal temporal patterns, and compare current building conditions and patterns with historical ones. With this information, a city can more effectively analyze risks—such as susceptibility to potential earthquake damage—and conduct targeted inspections, thereby increasing efficiency and reducing overhead costs when managing building-related issues.

In some embodiments, other city departments can easily leverage building inspection data to inform decisions across the city landscape with the data integrated into city resiliency sharing system 100. For example, city analysts could combine building information with violence reduction data sets to identify the subsets of the population that are most vulnerable to crime. One way of doing this is by using energy distribution and usage as an indicator of economic vitality, and correlating the age of a building to the probable age and vulnerability of its residents. City analysts could use these insights to inform violence reduction and/or other public safety initiatives. For example, the strategies discussed herein may be used to automatically generate clusters directed towards violence reduction and/or other public safety initiatives.

Further, in addition to the earthquake legislation provided herein, city resiliency sharing system 100 can provide reliable data for use in evaluating structures. This may reduce the need for expensive reports conducted by specialized analysts, and the standardized nature of data across all buildings will produce more reliable final results.

In an emergency example, a Chief Resilience Officer ("CRO") and other resilience professionals can use city resiliency sharing system 100 to enhance response and recovery for major events by pushing critical information to first responders and/or to a department of emergency management.

City analysts can identify the most vulnerable areas in the city by combining open source information, such as building data, natural hazard and weather data, geological data, and census data, with department-specific data sets, including disability population statistics from the Health Department, housing construction data from the Planning Department, and water and gas maintenance project information from the Department of Public Works. This information can be sorted based on fire or police districts, giving first responders an accurate view of potential problem areas before an event strikes.

Continuing with the emergency example, this same information can help city officials identify the most efficient supply drop and distribution locations. For example, certain street corners may be ideal places for supply distribution because they are located on solid ground that is less likely to be adversely affected by an event and that can provide maximum accessibility to nearby residents. Analyses such as overlaying maps of potential supply drop locations with maps of streetlights can ensure that city officials choose well-lit locations, which are safer for residents and less likely to be targeted by criminals.

City resiliency sharing 100 may be useful in many emergency situations. For example, particular areas may be more susceptible to looting and crime if adequate resources are not provided after the disaster. Understanding indicators from historic data and mapping commercial stores in an area is essential in directing supplies to the right locations, which can help curb panic and reduce criminal incidents when law enforcement is already stretched to its limits. In times of emergency, city resiliency sharing system 100 can help city officials place resources and enforcement mechanisms for maximum impact on public safety. For example, the user interfaces and/or strategies described herein can provide city analysts the tools to effectively handle city emergencies.

Figure 11:
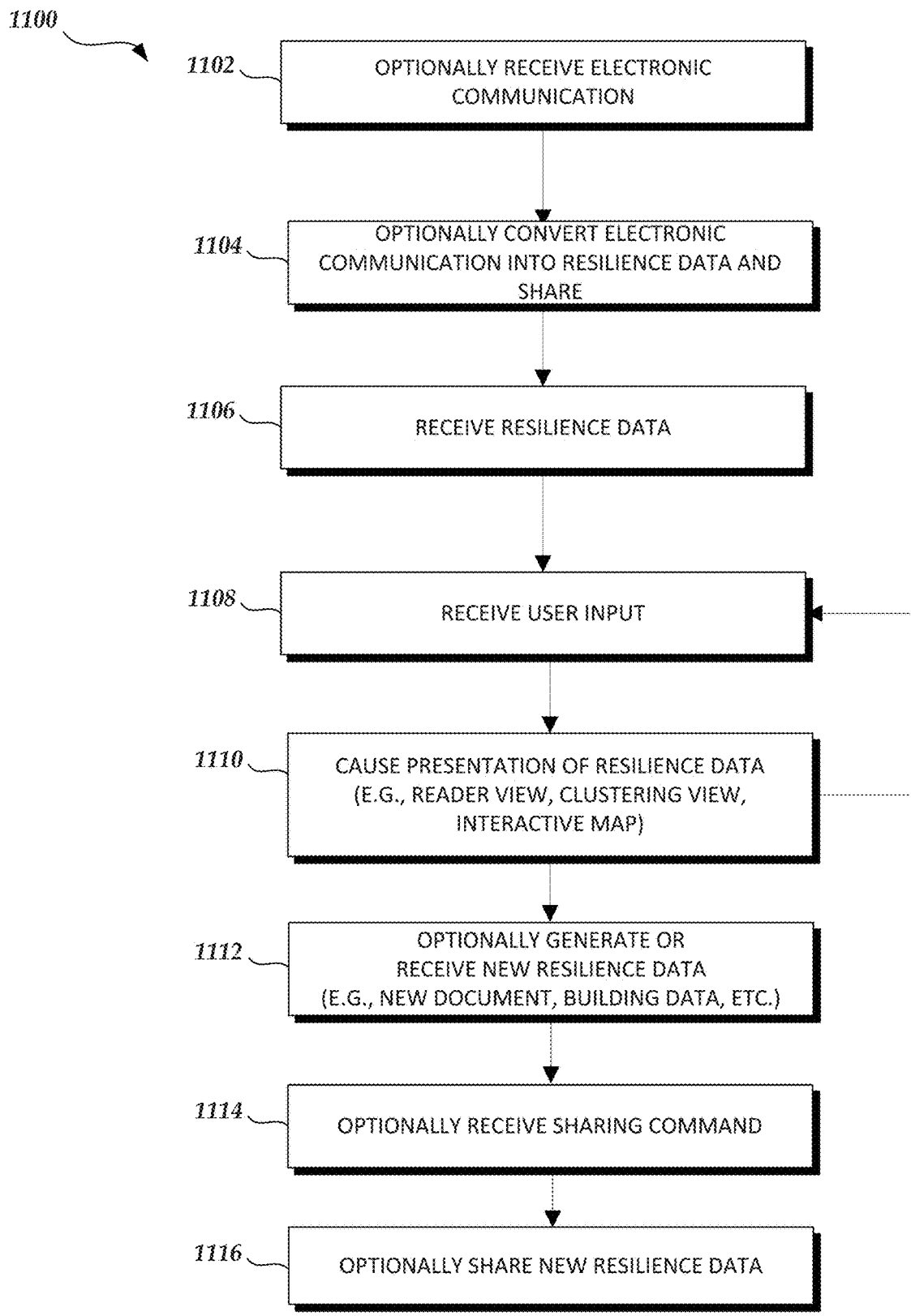
FIG. 11 is a flowchart illustrating an example workflow process, according to some embodiments of the present disclosure.

FIG. 11 is a flowchart illustrating a resilience data sharing process, according to some embodiments of the present disclosure. Example process 1100 of FIG. 11 may be performed by the city resiliency sharing system and/or one or more entities discussed about with reference to FIG. 1. Depending on the embodiment, example process 1100 may include fewer or additional blocks and/or the blocks may be performed in order different than is illustrated.

At block 1102, city resiliency sharing system 100 and/or electronic communication listener 650 optionally receives electronic communication. For example, electronic communication listener 650 receives electronic communication 1026 of FIG. 10 because of the copied email address "resilience@sharingsystem.com."

At block 1104, city resiliency sharing system 100 and/or electronic communication listener 650 optionally converts the electronic communication into resilience data. In the example, electronic communication listener 650 converts the electronic communication by generating resilience data from the electronic communication. Example resilience data from an electronic communication includes a communication object with properties and property values from the electronic communication, such as, but not limited to, subject, to, from, cc, bcc, body, text data, and/or other data from electronic communications. Additionally or alternatively, electronic communication listener 650 associates the electronic communication 1026 with an access control list and/or sharing rule. For example, the email address, sender, and or recipients may be used by electronic communication listener 650 in conjunction with an access control lists and sharing rules to determine which entities the electronic communication should be shared with.

At block 1106, city resiliency sharing system 100 receives the resilience data. For example, resilience data may be received and presented in a reader view such as user interface 700 of FIG. 7.

At blocks 1108 and 1110 city resiliency sharing system 100 (including reader unit 620, cluster unit 630, and/or interactive map unit 640) may continue in a loop of receiving user input and causing presentation of resilience data. For example, one or more selections in user interface 700 and/or received user input from user interface 700 causes presentation of resilience data (such as searching for "earthquakes," a search keyword, in search input area 702). In another example, clustering view 800A-800B may receive user selections for "searching around" a resilience data object and/or cause presentation of related resilience data objects (such as presenting documents, person objects, electronic communications related to a city and/or a particular document). In another example, interactive map 900 may receive user input via user navigation input, layer selection, and/or import of data from another user interface such as, for example, the reader view and/or clustering the view.

At block 1112, city resiliency sharing system 100 may generate new resilience data and/or receive new resilience data. For example, new resilience data may be automatically generated by city resiliency sharing system 100 as described herein. Additionally or alternatively, an analyst may generate a new report and/or electronic communication that is uploaded into city resiliency sharing system 100. In the analyst generated resilience data example, the analysts may use data gathered from one or more of the user interfaces 700, 800A-800B, 900, and/or 1400 such as persons referenced in documents shown in reader view 700, data located through clustered associations in clustering view 800A-

800B, and/or geolocation data from interactive map 900. Continuing with the example, the user may extract data from user interfaces 700, 800A-800B, 900, and/or 1400 by copying, clipping, citing, and/or otherwise reproducing some of the data from user interfaces 700, 800A-800B, 900, and/or 1400 in new resilience data.

At blocks 1114 and/or 1116, city resiliency sharing system 100 optionally receives a sharing command and shares the new resilience data. A sharing command may be issued through any of the user interfaces 700, 800A, 800B, 900, 1000, and/or 1400. Sharing via city resiliency sharing system 100 at block 1116 may be similar to processes 200 and/or 300 of FIGS. 2 and 3, respectively.

Example Resilience Strategies

Figure 12:
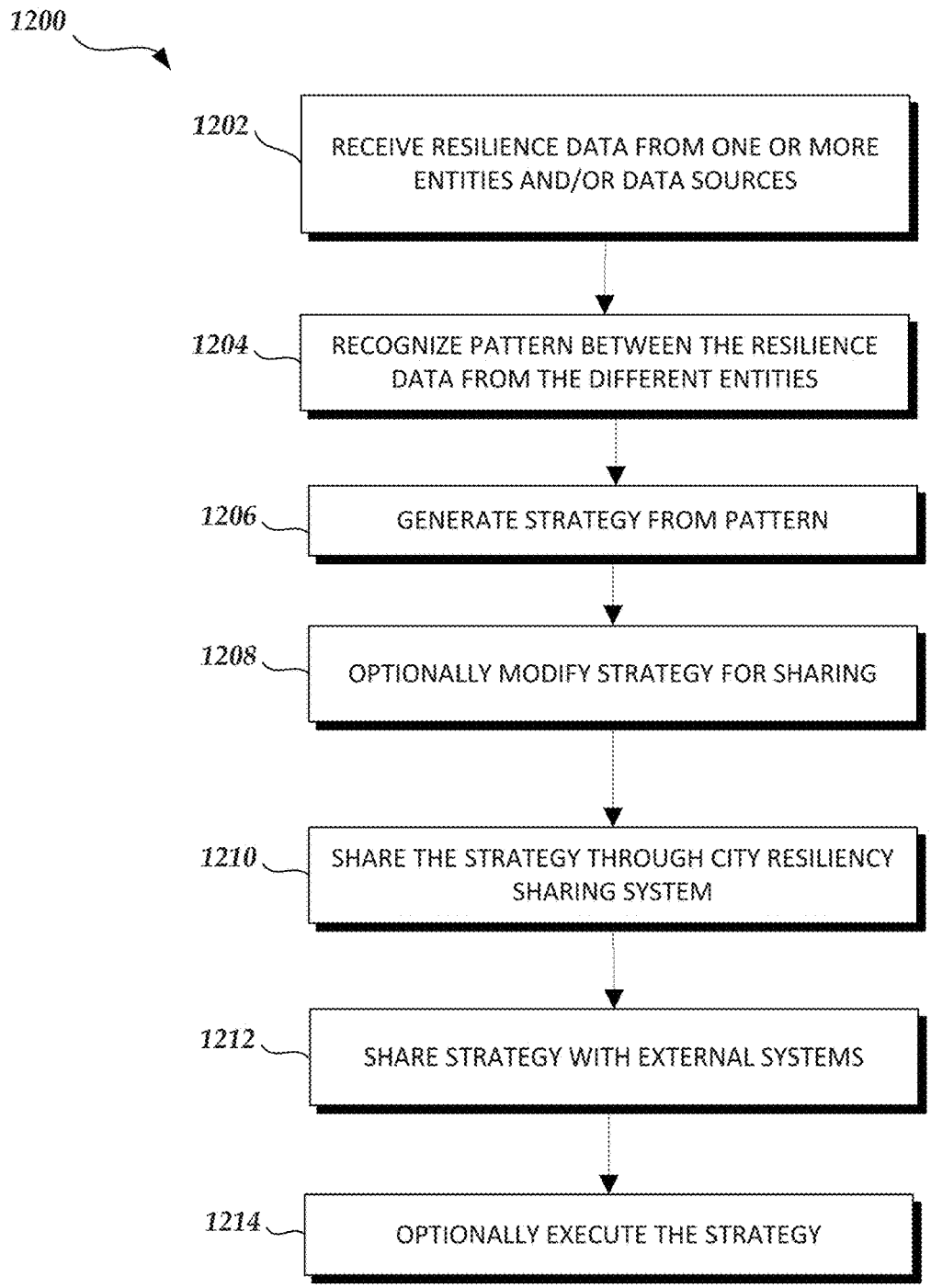
FIG. 12 is a flowchart illustrating an example strategy generating and sharing process, according to some embodiments of the present disclosure.

FIG. 12 is a flowchart illustrating a strategy sharing process, according to some embodiments of the present disclosure. The example process 1200 of FIG. 12 may be performed by city resiliency sharing system 100 and/or the one or more entities discussed about with reference to FIG. 1. Depending on the embodiment, the method of FIG. 12 may include fewer or additional blocks and/or the blocks may be performed in order different than is illustrated.

Beginning at block 1202, resilience data, such as building data, reports, electronic communications, is received from one or more data sources and/or entities. For example, earthquake data may include hundreds or thousands of buildings and or structures that have been affected by an earthquake. The data corresponding to the earthquake may be received by city resiliency sharing system 100. In some embodiments, resilience data may be received from multiple entities such as earthquakes at different cities. Other resilience data may include business and or economic data indicating the number of businesses that are opened and or closed over a period of time within a geographic area.

At block 1204, a pattern may be recognized based on the resilience data. A detected and/or recognized pattern may indicate generalized properties and/or characteristics regarding the event. In the natural disaster example, a detected pattern may indicate the economic impacts of a natural disaster over time, such as the closing of businesses following an earthquake or flood. In some embodiments, pattern recognition is automatic, manual, or some combination thereof.

In some embodiments, recognition of patterns occurs by the systems, methods, and/or techniques disclosed in the Cluster references. For example, resilience data may be visualized by user interface clusters, as discussed below with reference to FIG. 8B.

At block 1206, a strategy may be generated from the recognized pattern. In some embodiments, generation of strategies is automatic, manual, or some combination thereof.

At block 1208, the strategy may be optionally modified for sharing, such as in the manner discussed with reference to FIG. 3. In some embodiments, a strategy may be associated with an access control list and/or sharing rules such as in the manner discussed with reference to FIGS. 5A and 5B.

At block 1210, city resiliency sharing system 100 may share the strategy with one or more other entities or external systems. The strategy may be provided by the entity 110A to city resiliency sharing system 100, such as via the network 120 of FIG. 1. Depending on the embodiment, the strategy may be shared in various manners, such as via a shared network location that stores the strategy, a direct communication via an email or HTTP communication, or in any other manner.

In some embodiments, sharing of the strategy generated at block 1206 occurs by the systems, methods, and/or techniques disclosed in the Sharing references. For example, a strategy may be shared and/or deconflicted through a replicated database system as illustrated by U.S. Pat. No. 8,515,912, thereby preventing duplicate and/or conflicting copies of data. Strategies may also be shared through a database system with multiple ontologies as illustrated by U.S. patent application Ser. No. 13/076,804. The sharing of the strategy may also occur via incremental database replication as illustrated by U.S. patent application Ser. No. 13/922,437.

In some embodiments, secure sharing of strategies may occur through audited activity logs occurs by the systems, methods, and/or techniques disclosed in the Audit reference. For example, sharing activity may be stored in cryptographically immutable audit logs that can be quickly analyzed for suspicious user behavior.

In some embodiments, the clusters generated by the systems, methods, and/or techniques disclosed in the Cluster references and/or other city information may be shared by the systems, methods, and/or techniques disclosed in the Sharing references, other mechanisms illustrated in this disclosure, and/or any other manner.

At block 1212, the strategy that is received at city resiliency sharing system 100 is wholly or partially shared with one or more entities 110. For example, if the strategy is received from entity 110A, city resiliency sharing system 100 may share the strategy to entities 110B, 110C, and/or external systems, such as in accordance with sharing preferences of the entities.

At block 1214, the strategy may be optionally executed by the external system and/or entity as described in further detail herein. For example, execution of the strategy at an entity can access one or more data objects associated with the second entity to identify a potential city resiliency issue (see FIGS. 13 and 14). The one or more data objects can comprise data associated with a city. Example data includes building data, police data, geographic data, business data, electronic documents, electronic communications, and/or any other data that may be relevant to city resiliency. Execution of the strategy at an entity can identify a potential city resiliency issue depending on the logic of the strategy. In some embodiments, strategies are applied by an entity. For example, where a strategy is a parameterized data format, such as XML, the strategy may be applied by city resiliency sharing system to identify a potential city resiliency issue.

Figure 13:
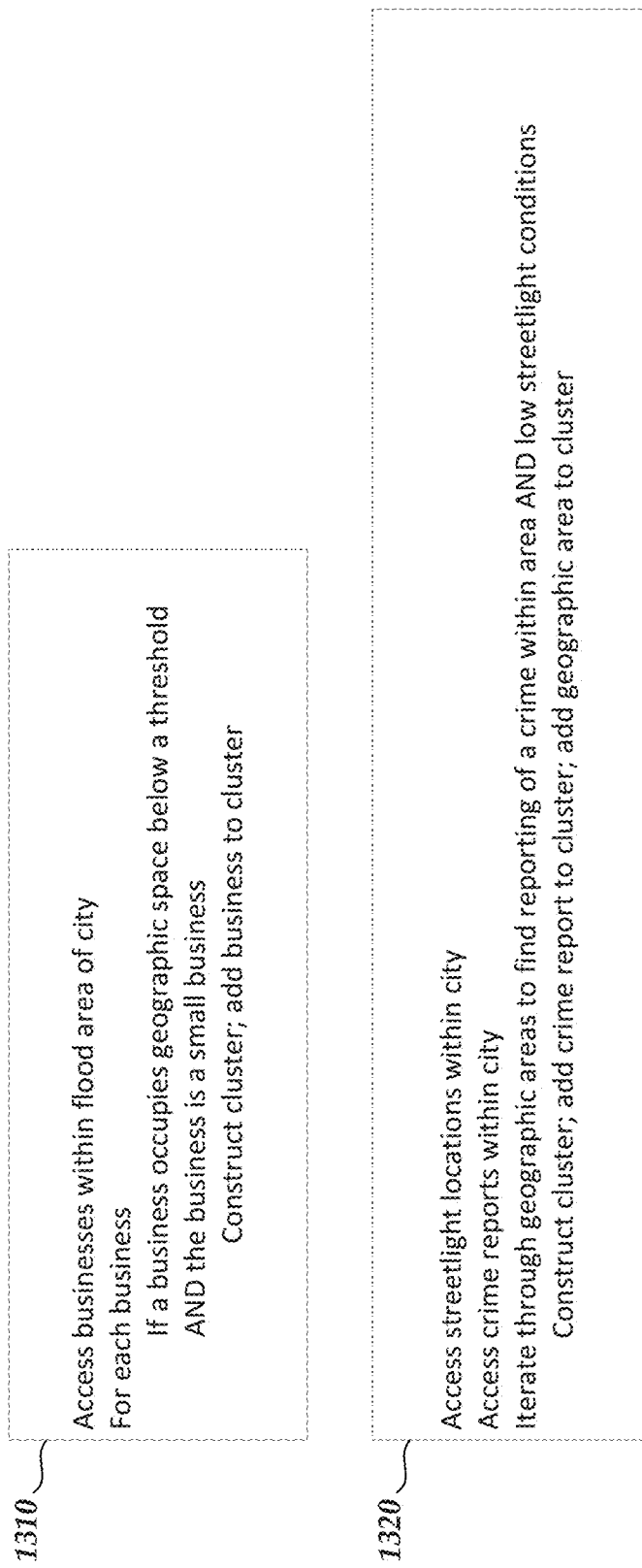
FIG. 13 illustrates example strategies in a format comprising code instructions, according to some embodiments of the present disclosure.

FIG. 13 illustrates example strategies 1310 and 1320 in a format comprising code instructions, according to some embodiments of the present disclosure. In some embodiments, strategies may be complex enough such that their expression may be in a format comprising code instructions. The executable code instructions shown in FIG. 13 are illustrative pseudocode and, thus, may not correspond to any specific programming language or be executable in the format shown. Executable code that performs the functions outlined in strategies 1310 and 1320 may be provided in any available programming language.

Example strategy 1310 includes code instructions to determine potential businesses that may be affected by a flood and/or to estimate the economic impact of a flood in a city. As illustrated, strategy 1310 accesses businesses within a flood area of the city. In the example, city resiliency sharing system 100 accesses resilience data that includes business location data and geographic data associated with the city. Also as described herein, the resilience data may be accessed as data objects, which may be used by strategy

1310. Continuing with the example, strategy 1310 iterates through each business and determines if the business is a size and/or occupies a geographic space below a threshold. For example, businesses of a size within 25 square meters, such as a local convenience store, may satisfy the threshold. Further, strategy 1310 determines whether the business is a small business. For example, city resiliency sharing system 100 may include publicly available small business data (e.g., federal and/or local government loan, grant, tax incentive, and/or venture capital information), which may be used by strategy 1310 to determine whether the business qualifies as a small business. In some embodiments, checking for small businesses in strategy 1310 is optional. If the business satisfies the conditions of strategy 1310, then a cluster may be constructed, such as by using a business identifier and/or geographic location as a seed (as described herein and in the Cluster references) constructing a cluster around the seed. An example cluster generated from a strategy is described in further detail with reference to FIG. 14.

Example strategy 1320 includes code instructions to determine geographic areas within the city associated with criminal activity and load streetlight conditions. As illustrated, strategy 1320, accesses known streetlight locations within a city. In the example, city resiliency sharing system 100 includes resilience data regarding the locations of streetlights. As described herein, city resiliency sharing system 100 can be integrated with and/or receive data from a streetlight data store associated with a streetlight department within a city such as a Bureau of Street Lighting. Continuing with the example, strategy 1320 accesses crime reports within the city. The example crime report data objects may include the location of the reported crime, time of the crime, type of crime, etc. Again, similar to receiving data from streetlights, city resiliency sharing system 100 can be integrated with and/or receive data from police departments, which may include police and/or crime reports. Strategy 1320 then iterates through geographic areas within the city, such as city blocks and/or particular predetermined square meter areas (such as 80 m×270 m, for example). For each geographic area, strategy 1320 determines whether the geographic area satisfies crime reporting and low streetlight conditions. For example, the crime reporting condition in strategy 1320 can be satisfied where one or more crime reports (or some other predetermined threshold) are reported within the geographic area and/or other conditions such as severity and/or time of the crime, such as burglaries and/or crimes that occur after sunset (e.g. 6 or 7 P.M.). Further, example strategy 1320 determines whether low streetlight conditions are satisfied where there are no streetlights in the area or a number below a threshold such as one or two streetlights. If the geographic area satisfies the conditions of strategy 1320, then a cluster may be constructed, such as by using the geographic location as a seed (as described herein and in the Cluster references) constructing a cluster around the seed (e.g., adding the crime report to the cluster).

Other strategies may be apparent from the disclosure herein. For example, historical building data may be used to determine a strategy for identify potentially structurally unsafe buildings and/or buildings that may require additional inspections.

In some embodiments, strategies may comprise various formats and/or combinations of formats. For example, a strategy may comprise executable code instructions and/or a parameterized format. In the executable code instructions example, the executable code instructions may comprise programming logic to detect one or more conditions. In the parameterized format, a XML document may comprise parameters and/or configurations. For example, the XML documents may comprise parameters for checking different values above a threshold, e.g., a threshold percentage for a notification and/or generation of a cluster. Thus, both the code instructions and the parameterized format, such as, but not limited to, XML, may be shared through the city resiliency sharing system.

Figure 14:
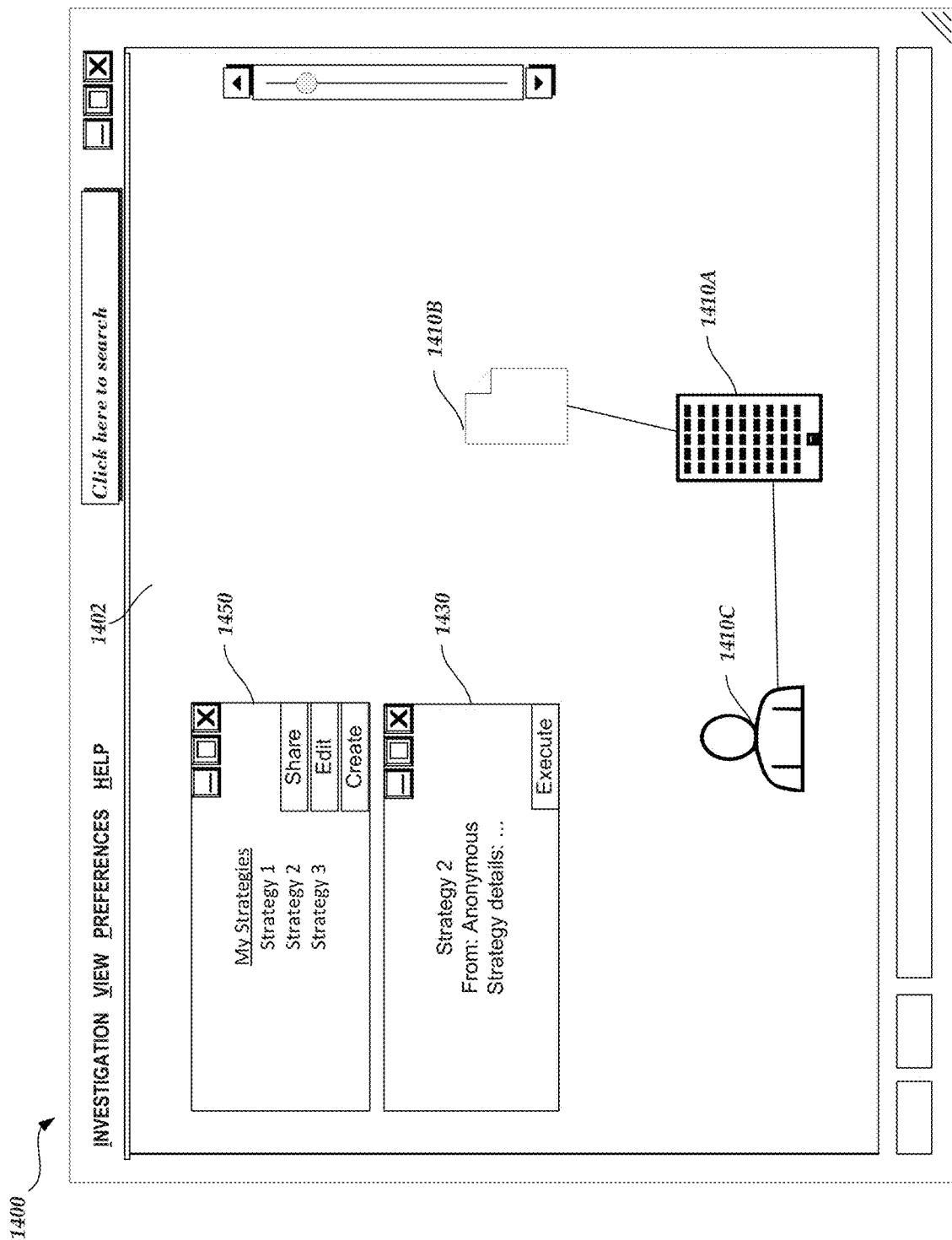
FIG. 14 illustrates an example user interface for viewing, executing, and/or reviewing the results of strategies within the city resiliency sharing system, according to some embodiments of the present disclosure.

Referring to FIG. 14, example user interface 1400 (also referred to herein as a "clustering view") includes a data object area 1402, a strategy area 1430, and a strategy repository area 1450. User interface elements and/or aspects of user interface 1400 may be similar to user interfaces 800A and 800B of FIGS. 8A and 8B, respectively. In some embodiments, resiliency sharing system 100 outputs clusters generated from strategies to clustering view 1400. As illustrated, strategy repository area 1450 presents available strategies. Strategy area 1450 may permit a user to share, edit, and/or modify strategies. Also as illustrated, strategy area 1430 permits a user to execute the strategy and presents details of the strategy and/or other information such as the source of the strategy (e.g., the source entity).

As illustrated, data object area 802 includes a cluster of resilience data items and/or objects 1410A-1410C. For example, the cluster including objects 1410A-1410C may be the output of strategy 1310 referenced in FIG. 13 where strategy 1310 was configured to determine particular businesses that may be impacted from a flood. Continuing with the flood example, cluster 1410A-1410C includes a business data object 1410A, document 1410B, and a business owner 1410C. Business data object 1410A may be associated with a business that is within a potential flood area, business owner 1410C may be the owner of the business, and document 1410B may be loan information and/or a business permit associated with the business.

Example Implementation Mechanisms

The various computing device(s) discussed herein, such as the entities 110 and/or city resiliency sharing system 100, are generally controlled and coordinated by operating system software, such as, but not limited to, iOS, Android, Chrome OS, Windows XP, Windows Vista, Windows 7, Windows 8, Windows Server, Windows CE, Unix, Linux, SunOS, Solaris, Macintosh OS X, VxWorks, or other compatible operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things. The city resiliency sharing system 100 may be hosted and/or executed on one or more computing devices with one or more hardware processors and with any of the previously mentioned operating system software.

Figure 15:
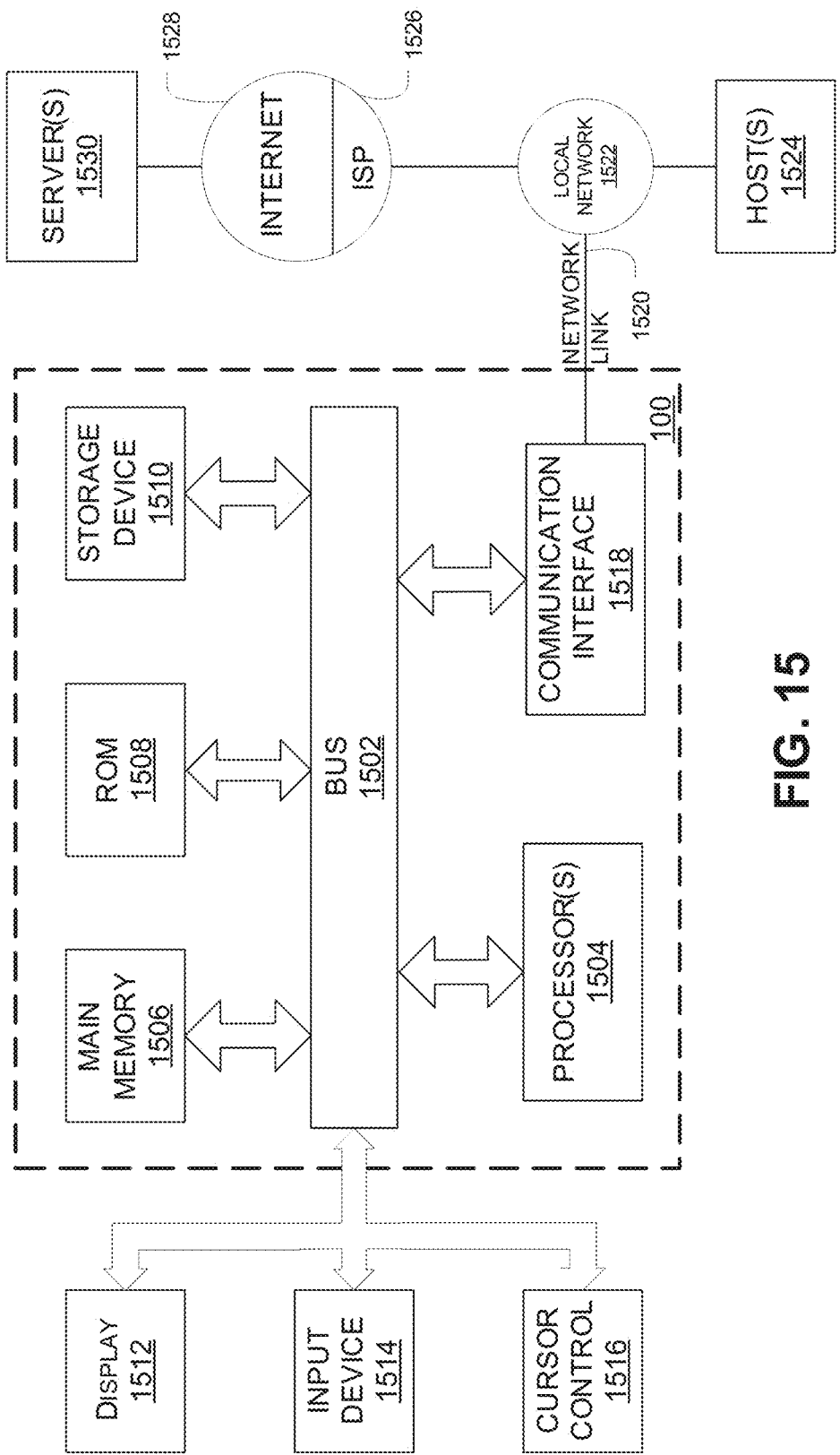
FIG. 15 is a block diagram illustrating an example city resiliency sharing system with which various methods and systems discussed herein may be implemented.

FIG. 15 is a block diagram that illustrates example components of the city resiliency sharing system 100. While FIG. 15 refers to the city resiliency sharing system 100, any of the other computing devices discussed herein may have some or all of the same or similar components.

The city resiliency sharing system 100 may execute software, e.g., standalone software applications, applications within browsers, network applications, etc., whether by the particular application, the operating system, or otherwise. Any of the systems discussed herein may be performed by the city resiliency sharing system 100 and/or a similar computing system having some or all of the components discussed with reference to FIG. 15.

The city resiliency sharing system 100 includes a bus 1502 or other communication mechanism for communicating information, and a hardware processor, or multiple processors, 1504 coupled with bus 1502 for processing information. Hardware processor(s) 1504 may be, for example, one or more general purpose microprocessors.

The city resiliency sharing system 100 also includes a main memory 1506, such as a random access memory (RAM), cache and/or other dynamic storage devices, coupled to bus 1502 for storing information and instructions to be executed by processor(s) 1504. Main memory 1506 also may be used for storing temporary variables or other intermediate information during execution of instructions to be executed by processor(s) 1504. Such instructions, when stored in storage media accessible to processor(s) 1504, render the city resiliency sharing system 100 into a special-purpose machine that is customized to perform the operations specified in the instructions. Such instructions, as executed by hardware processors, may implement the methods and systems described herein for sharing city resiliency information.

The city resiliency sharing system 100 further includes a read only memory (ROM) 1508 or other static storage device coupled to bus 1502 for storing static information and instructions for processor(s) 1504. A storage device 1510, such as a magnetic disk, optical disk, or USB thumb drive (Flash drive), etc., is provided and coupled to bus 1502 for storing information and instructions. The workflow unit 428, strategy unit 430, resilience data modification unit 440, strategy data store 432, and/or resilience data store 442 of FIG. 4, reader unit 620, cluster unit 630, interactive map unit 640, and/or electronic communication listener 650 of FIG. 6 may be stored on the main memory 1506 and/or the storage device 1510.

In some embodiments, the strategy data store 432 of FIG. 4A is a file system, relational database such as, but not limited to, MySql, Oracle, Sybase, or DB2, and/or a distributed in memory caching system such as, but not limited to, Memcache, Memcached, or Java Caching System. The resilience data store 442 of FIG. 4A may be a similar file system, relational database and/or distributed in memory caching system as the strategy data store 432.

The city resiliency sharing system 100 may be coupled via bus 1502 to a display 1512, such as a cathode ray tube (CRT) or LCD display or touch screen, for displaying information to a computer user. An input device 1514 is coupled to bus 1502 for communicating information and command selections to processor 1504. One type of input device 1514 is a keyboard including alphanumeric and other keys. Another type of input device 1514 is a touch screen. Another type of user input device is cursor control 1516, such as a mouse, a trackball, a touch screen, or cursor direction keys for communicating direction information and command selections to processor 1504 and for controlling cursor movement on display 1512. This input device may have two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The city resiliency sharing system 100 may include a reader unit 620, cluster unit 630, and/or interactive map unit 640, which may be stored in a mass storage device as executable software codes that are executed by the computing device(s). This and other units may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "instructions," "code," and/or "code instructions," as used herein, refers to logic embodied in hardware or firmware, or to a collection of software units, possibly having entry and exit points, written in a programming language, such as, but not limited to, Java, Lua, C, C++, or C#. A software unit may be compiled and linked into an executable program, installed in a dynamic link library, or may be written in an interpreted programming language such as, but not limited to, BASIC, Perl, or Python. It will be appreciated that software units may be callable from other units or from themselves, and/or may be invoked in response to detected events or interrupts. Software units configured for execution on computing devices by their hardware processor(s) may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. Generally, the instructions described herein refer to logical modules that may be combined with other modules or divided into sub-modules despite their physical organization or storage.

The city resiliency sharing system 100, or components of it, such as workflow unit 428, strategy unit 430, resilience data modification unit 440, reader unit 620, cluster unit 630, interactive map unit 640, and/or electronic communication listener 650, may be programmed, via executable code instructions, in a programming language.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1510. Volatile media includes dynamic memory, such as main memory 1506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1502. Transmission media can also take the form of acoustic or light waves, such as those generated during radio-wave and infra-red data communications.

Various forms of media may be involved in carrying one or more sequences of one or more instructions to processor(s) 1504 for execution. For example, the instructions may initially be carried on a magnetic disk or solid state drive of a remote computer. The remote computer may load the instructions into its dynamic memory and send the instructions over a telephone or cable line using a modem. A modem local to the city resiliency sharing system 100 may receive the data on the telephone or cable line and use an infra-red transmitter to convert the data to an infra-red signal. An infra-red detector can receive the data carried in the infra-red signal and appropriate circuitry can place the data on bus 1502. Bus 1502 carries the data to main memory 1506, from which the processor(s) 1504 retrieves and executes the instructions. The instructions received by main memory 1506 may retrieve and execute the instructions. The instructions received by main memory 1506 may optionally be stored on storage device 1510 either before or after execution by processor(s) 1504.

The city resiliency sharing system 100 also includes a communication interface 1518 coupled to bus 1502. Communication interface 1518 provides a two-way data communication coupling to a network link 1520 that is connected to a local network 1522. For example, communication interface 1518 may be an integrated services digital network (ISDN) card, cable modem, satellite modem, or a modem to provide a data communication connection to a corresponding type of telephone line. As another example, communication interface 1518 may be a local area network (LAN) card to provide a data communication connection to a compatible LAN (or WAN component to be communicated with a WAN). Wireless links may also be implemented. In any such implementation, communication interface 1518 sends and receives electrical, electromagnetic or optical signals that carry digital data streams representing various types of information.

Network link 1520 typically provides data communication through one or more networks to other data devices. For example, network link 1520 may provide a connection through local network 1522 to a host computer 1524 or to data equipment operated by an Internet Service Provider (ISP) 1526. ISP 1526 in turn provides data communication services through the world wide packet data communication network now commonly referred to as the "Internet" 1528. Local network 1522 and Internet 1528 both use electrical, electromagnetic or optical signals that carry digital data streams. The signals through the various networks and the signals on network link 1520 and through communication interface 1518, which carry the digital data to and from the city resiliency sharing system 100, are example forms of transmission media.

The city resiliency sharing system 100 can send messages and receive data, including program code, through the network(s), network link 1520 and communication interface 1518. In the Internet example, a server 1530 might transmit a requested code for an application program through Internet 1528, ISP 1526, local network 1522 and communication interface 1518.

The received code may be executed by processor(s) 1504 as it is received, and/or stored in storage device 1510, or other non-volatile storage for later execution.

Each of the processes, methods, and algorithms described in the preceding sections may be embodied in, and fully or partially automated by, code instructions executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing units, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A system comprising:
   one or more computing devices programmed, via executable code instructions, to:

receive resilience data from each of a plurality of entities associated with respective municipalities, each entity comprising at least one computing system;

wherein the resilience data from the plurality of entities includes electronic documents regarding actual or potential natural disasters associated with respective municipalities, including:
- first resilience data comprising a first electronic document including information regarding an actual or potential natural disaster associated with a first municipality, and
- second resilience data comprising a second electronic document including information regarding an actual or potential natural disaster associated with a second municipality;

update a unified object ontology storing objects related to resilience of the plurality of entities with the received resilience data, wherein the unified object ontology specifies a de-duplicated plurality of objects and associations among the plurality of objects;

receive a search keyword from a third entity associated with a third municipality, the search keyword received via an interactive user interface displayed on a computer display of the third entity, the interactive user interface including a reader user interface having:
- a search area configured to receive search criteria including the search keyword;
- a results area configured to display summary information regarding any electronic documents of the resilience data matching the search criteria; and
- a data preview area configured to display at least a portion of an electronic document selected in the results area;

search the resilience data, including the first resilience data and the second resilience data, for resilience data including the search keyword;

in response to determining that the first electronic document includes the search keyword, initiate update of the reader user interface to display first summary information regarding the first electronic document in the results area;

determine a plurality of attribute values of the first electronic document, including attribute values for one or more:
- author attributes;
- recipient attributes;
- named attributes; and/or
- geolocation attributes;

identify, within the unified object ontology, related objects that each have an association with a first object representing the first electronic document, based at least on matching attributes of the related objects and the first object representing the first electronic document;

in response to identifying the related objects, filter the related objects based on a vulnerability criterion to determine a filtered set of objects within the unified object ontology, the vulnerability criterion indicating a potential vulnerability of an object to a natural disaster or emergency, wherein the vulnerability criterion is based at least on one or more of: age of a structure, age of a person, size of a business, location of a business within a specific area, or license information associated with a business;

initiate update of the interactive user interface to display a clustering user interface displaying:
- a document icon representing the first electronic document;
- one or more icons each representing related objects in the filtered set of objects;
- one or more association lines between pairs of respective icons and the document icon, wherein the one or more association lines indicate associations among the filtered set of related objects and the first object representing the first electronic document, as specified by the unified object ontology; and
- textual or graphical indicia associated with each association line indicating respective associations between related objects of the filtered set of objects and the first object representing the first electronic document, the textual or graphical indicia indicating the corresponding related object of the filtered set of objects is at least one of: an author, recipient, or named in the first electronic document.

2. The system of claim 1, wherein the one or more computing devices is further programmed, via executable code instructions, to:
- receive an electronic communication, wherein the electronic communication comprises a recipient, the recipient corresponding to a predefined electronic communication address; and
- share the resilience data with one or more entities of the plurality of entities configured to receive the resilience data.

3. The system of claim 2, wherein the electronic communication comprises at least one of: an email, a text message, or a chat message.

4. The system of claim 1, and wherein the one or more computing devices is further programmed, via executable code instructions, to:
- receive user selection input comprising at least two of the electronic documents;
- determine additional data objects associated with the at least two electronic documents based at least in part on common data property values; and
- cause presentation of representations of the at least two electronic documents and the additional data objects in the clustering user interface.

5. The system of claim 1, wherein the one or more computing devices is further programmed, via executable code instructions, to:
- access fourth resilience data from a fourth entity, the fourth resilience data comprising a plurality of data objects, wherein the fourth resilience data is associated with an access control list comprising indications of respective one or more entities permissioned to receive respective data objects of the plurality of data objects;
- determine a subset of the plurality of data objects permissioned to be shared by the third entity as indicated by the access control list; and
- share the subset of the plurality of data objects with one or more entities in the plurality of entities as indicated by the access control list.

6. The system of claim 1, wherein the one or more computing devices is further programmed, via executable code instructions, to:
- receive a strategy from the first municipality, wherein the strategy is generated by the first entity, and wherein the strategy is associated with the first resilience data; and execute the strategy at the second municipality, wherein the strategy accesses one or more data objects associated with the second municipality to identify a potential or actual resiliency issue at the second municipality, the one or more data objects comprising data associated with the second municipality, wherein execution of the strategy at the second municipality identifies characteristics of the potential or actual resiliency issue.

7. The system of claim 1, wherein the one or more computing devices is further programmed, via executable code instructions, to:
cause presentation of an interactive map, the interactive map comprising geolocation data associated with one or more locations referenced in the first electronic document.

8. A system comprising:
one or more computing devices programmed, via executable code instructions, to:
receive resilience data from each of a plurality of entities associated with respective municipalities, each entity comprising at least one computing system;
wherein the resilience data from the plurality of entities includes electronic documents regarding actual or potential natural disasters associated with respective municipalities, including:
first resilience data comprising a first electronic document including information regarding an actual or potential natural disaster associated with a first municipality, and
second resilience data comprising a second electronic document including information regarding an actual or potential natural disaster associated with a second municipality;
update a unified object ontology storing objects related to resilience of the plurality of entities with the received resilience data, wherein the unified object ontology specifies a de-duplicated plurality of objects and associations among the plurality of objects;
receive a search keyword from a third entity associated with a third municipality, the search keyword received via an interactive user interface displayed on a computer display of the third entity, the interactive user interface including a reader user interface having:
a search area configured to receive search criteria including the search keyword;
a results area configured to display summary information regarding any electronic documents of the resilience data matching the search criteria; and
a data preview area configured to display at least a portion of an electronic document selected in the results area;
search the resilience data, including the first resilience data and the second resilience data, for resilience data including the search keyword;
determine that the first electronic document includes the search keyword;
in response to determining that the first electronic document includes the search keyword, initiate update of the reader user interface to display first summary information regarding the first electronic document in the results area;
derive geolocation attribute values based at least in part on the first electronic document;
identify, within the unified object ontology, related objects that each have an association with a first object representing the first electronic document, based at least on matching attributes of the related objects and the first object representing the first electronic document;
initiate update of the interactive user interface to display a clustering user interface displaying:
a document icon representing the first electronic document;
one or more object icons each representing one of the related objects;
one or more association lines between pairs of respective object icons and the document icon, wherein the one or more association lines indicate associations among the related objects and the first object representing the first electronic document, as specified by the unified object ontology; and
textual or graphical indicia associated with each association line indicating respective associations between one of the related objects and the first object representing the first electronic document the textual or graphical indicia indicating a type of association between the corresponding related object and the first object;
initiate update of the interactive user interface to display an interactive map user interface displaying:
a geographic map; and
graphical indicia associated with one or more of the geolocation attribute values associated with the first electronic document.

9. A computer-implemented method, comprising:
receiving resilience data from each of a plurality of entities associated with respective municipalities, each entity comprising at least one computing system;
wherein the resilience data from the plurality of entities includes electronic documents regarding actual or potential natural disasters associated with respective municipalities, including:
first resilience data comprising a first electronic document including information regarding an actual or potential natural disaster associated with a first municipality, and
second resilience data comprising a second electronic document including information regarding an actual or potential natural disaster associated with a second municipality;
updating a unified object ontology storing objects related to resilience of the plurality of entities with the received resilience data, wherein the unified object ontology specifies a de-duplicated plurality of objects and associations among the plurality of objects;
receiving a search keyword from a third entity associated with a third municipality, the search keyword received via an interactive user interface displayed on a computer display of the third entity, the interactive user interface including a reader user interface having:
a search area configured to receive search criteria including the search keyword;
a results area configured to display summary information regarding any electronic documents of the resilience data matching the search criteria; and
a data preview area configured to display at least a portion of an electronic document selected in the results area;

searching the resilience data, including the first resilience data and the second resilience data, for resilience data including the search keyword;

in response to determining that the first electronic document includes the search keyword, initiating update of the reader user interface to display first summary information regarding the first electronic document in the results area;

determining a plurality of attribute values of the first electronic document, including attribute values for one or more:
author attributes;
recipient attributes;
named attributes; and/or
geolocation attributes;

identifying, within the unified object ontology, related objects that each have an association with a first object representing the first electronic document, based at least on matching attributes of the related objects and the first object representing the first electronic document;

in response to identifying the related objects, filtering the related objects based on a vulnerability criterion to determine a filtered set of objects within the unified object ontology, the vulnerability criterion indicating a potential vulnerability of an object to a natural disaster or emergency, wherein the vulnerability criterion is based at least on one or more of: age of a structure, age of a person, size of a business, location of a business within a specific area, or license information associated with a business;

initiating update of the interactive user interface to display a clustering user interface displaying:
a document icon representing the first electronic document;
one or more icons each representing related objects in the filtered set of objects;
one or more association lines between pairs of respective icons and the document icon, wherein the one or more association lines indicate associations among the filtered set of related objects and the first object representing the first electronic document, as specified by the unified object ontology; and
textual or graphical indicia associated with each association line indicating respective associations between related objects of the filtered set of objects and the first object representing the first electronic document, the textual or graphical indicia indicating the corresponding related object of the filtered set of objects is at least one of: an author, recipient, or named in the first electronic document.

10. Non-transitory computer readable storage media comprising computer-executable instructions that, when executed by a computing system, cause the computing system to:

receive resilience data from each of a plurality of entities associated with respective municipalities, each entity comprising at least one computing system;

wherein the resilience data from the plurality of entities includes electronic documents regarding actual or potential natural disasters associated with respective municipalities, including:
first resilience data comprising a first electronic document including information regarding an actual or potential natural disaster associated with a first municipality, and
second resilience data comprising a second electronic document including information regarding an actual or potential natural disaster associated with a second municipality;

update a unified object ontology storing objects related to resilience of the plurality of entities with the received resilience data, wherein the unified object ontology specifies a de-duplicated plurality of objects and associations among the plurality of objects;

receive a search keyword from a third entity associated with a third municipality, the search keyword received via an interactive user interface displayed on a computer display of the third entity, the interactive user interface including a reader user interface having:
a search area configured to receive search criteria including the search keyword;
a results area configured to display summary information regarding any electronic documents of the resilience data matching the search criteria; and
a data preview area configured to display at least a portion of an electronic document selected in the results area;

search the resilience data, including the first resilience data and the second resilience data, for resilience data including the search keyword;

in response to determining that the first electronic document includes the search keyword, initiate update of the reader user interface to display first summary information regarding the first electronic document in the results area;

determine a plurality of attribute values of the first electronic document, including attribute values for one or more:
author attributes;
recipient attributes;
named attributes; and/or
geolocation attributes;

identify, within the unified object ontology, related objects that each have an association with a first object representing the first electronic document, based at least on matching attributes of the related objects and the first object representing the first electronic document;

in response to identifying the related objects, filter the related objects based on a vulnerability criterion to determine a filtered set of objects within the unified object ontology, the vulnerability criterion indicating a potential vulnerability of an object to a natural disaster or emergency, wherein the vulnerability criterion is based at least on one or more of: age of a structure, age of a person, size of a business, location of a business within a specific area, or license information associated with a business;

initiate update of the interactive user interface to display a clustering user interface displaying:
a document icon representing the first electronic document;
one or more icons each representing related objects in the filtered set of objects;
one or more association lines between pairs of respective icons and the document icon, wherein the one or more association lines indicate associations among the filtered set of related objects and the first object representing the first electronic document, as specified by the unified object ontology; and
textual or graphical indicia associated with each association line indicating respective associations between related objects of the filtered set of objects and the first object representing the first electronic document, the textual or graphical indicia indicating the corresponding related object of the filtered set of objects is at least one of: an author, recipient, or named in the first electronic document.

11. A computer-implemented method, comprising:

receiving resilience data from each of a plurality of entities associated with respective municipalities, each entity comprising at least one computing system;

wherein the resilience data from the plurality of entities includes electronic documents regarding actual or potential natural disasters associated with respective municipalities, including:

first resilience data comprising a first electronic document including information regarding an actual or potential natural disaster associated with a first municipality, and second resilience data comprising a second electronic document including information regarding an actual or potential natural disaster associated with a second municipality;

updating a unified object ontology storing objects related to resilience of the plurality of entities with the received resilience data, wherein the unified object ontology specifies a de-duplicated plurality of objects and associations among the plurality of objects;

receiving a search keyword from a third entity associated with a third municipality, the search keyword received via an interactive user interface displayed on a computer display of the third entity, the interactive user interface including a reader user interface having:

a search area configured to receive search criteria including the search keyword;

a results area configured to display summary information regarding any electronic documents of the resilience data matching the search criteria; and a data preview area configured to display at least a portion of an electronic document selected in the results area;

searching the resilience data, including the first resilience data and the second resilience data, for resilience data including the search keyword;

determining that the first electronic document includes the search keyword;

in response to determining that the first electronic document includes the search keyword, initiating update of the reader user interface to display first summary information regarding the first electronic document in the results area;

deriving geolocation attribute values based at least in part on the first electronic document;

identifying, within the unified object ontology, related objects that each have an association with a first object representing the first electronic document, based at least on matching attributes of the related objects and the first object representing the first electronic document;

initiating update of the interactive user interface to display a clustering user interface displaying:

a document icon representing the first electronic document;

one or more object icons each representing one of the related objects;

one or more association lines between pairs of respective object icons and the document icon, wherein the one or more association lines indicate associations among the related objects and the first object representing the first electronic document, as specified by the unified object ontology; and textual or graphical indicia associated with each association line indicating respective associations between one of the related objects and the first object representing the first electronic document, the textual or graphical indicia indicating a type of association between the corresponding related object and the first object;

initiating update of the interactive user interface to display an interactive map user interface displaying:

a geographic map; and graphical indicia associated with one or more of the geolocation attribute values associated with the first electronic document.

12. Non-transitory computer readable storage media comprising computer-executable instructions that, when executed by a computing system, cause the computing system to:

receive resilience data from each of a plurality of entities associated with respective municipalities, each entity comprising at least one computing system;

wherein the resilience data from the plurality of entities includes electronic documents regarding actual or potential natural disasters associated with respective municipalities, including:

first resilience data comprising a first electronic document including information regarding an actual or potential natural disaster associated with a first municipality, and second resilience data comprising a second electronic document including information regarding an actual or potential natural disaster associated with a second municipality;

update a unified object ontology storing objects related to resilience of the plurality of entities with the received resilience data, wherein the unified object ontology specifies a de-duplicated plurality of objects and associations among the plurality of objects;

receive a search keyword from a third entity associated with a third municipality, the search keyword received via an interactive user interface displayed on a computer display of the third entity, the interactive user interface including a reader user interface having:

a search area configured to receive search criteria including the search keyword;

a results area configured to display summary information regarding any electronic documents of the resilience data matching the search criteria; and a data preview area configured to display at least a portion of an electronic document selected in the results area;

search the resilience data, including the first resilience data and the second resilience data, for resilience data including the search keyword;

determine that the first electronic document includes the search keyword;

in response to determining that the first electronic document includes the search keyword, initiate update of the reader user interface to display first summary information regarding the first electronic document in the results area;

derive geolocation attribute values based at least in part on the first electronic document;

identify, within the unified object ontology, related objects that each have an association with a first object representing the first electronic document, based at least on matching attributes of the related objects and the first object representing the first electronic document;

initiate update of the interactive user interface to display a clustering user interface displaying:
- a document icon representing the first electronic document;
- one or more object icons each representing one of the related objects;
- one or more association lines between pairs of respective object icons and the document icon, wherein the one or more association lines indicate associations among the related objects and the first object representing the first electronic document, as specified by the unified object ontology; and
- textual or graphical indicia associated with each association line indicating respective associations between one of the related objects and the first object representing the first electronic document, the textual or graphical indicia indicating a type of association between the corresponding related object and the first object;

initiate update of the interactive user interface to display an interactive map user interface displaying:
- a geographic map; and
- graphical indicia associated with one or more of the geolocation attribute values associated with the first electronic document.

\* \* \* \* \*